US011382083B2

(12) United States Patent
Guo

(10) Patent No.: US 11,382,083 B2
(45) Date of Patent: Jul. 5, 2022

(54) METHOD AND APPARATUS FOR HIGH RELIABILITY TRANSMISSION IN VEHICLE TO EVERYTHING (V2X) COMMUNICATION

(71) Applicant: Samsung Electronics Co., Ltd., Suwon-si (KR)

(72) Inventor: Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/518,877

(22) Filed: Jul. 22, 2019

(65) Prior Publication Data
US 2020/0029318 A1 Jan. 23, 2020

Related U.S. Application Data

(60) Provisional application No. 62/790,732, filed on Jan. 10, 2019, provisional application No. 62/756,877, (Continued)

(51) Int. Cl.
*H04W 72/04* (2009.01)
*H04W 4/40* (2018.01)
(Continued)

(52) U.S. Cl.
CPC ......... *H04W 72/042* (2013.01); *H04L 1/1819* (2013.01); *H04L 5/0055* (2013.01);
(Continued)

(58) Field of Classification Search
CPC ..... H04W 72/042; H04W 76/11; H04W 4/40; H04W 72/0446; H04W 72/14;
(Continued)

(56) References Cited

U.S. PATENT DOCUMENTS

2014/0098780 A1\* 4/2014 Kim ...................... H04L 5/0055
370/329
2015/0092689 A1\* 4/2015 Ko .................... H04W 72/0406
370/329
(Continued)

FOREIGN PATENT DOCUMENTS

EP 3422788 A1 1/2019
EP 3713318 A1 9/2020
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.0.0, Dec. 2017, 219 pages.
(Continued)

*Primary Examiner* — Hardikkumar D Patel

(57) ABSTRACT

A method of a user equipment (UE) in a wireless communication system is provided. The method comprises: receiving, from a base station (BS), configuration information including resource allocation information for a sidelink and an uplink (UL) channel, wherein the sidelink is established between the UE and another UE; receiving, from the BS, downlink control information (DCI) including sidelink resource allocation information; identifying resources for a hybrid automatic repeat request (HARQ) response of the sidelink based on the configuration information and the sidelink resource allocation information; and transmitting, to the BS, the HARQ response of the sidelink via physical uplink control channel (PUCCH) resources.

20 Claims, 42 Drawing Sheets

Related U.S. Application Data filed on Nov. 7, 2018, provisional application No. 62/750,982, filed on Oct. 26, 2018, provisional application No. 62/750,995, filed on Oct. 26, 2018, provisional application No. 62/732,335, filed on Sep. 17, 2018, provisional application No. 62/720,210, filed on Aug. 21, 2018, provisional application No. 62/764,941, filed on Aug. 16, 2018, provisional application No. 62/716,008, filed on Aug. 8, 2018, provisional application No. 62/711,750, filed on Jul. 30, 2018, provisional application No. 62/702,008, filed on Jul. 23, 2018.

(51) Int. Cl.
| | |
|---|---|
| *H04L 5/00* | (2006.01) |
| *H04W 74/08* | (2009.01) |
| *H04W 88/08* | (2009.01) |
| *H04W 72/14* | (2009.01) |
| *H04W 76/11* | (2018.01) |
| *H04W 88/02* | (2009.01) |
| *H04L 1/18* | (2006.01) |

(52) U.S. Cl.
CPC ......... *H04W 4/40* (2018.02); *H04W 72/0446* (2013.01); *H04W 72/14* (2013.01); *H04W 74/0833* (2013.01); *H04W 76/11* (2018.02); *H04W 88/023* (2013.01); *H04W 88/08* (2013.01)

(58) Field of Classification Search
CPC ........... H04W 74/0833; H04W 88/023; H04W 88/08; H04W 84/005; H04W 76/14; H04L 1/1819; H04L 5/0055; H04L 1/1822; H04L 1/1854; H04L 5/0051; H04L 5/0053; H04L 1/1812; H04L 5/0044; H04L 5/0094
See application file for complete search history.

(56) References Cited

U.S. PATENT DOCUMENTS

| | | | | |
|---|---|---|---|---|
| 2017/0126358 | A1* | 5/2017 | Rong | H04L 1/0038 |
| 2017/0295601 | A1* | 10/2017 | Kim | H04W 72/0406 |
| 2018/0255532 | A1* | 9/2018 | Li | H04L 5/0055 |
| 2020/0092692 | A1* | 3/2020 | Wang | H04W 4/40 |

FOREIGN PATENT DOCUMENTS

| | | |
|---|---|---|
| EP | 3735074 A1 | 11/2020 |
| EP | 3818758 A1 | 5/2021 |
| WO | 2017/171527 A1 | 10/2017 |
| WO | 2018124776 A1 | 7/2018 |
| WO | 2020/017939 A1 | 1/2020 |

OTHER PUBLICATIONS

"3rd Generation Partnership Project; Technical Specification Group Radio Access Network; Evolved Universal Terrestrial Radio Access (E-UTRA); Multiplexing and channel coding (Release 15)", 3GPP TS 36.212 V15.0.0, Dec. 2017, 214 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.0.0, Dec. 2017, 493 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.0.0, Dec. 2017, 109 pages.
"3rd Generation Partnership Project; Technical Specification Group Radio Access Network; Evolved Universal Terrestrial Radio Access (E-UTRA); Radio Resource Control (RRC); Protocol specification", 3GPP Ts 36.331 V15.0.0, Dec. 2017, 776 pages.
ISA/KR, International Search Report and Written Opinion of the International Searching Authority, International Application No. PCT/KR2019/009107, dated Oct. 30, 2019, 8 pages.
3GPP TS 36.885 V14.0.0 (Jun. 2016), Technical Report, 3rd Generation Partnership Project; Technical Specification Group Radio Access Network; Study on LTE-based V2X Services (Release 14), Jun. 2016, 216 pages.
Huawei, et al., "V2X sidelink channel model," R1-1807672, 3GPP TSG RAN WG1 Meeting #93, Busan, Korea, May 21-25, 2018, 29 pages.
Intel Corporation, "On Sidelink Resource Pool Sharing for eNB-Controlled and UE-Autonomous V2V Transmission Modes," R1-1806484, 3GPP TSG RAN WG1 Meeting #93, Busan, Korea, May 21-25, 2018, 4 pages.
Supplementary European Search Report dated Jul. 15, 2021 in connection with European Patent Application No. 19 84 1355, 7 pages.

\* cited by examiner

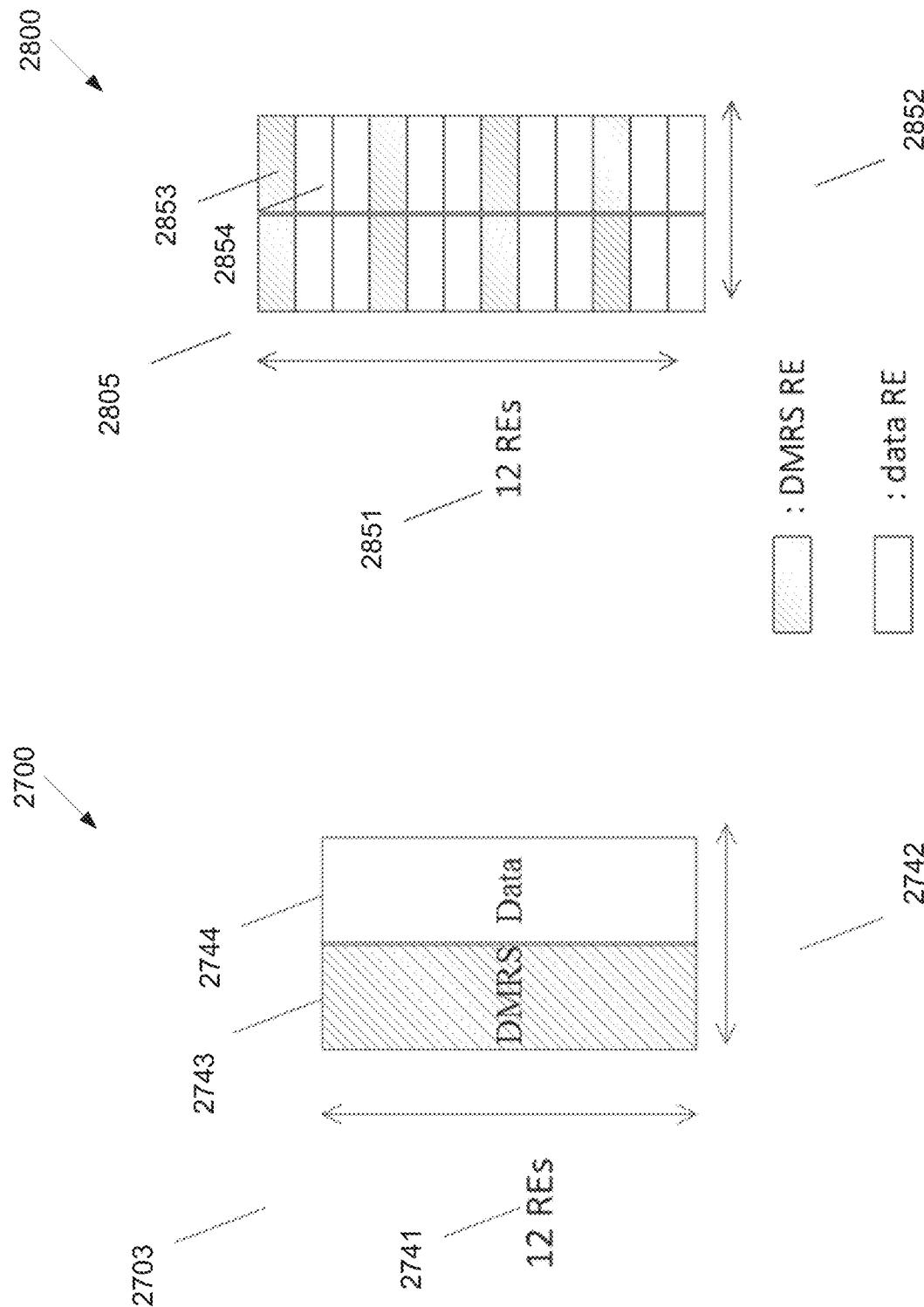

METHOD AND APPARATUS FOR HIGH RELIABILITY TRANSMISSION IN VEHICLE TO EVERYTHING (V2X) COMMUNICATION

CROSS-REFERENCE TO RELATED APPLICATIONS AND CLAIM OF PRIORITY

The present application claims priority to:
U.S. Provisional Patent Application Ser. No. 62/702,008, filed on Jul. 23, 2018;
U.S. Provisional Patent Application Ser. No. 62/711,750, filed on Jul. 30, 2018;
U.S. Provisional Patent Application Ser. No. 62/716,008, filed on Aug. 8, 2018;
U.S. Provisional Patent Application Ser. No. 62/764,941, filed on Aug. 16, 2018;
U.S. Provisional Patent Application Ser. No. 62/720,210, filed on Aug. 21, 2018;
U.S. Provisional Patent Application Ser. No. 62/732,335, filed on Sep. 17, 2018;
U.S. Provisional Patent Application Ser. No. 62/750,982, filed on Oct. 26, 2018;
U.S. Provisional Patent Application Ser. No. 62/750,995, filed on Oct. 26, 2018;
U.S. Provisional Patent Application Ser. No. 62/756,877, filed on Nov. 7, 2018; and
U.S. Provisional Patent Application Ser. No. 62/790,732, filed on Jan. 10, 2019. The content of the above-identified patent document is incorporated herein by reference.

TECHNICAL FIELD

The present application relates generally to wireless communication systems, more specifically, the present disclosure relates to high reliability transmission in V2X communication system.

BACKGROUND

The present disclosure relates to a pre-$5^{th}$-generation (5G) or 5G communication system to be provided for supporting higher data rates beyond $4^{th}$-generation (4G) communication system such as long term evolution (LTE). A communication system includes a downlink (DL) that conveys signals from transmission points such as base stations (BSs) or NodeBs to user equipments (UEs) and an uplink (UL) that conveys signals from UEs to reception points such as NodeBs. Additionally, a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as evolved universal terrestrial access network (E-UTRAN).

SUMMARY

The present disclosure relates to a pre-5th-Generation or 5G communication system to be provided for supporting vehicle to vehicle communication. Embodiments of the present disclosure provide transmission structures and format in advanced communication systems.

In one embodiment, a user equipment (UE) in a wireless communication system is provided. The UE comprises a transceiver configured to: receive, from a base station (BS), configuration information including resource allocation information for a sidelink and an uplink (UL) channel, wherein the sidelink is established between the UE and another UE; and receive, from the BS, downlink control information (DCI) including sidelink resource allocation information. The UE further comprises a processor operably connected to the transceiver, the processor configured to identify resources for a hybrid automatic repeat request (HARQ) response of the sidelink based on the configuration information and the sidelink resource allocation information, wherein the transceiver is further configured to transmit, to the BS, the HARQ response of the sidelink via physical uplink control channel (PUCCH) resources.

In another embodiment, a base station (BS) in a wireless communication system is provided. The BS comprises a transceiver configured to transmit, to a user equipment (UE), configuration information including resource allocation information for a sidelink and an uplink (UL) channel, wherein the sidelink is established between the UE and another UE; transmit, to the UE, downlink control information (DCI) including sidelink resource allocation information; and receive, from the UE, a hybrid automatic repeat request (HARQ) response of the sidelink via physical uplink control channel (PUCCH) resources, wherein the resources for the HARQ response of the sidelink are identified based on the configuration information and the sidelink resource allocation information.

In yet another embodiment, a method of a user equipment (UE) in a wireless communication system is provided. The method comprises receiving, from a base station (BS), configuration information including resource allocation information for a sidelink and an uplink (UL) channel, wherein the sidelink is established between the UE and another UE; receiving, from the BS, downlink control information (DCI) including sidelink resource allocation information; identifying resources for a hybrid automatic repeat request (HARQ) response of the sidelink based on the configuration information and the sidelink resource allocation information; and transmitting, to the BS, the HARQ response of the sidelink via physical uplink control channel (PUCCH) resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 27 illustrates another example PSFCH subchannel configuration according to embodiments of the present disclosure;

FIG. 28 illustrates yet another example PSFCH subchannel configuration according to embodiments of the present disclosure;

DETAILED DESCRIPTION

FIGS. 1 through 44, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v15.0.0, "E-UTRA, Physical channels and modulation;" 3GPP TS 36.212 v15.0.0, "E-UTRA, Multiplexing and Channel coding;" 3GPP TS 36.213 v15.0.0, "E-UTRA, Physical Layer Procedures;" 3GPP TS 36.321 v15.0.0, "E-UTRA, Medium Access Control (MAC) protocol specification;" and 3GPP TS 36.331 v15.0.0, "E-UTRA, Radio Resource Control (RRC) Protocol Specification."

Figure 1:
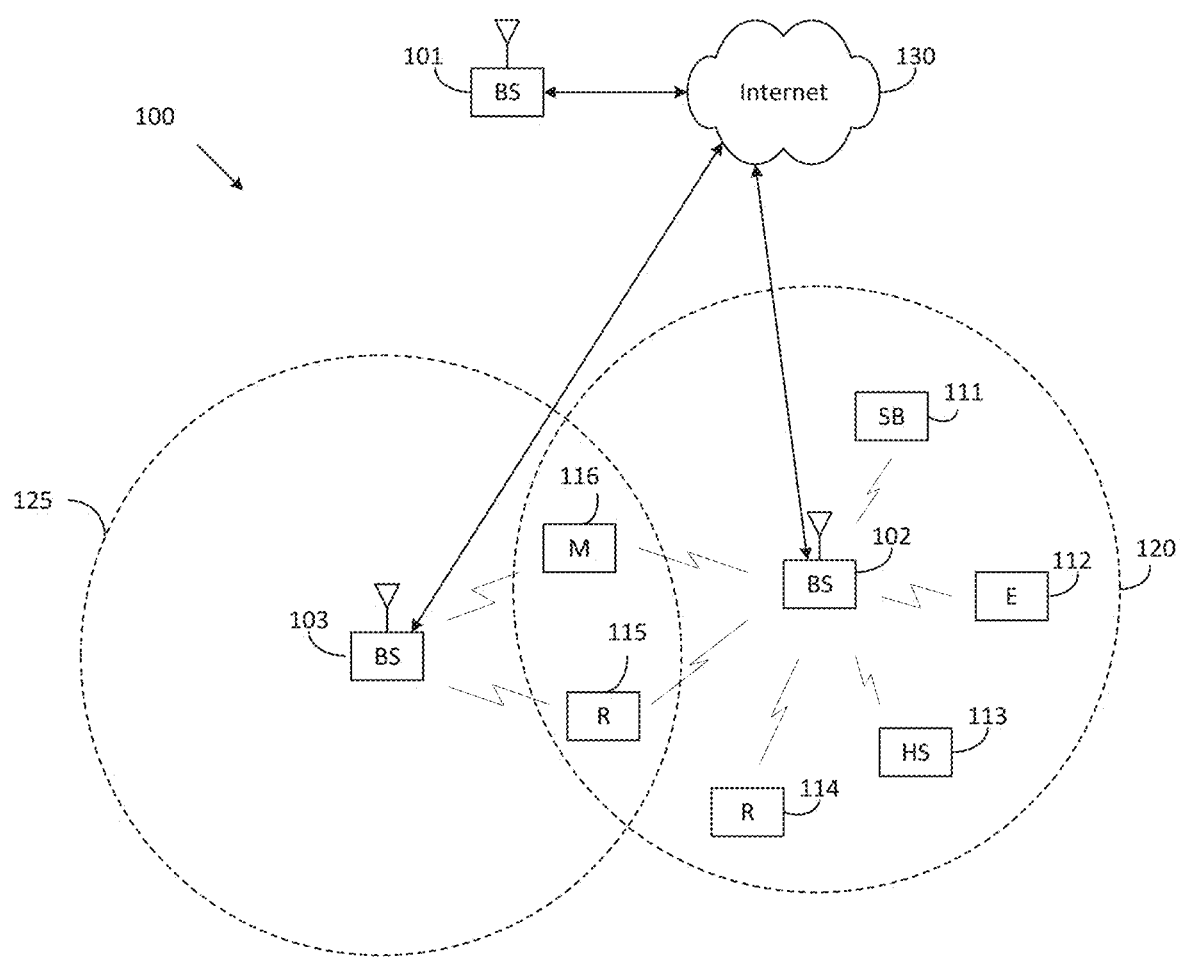
FIG. 1 illustrates an example wireless network according to embodiments of the present disclosure.
Figure 2:
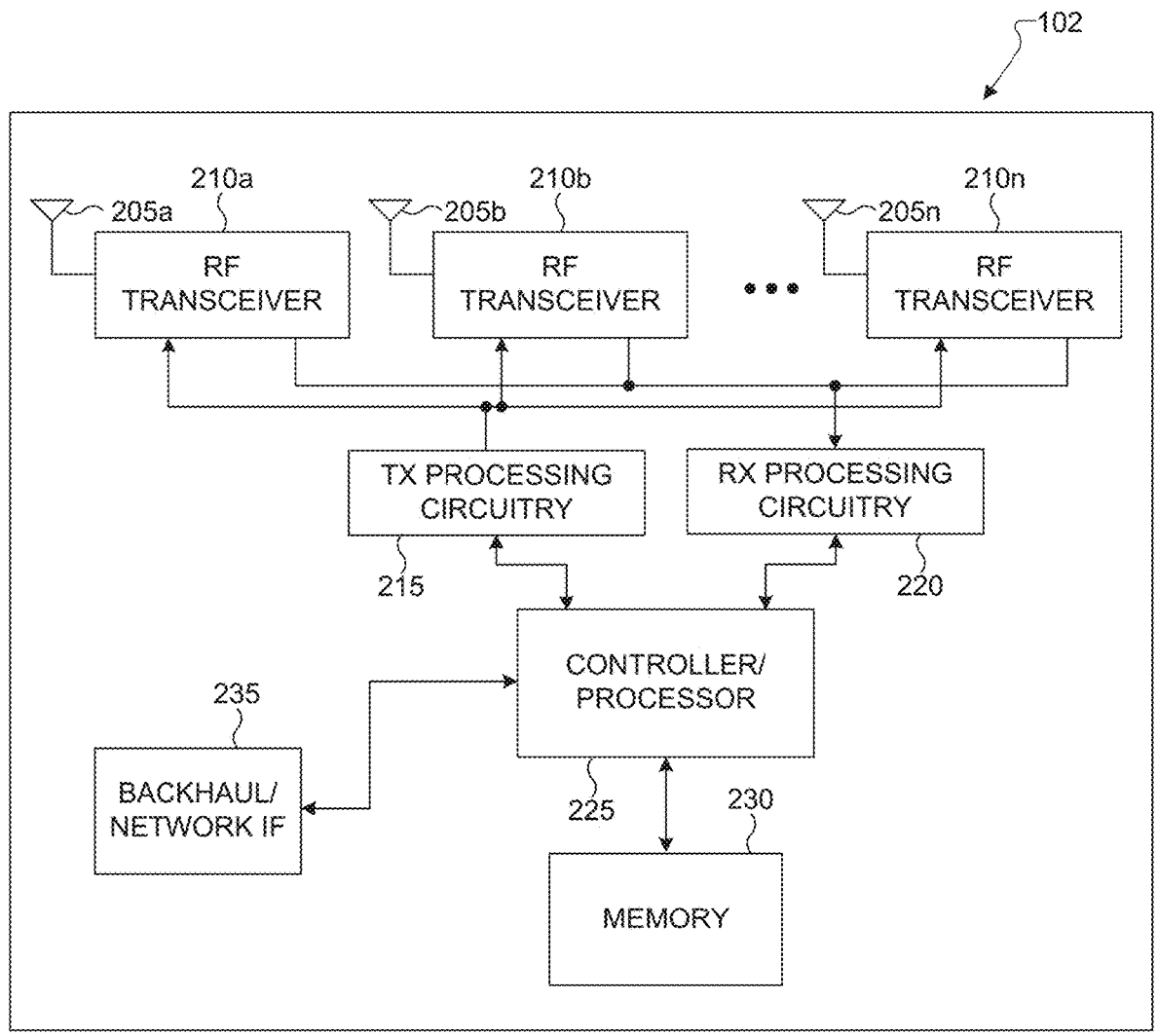
FIG. 2 illustrates an example gNB according to embodiments of the present disclosure.
Figure 3:
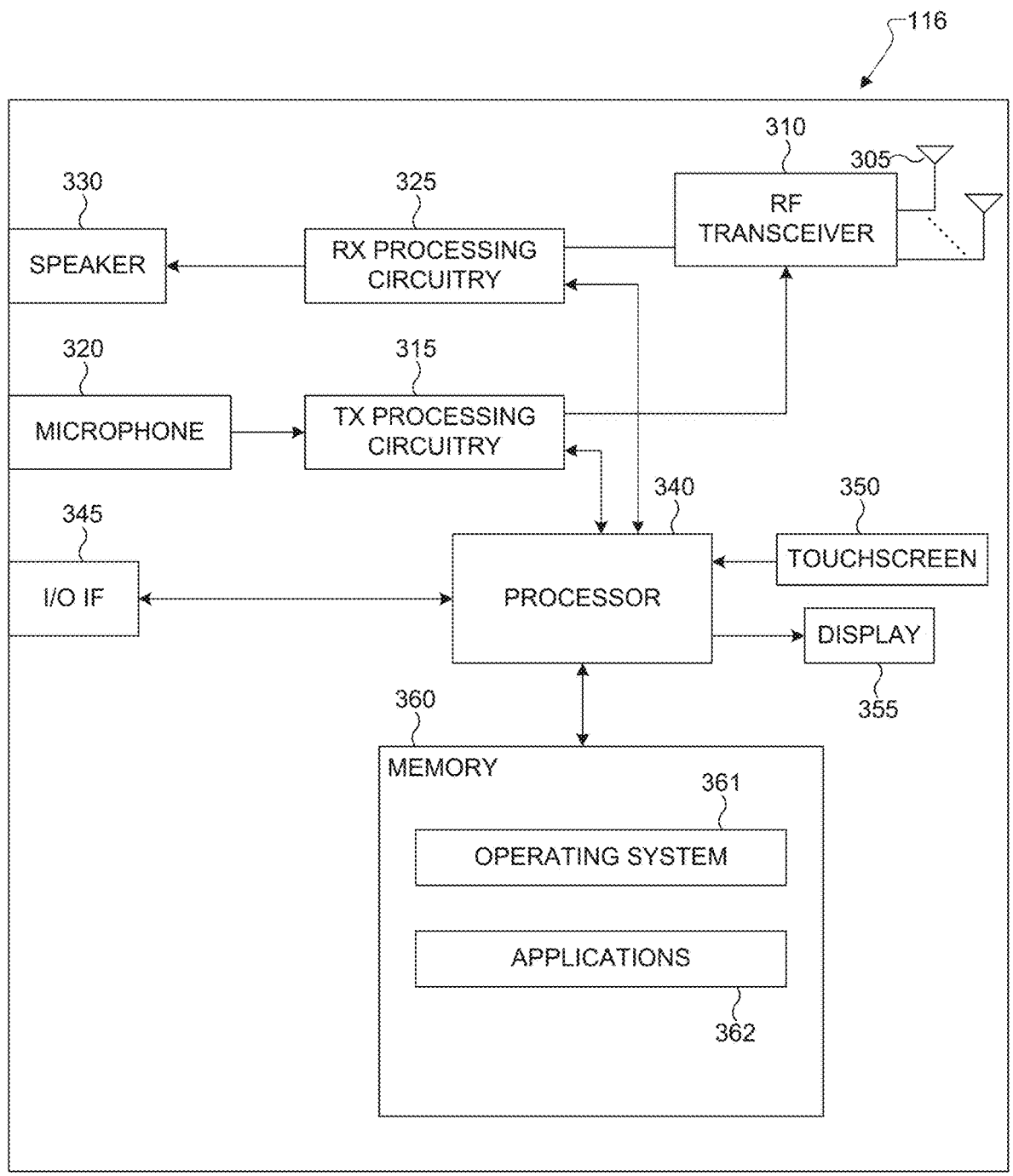
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient reliable transmission in vehicle to vehicle communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to vehicular communication network protocols, including vehicle-to-device, vehicle-to-vehicle, and vehicle-to-network communication resource allocation and synchronization schemes. A communication system includes a downlink (DL) that conveys signals from transmission points such as base stations (BSs) or NodeBs to user equipments (UEs) and an uplink (UL) that conveys signals from UEs to reception points such as NodeBs.

Additionally, a sidelink (SL) may convey signals from UEs to other UEs or other non-infrastructure based nodes. A UE, also commonly referred to as a terminal or a mobile station, may be fixed or mobile and may be a cellular phone, a personal computer device, etc. A NodeB, which is generally a fixed station, may also be referred to as an access point or other equivalent terminology such as eNodeB. The access network including the NodeB as related to 3GPP LTE is called as an evolved universal terrestrial access network (E-UTRAN).

In a communication system, DL signals can include data signals conveying information content, control signals conveying DL control information (DCI), and reference signals (RS) that are also known as pilot signals. A NodeB transmits data information through a physical DL shared channel (PDSCH). A NodeB transmits DCI through a physical DL control channel (PDCCH) or an enhanced PDCCH (EPDCCH). Messages are transmitted on the PDCCH using a cell radio network temporary identifier (C-RNTI) to identify the intended UE. The C-RNTI is the RNTI to be used by a given UE while the UE is in a particular cell after the UE and a NodeB establish an RRC connection.

A NodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, a NodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a sub-frame (SF) and can have, for example, duration of 1 millisecond. A number of ten SFs is referred to as a frame and is identified by a system frame number (SFN).

Traditionally, cellular communication networks have been designed to establish wireless communication links between mobile devices (UEs) and fixed communication infrastructure components (such as base stations or access points) that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

Figure 4:
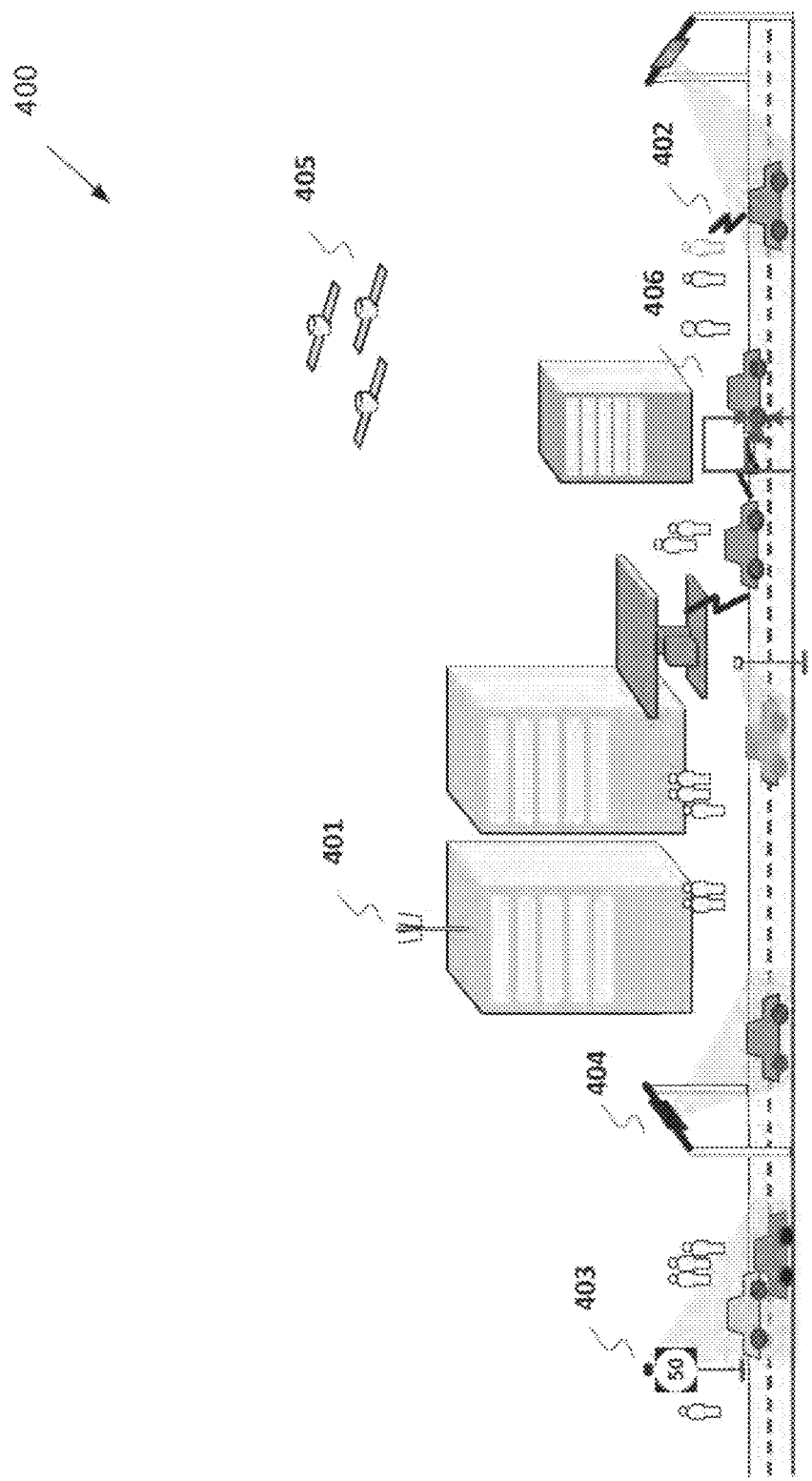
FIG. 4 illustrates an example use case of a vehicle-centric communication network according to embodiments of the present disclosure.

While UEs such as smartphones can be envisioned for D2D networks, vehicular communication can also be supported by a communication protocol where vehicles exchange control or data information with other vehicles or other infrastructure or UEs. Such a network is referred to as a V2X network. Multiple types of communication links can be supported by nodes supporting V2X in the network and can utilize same or different protocols and systems. FIG. 4 illustrates an example use case of a vehicle-centric communication network according to illustrative embodiments of the present disclosure.

FIG. 4 illustrates an example use case of a vehicle-centric communication network 400 according to embodiments of the present disclosure. The embodiment of the use case of a vehicle-centric communication network 400 illustrated in FIG. 4 is for illustration only. FIG. 4 does not limit the scope of the present disclosure to any particular implementation.

The vehicular communication, referred to as Vehicle-to-Everything (V2X), contains the following three different types: vehicle-to-vehicle (V2V) communications; vehicle-to-infrastructure (V2I) communications; and vehicle-to-pedestrian (V2P) communications.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

V2X communication can be used to implement several types of services that are complementary to a primary communication network or to provide new services based on a flexibility of a network topology. V2X can support unicasting, broadcasting, or group/multicasting as potential means for V2V communication 100 where vehicles are able to transmit messages to all in-range V2V-enabled devices or to a subset of devices that are members of particular group. The protocol can be based on LTE-D2D or on a specialized LTE-V2V protocol.

As illustrated in FIG. 4, V2X can support V2I communication 401 between one or more vehicles and an infrastructure node to provide cellular connectivity as well as specialized services related to control and safety of vehicular traffic. V2P communication 402 can also be supported, for example to provide safety services for pedestrians or traffic management services. V2X multicast communication 403 can be used to provide safety and control messages to large numbers of vehicles in a spectrally efficient manner.

The two primary standardized messages for V2V/V2I communication are the periodic beacons called cooperative awareness messages (CAM) and the event-triggered warning messages, called decentralized environment notification messages (DENM). The CAMs are periodically broadcasted beacons used to maintain awareness of the surrounding vehicles. These messages are sent with an adaptive frequency of 1-10 Hz. The CAMs include information such as position, type and direction. The DENMs are event-triggered warning messages which are generated to alert neighboring vehicles about potential hazards.

While vehicle devices can be able to support many different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 404 can be supported such as, for example, traffic tracking beacons. Satellite-based communication 405 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface. SL communication is defined as a functionality enabling proximity services (ProSe) Direct Communication between two or more nearby UEs using E-UTRA technology but not traversing any network node.

E-UTRAN allows such UEs that are in proximity of each other to exchange V2V-related information using E-UTRA (N) when permission, authorization and proximity criteria are fulfilled. The proximity criteria can be configured by the MNO. However, UEs supporting V2V Service can exchange such information when served by or not served by E-UTRAN which supports V2X Service. The UE supporting V2V applications transmits application layer information (e.g., about the UE's location, dynamics, and attributes as part of the V2V Service).

The V2V payload may be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 5:
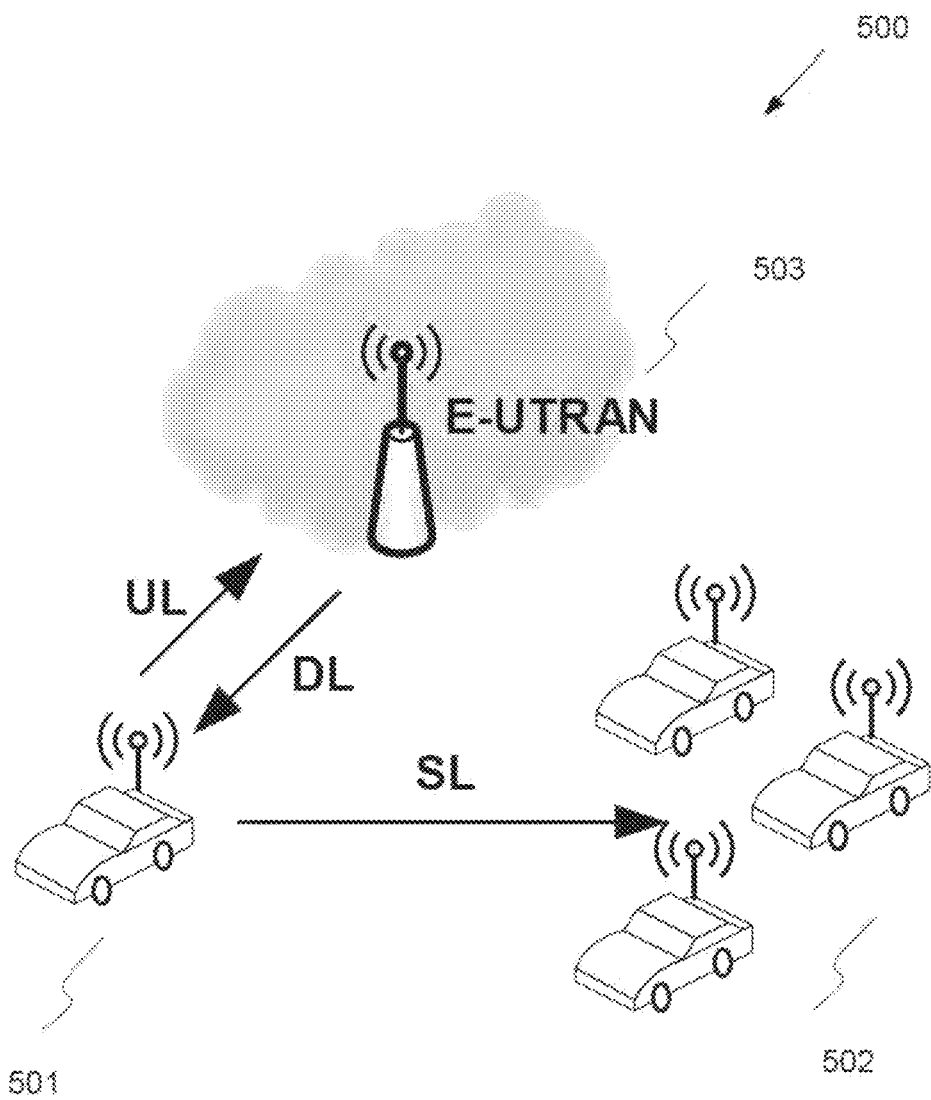
FIG. 5 illustrates an example SL interface according to embodiments of the present disclosure.

FIG. 5 illustrates an example SL interface 500 according to embodiments of the present disclosure. The embodiment of the SL interface 500 illustrated in FIG. 5 is for illustration only. FIG. 5 does not limit the scope of the present disclosure to any particular implementation.

FIG. 5 illustrates an example SL interface according to illustrative embodiments of the present disclosure. While UL designates the link from UE 501 to NodeB 503 and DL designates the reverse direction, SL designates the radio links over the PC5 interfaces between UE 501 and UEs 502. A UE 501 transmits a V2V message to multiple UEs 502 in the SL. SL communication happens directly without using E-UTRAN technology and not traversing any network node NodeB 503.

The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links occurs in the UL band in case of FDD. Similar, the PC5 interface uses SFs that are reserved for UL transmission in TDD. The signal transmission is based on single carrier frequency division multiple access (SC-FDMA) that is also used for UL transmission. The new channels can be largely based on the channel structure applicable for the transmission of the physical UL shared channel (PUSCH).

SL transmission and reception occurs with resources assigned to a group of devices. A resource pool (RP) is a set of resources assigned for sidelink operation. The RP may comprise the subframes and the resource blocks within the subframe. For SL communication, two additional physical channels are introduced: physical sidelink control channel (PSCCH) carrying the control information, and physical sidelink shared channel (PSSCH) carrying the data.

Figure 6:
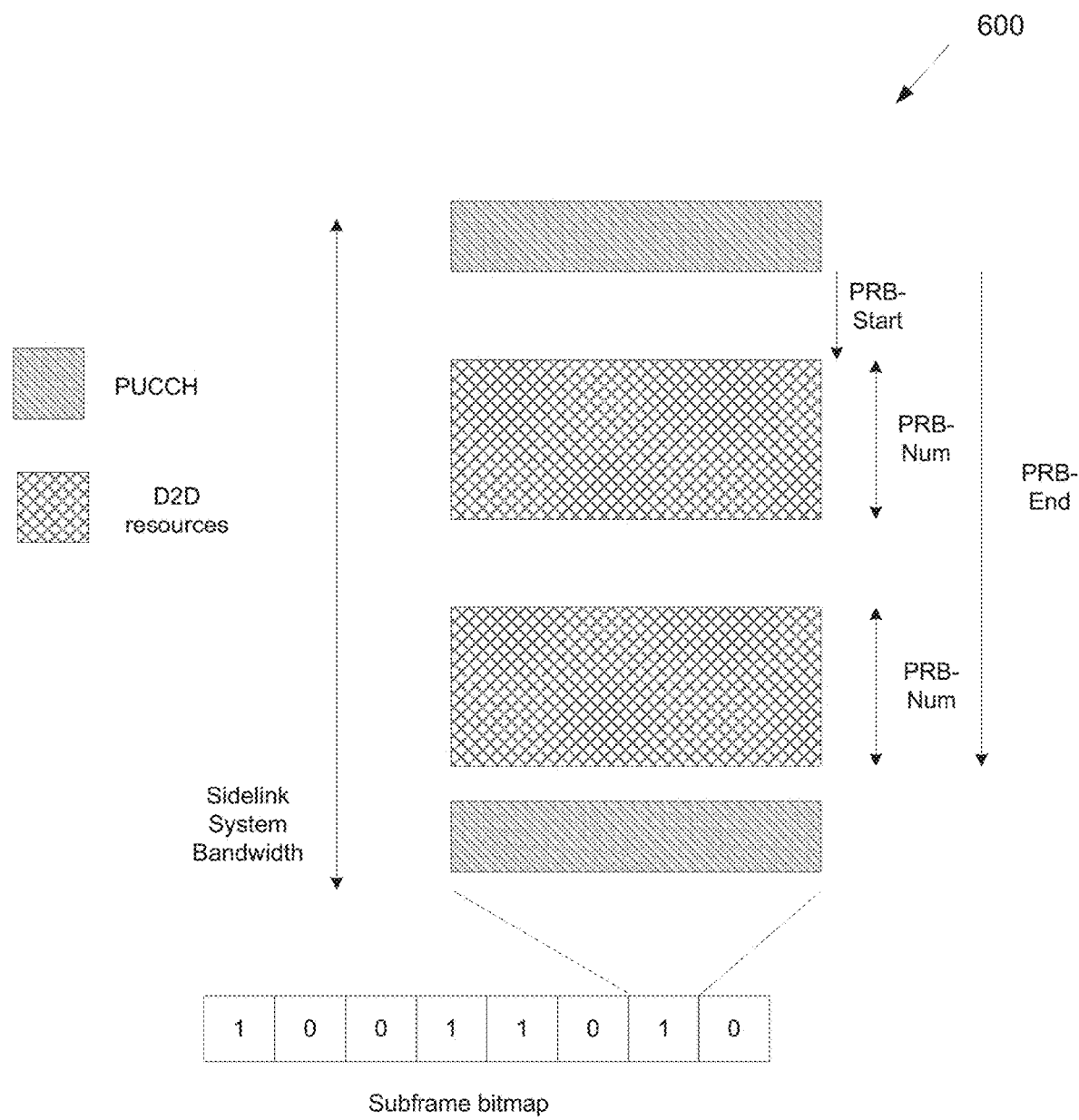
FIG. 6 illustrates an example resource pool for PSCCH according to embodiments of the present disclosure.

FIG. 6 illustrates an example resource pool for PSCCH 600 according to embodiments of the present disclosure. The embodiment of the resource pool for PSCCH 600 illustrated in FIG. 6 is for illustration only. FIG. 6 does not limit the scope of the present disclosure to any particular implementation.

FIG. 6 illustrates an example resource pool for PSCCH according to illustrative embodiments of the present disclosure. In one example, the pool is defined in the frequency, by parameters: PRBnum: that defines the frequency range in Physical Resource Block (PRB) bandwidth units; and PRBstart, PRBend: which defines the location in the frequency domain within the uplink band. In one example, the pool is defined in the time domain, by a bitmap that indicates the 1 msec sub-frames used for PSCCH transmission.

This block of resources is repeated with a period defined by a parameter SC-Period (expressed in sub-frame duration, i.e. 1 msec). The range of possible values for SC-Period is from 40 msec to 320 msec: low values are supported for voice transmission.

All the parameters needed to define the resource pool are broadcasted in a system information block (SIB) by the network. The devices which are not within coverage (and hence cannot acquire the SIB) may use some pre-configured values internally stored. The PSCCH is used by the V2X transmitting UE to make the members of the group aware of the next data transmission that may occur on the PSSCH. The V2X transmitting UE sends the sidelink control information (SCI) format 1 on the PSCCH as shown in TABLE 1.

TABLE 1

Sidelink control information

| Parameter | Usage and Notes |
| --- | --- |
| Priority | 3 bits |
| Resource reservation | 4 bits |
| Frequency resource location of initial transmission and retransmission | give the receiving devices information about the resources of the PSSCH that may be decoded in the frequency domain |
| Time gap between initial transmission and retransmission | 4 bits |
| Modulation and coding scheme | 5 bits |
| Retransmission index | 1 bit to indicate first or second transmission |
| Reserved information bits | To make the size of SCI format 1 to be 32 bits |

Devices interested in receiving V2X services blindly scan the whole PSCCH pool to search if a SCI format matching their group identifier can be detected. On the transmitting device side, resources to transmit the SCI format information may be selected within the PSCCH pool.

There are two types of resource pools: reception resource pools (Rx RPs) and transmission resource pools (Tx RPs). These are either signaled by the NodeB for in-coverage case or a pre-configured value is used for the out-of-coverage case. Within a cell, there may be more Rx RPs than Tx RPs to enable reception from adjacent cells or from out-of-coverage UEs.

Two modes of resource allocation have been defined for V2X communication: mode 3 that is also referred as "scheduled resource allocation" and mode 4 that is also referred as "UE autonomous resource selection". In mode 3, transmission of V2X on sidelink is scheduled by NodeB. The UE receives DCI format 5A from the NodeB and then sends SCI format 1 over the resources indicated by DCI format 5A that is illustrated in TABLE 2.

TABLE 2

DCI format and usage

| Parameter | Usage and Notes |
| --- | --- |
| Carrier indicator | Carrier indicator to support cross carrier scheduling |
| Lowest index of the subchannel allocation to the initial transmission | The resource allocation for PSCCH on V2X sidelink |
| SCI format 1 fields | The resource allocation for PSCH |
| SL index | 2 bits |
| SL SPS configuration index | 3 bits Configure the SPS transmission on sidelink |
| Activation/release indication | 1 bits to activate or release the SPS transmission on sidelink |

In LTE V2X, the data transmission on sidelink does not support HARQ. There is no ACK or NACK feedback for a PSSCH transmission. To improve the transmission reliability, re-transmission is one good approach.

Figure 7:
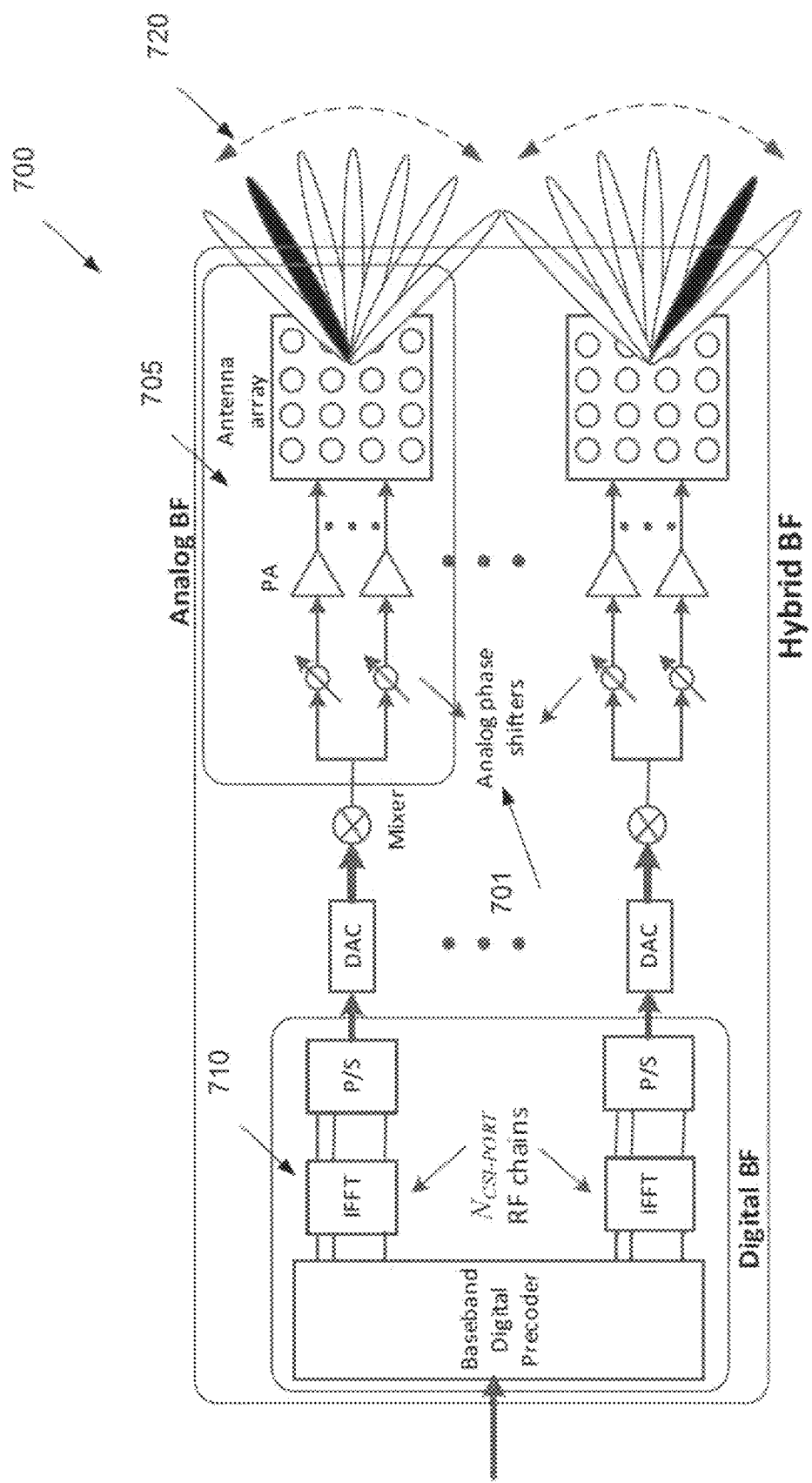
FIG. 7 illustrates an example RF chain according to embodiments of the present disclosure.

FIG. 7 illustrates an example RF chain 700 according to embodiments of the present disclosure. The embodiment of the RF chain 700 illustrated in FIG. 7 is for illustration only. FIG. 7 does not limit the scope of the present disclosure to any particular implementation.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles (720) by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks.

A sidelink is the communication link between one UE and another UE. In V2X communication, a sidelink can be used for the direct communication between one vehicle UE and another vehicle UE and can also be used for the direct communication between one vehicle UE and one UE-type roadside unit and can also be used for the direct communication between one vehicle UE and one pedestrian UE.

The interface of sidelink is called PC5 in the specification of 3GPP. For the transmission on a sidelink, one or more resource pool(s) can be configured or preconfigured and each resource pool configuration defines the time and frequency resources where one UE can select one or more resource units for transmission on sidelink. The time resource in sidelink can be partitioned into a slot in a time domain. For example, every consecutive 14 OFDM symbols can formulate one slot. For a subcarrier spacing 15 KHz, one slot is equal to 1 ms in time. And for a subcarrier spacing 60 KHz, one slot is equal to 0.25 ms.

In one embodiment, a UE can be configured with a resource pool for a sidelink transmission and the configuration resource pool configure the time-frequency resources for sidelink control channel (or called PSCCH), sidelink data channel (or called PSSCH) and sidelink feedback channel (or called PSFCH physical sidelink feedback channel). A configuration of the resource pool for a sidelink can include one or more of the following information: the index(es) of slots that can be used for sidelink transmission and reception. This can be implemented by a bitmap $[b_0, b_1, \ldots, b_{Lbitmap}]$ and the value of each bit in the bitmap $[b_0, b_1, \ldots, b_{Lbitmap}]$ can indicate whether corresponding slot is included in that resource pool; the configuration of feedback channel (PSFCH). The resource pool can include the number of resource unit or subchannels for PSFCH, the PRB starting location for resources for PSFCH, which can be a PRB index for starting position, the number of PRBs used for PSFCH resource; the number of subchannels for data channel (PSSCH); the frequency domain starting position for subchannels of data channel (PSSCH), which can be a PRB index as the starting position; the size of each subchannel; and the starting location of sidelink control channel in frequency domain, which can be a PRB index as the starting position.

In the present disclosure, a PSFCH subchannel can also be called a PSFCH resource. Either PSFCH subchannel or PSFCH resource mean one time-frequency resource zone that can contain one or more symbols in time domain and one or more PRB (physical resource blocks) in frequency domain, where a UE can transmit some configured feedback signal.

Figure 8:
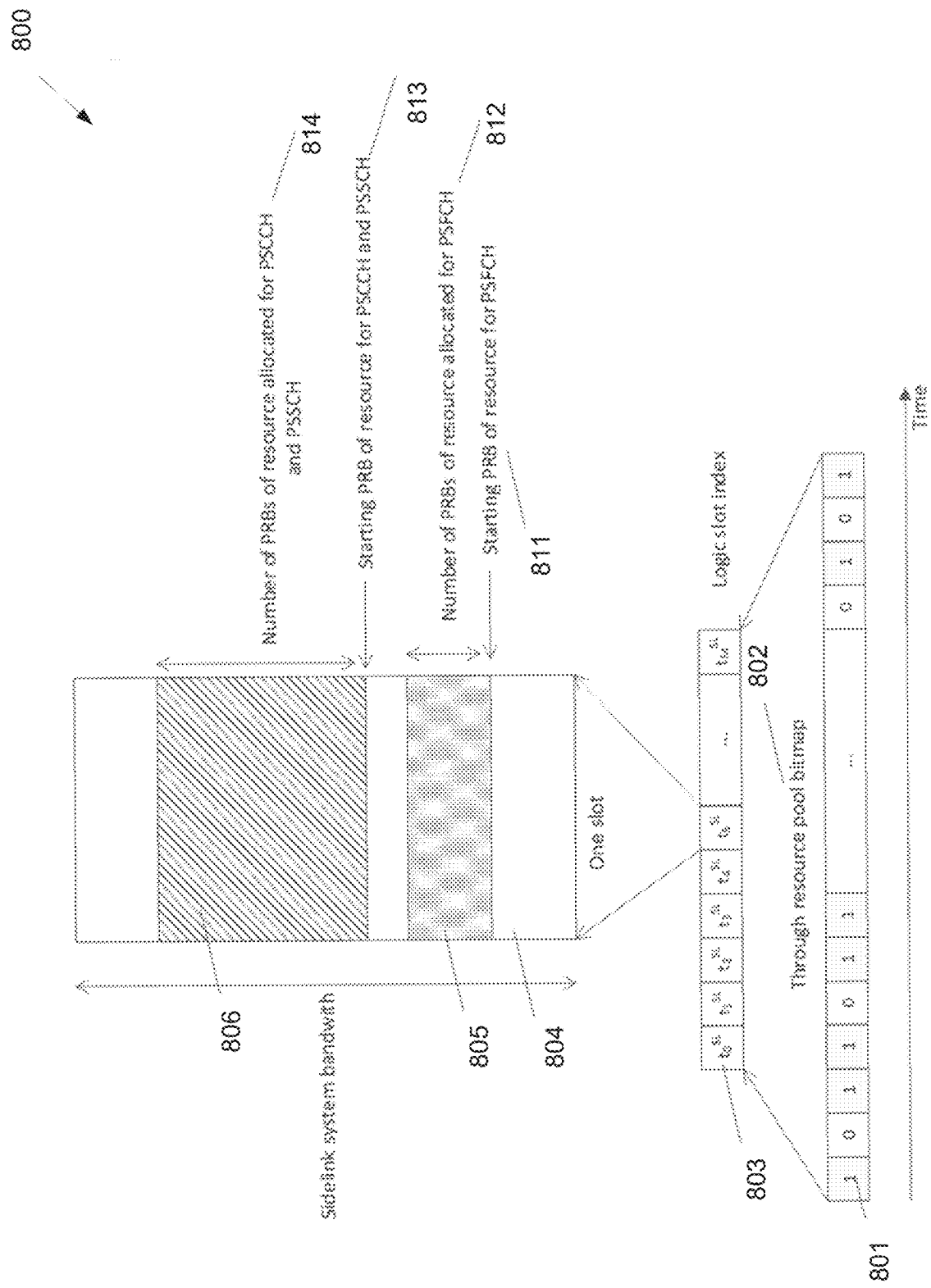
FIG. 8 illustrates an example slot configuration for a sidelink according to embodiments of the present disclosure.

FIG. 8 illustrates an example slot configuration for a sidelink 800 according to embodiments of the present disclosure. The embodiment of the slot configuration for a sidelink 800 illustrated in FIG. 8 is for illustration only. FIG. 8 does not limit the scope of the present disclosure to any particular implementation.

FIG. 8 illustrates a sidelink resource pool design with control channel (PSCCH), data channel (PSSCH) and feedback channel (PSFCH) according to this disclosure.

As shown in FIG. 8, physical slots 801 can be configured as slots for a sidelink slot through a resource pool bitmap 802 that can be configured or preconfigured to a UE. From that, the UE can obtain the logical slot index for a sidelink transmission 803. In 803, there are all the slots that are available for sidelink transmission resource. In one sidelink slot 804, resource for PSFCH 805 and resource for PSCCH and PSSCH 806 are configured.

For the resource of PSFCH 805, a starting PRB 811 and a number of PRBS of the resource allocated for PSFCH 812 are configured. The starting PRB 811 defines the location of the PFSCH resource in one slot and the number of PRBs (for PSFCH 812) defines the length of the resource for PSFCH in frequency domain. For the resource of PSCCH and PSSCH 806, a starting PRB 813 and a number of PRBs of the resource allocated for PSFCH 814 are configured. The starting PRB 813 defines the location of the PSCCH/PSSCH resource in one slot and the number of PRBs (for PSCCH and PSSCH 814) defines the length of the resource for PSCCH/PSSCH in frequency domain.

The resources allocated for PSSCH, PSCCH and PSFCH can be adjacent in frequency domain or non-adjacent in frequency domain, which would result in different alternatives for the resource configuration.

Figure 9:
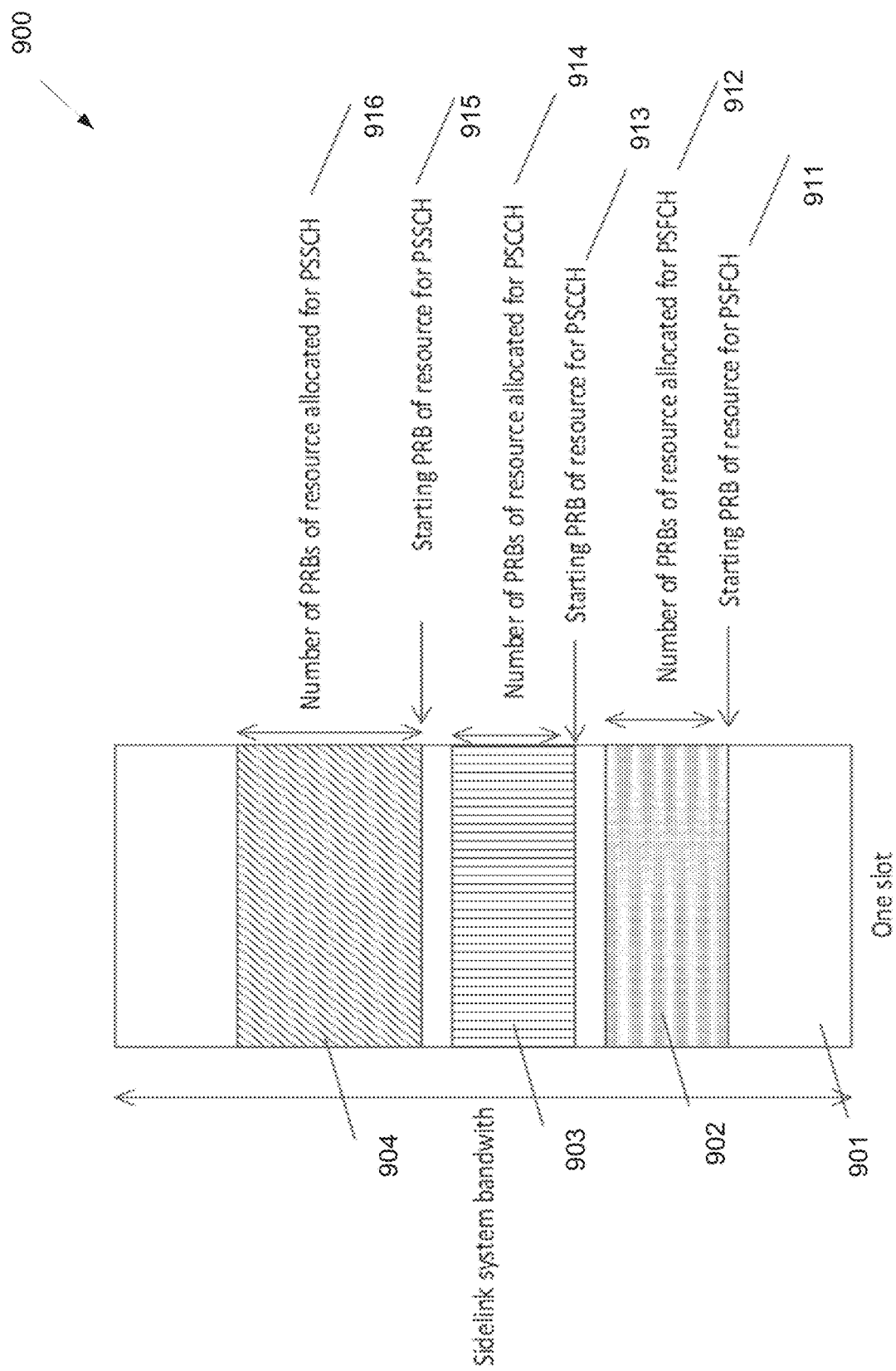
FIG. 9 illustrates an example PSSCH, PSCCH, and PSFCH configuration according to embodiments of the present disclosure.

FIG. 9 illustrates an example PSSCH, PSCCH, and PSFCH configuration 900 according to embodiments of the present disclosure. The embodiment of the PSSCH, PSCCH, and PSFCH configuration 900 illustrated in FIG. 9 is for illustration only. FIG. 9 does not limit the scope of the present disclosure to any particular implementation.

FIG. 9 illustrates a sidelink resource pool design with control channel (PSCCH), data channel (PSSCH) and feedback channel (PSFCH) according to this disclosure.

As shown in FIG. 9, resources for PSSCH, PSCCH and PSFCH are configured separately. For the resource of PSFCH 901, a starting PRB 911 and a number of PRBS of the resource allocated for PSFCH 912 are configured. The starting PRB 911 defines the location of the PFSCH resource in one slot and the number of PRBs (for PSFCH 912) defines the length of the resource for PSFCH in frequency domain. For the resource of PSCCH 602, a starting PRB 613 and a number of PRBS of the resource allocated for PSCCH 914 are configured. The starting PRB 913 defines the location of the PSCCH resource in one slot and the number of PRBs 914 (for PSCCH) defines the length of the resource for PSCCH in frequency domain. For the resource of PSCCH 903, a starting PRB 915 and a number of PRBS of the resource allocated for PSSCH 916 are configured. The starting PRB 915 defines the location of the PSSCH resource in one slot and the number of PRBs (for PSSCH 916) defines the length of the resource for PSSCH in frequency domain.

Figure 10:
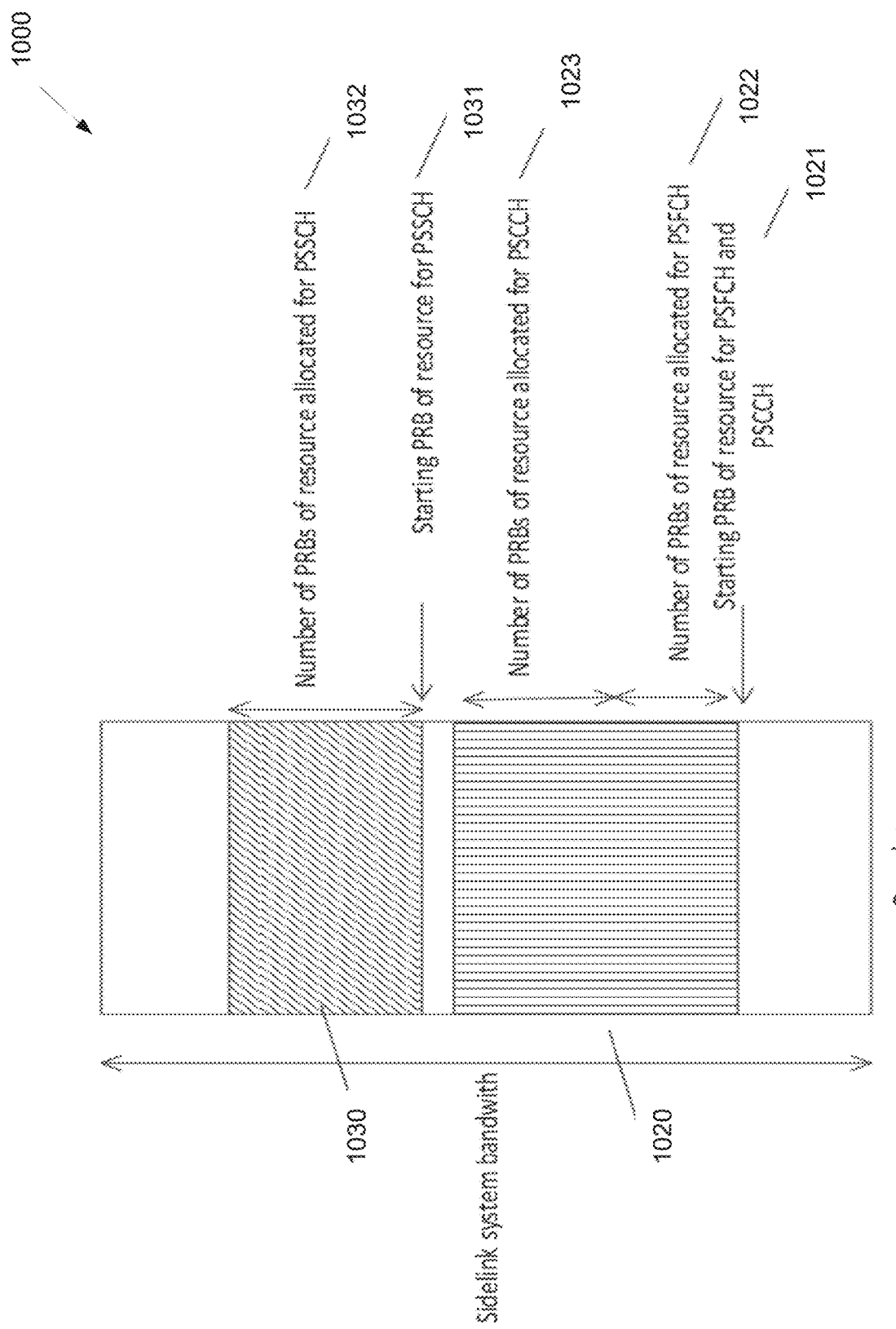
FIG. 10 illustrates an example one slot resource for PSFCH/PSCCH and PSSCH according to embodiments of the present disclosure.

FIG. 10 illustrates an example one slot resource for PSFCH/PSCCH and PSSCH 1000 according to embodiments of the present disclosure. The embodiment of the one slot resource for PSFCH/PSCCH and PSSCH 1000 illustrated in FIG. 10 is for illustration only. FIG. 10 does not limit the scope of the present disclosure to any particular implementation.

FIG. 10 illustrates a sidelink resource pool design with control channel (PSCCH), data channel (PSSCH) and feedback channel (PSFCH) according to this disclosure.

As shown in FIG. 10, in one slot resource for PSFCH/PSCCH (in the resource zone 1020) and resource for PSSCH 1030 are configured. For the resource used for PSCCH and PSFCH (in resource zone 1020), the following parameters can be configured: the starting PRB of resource, $prb_0$ for PSCCH and PSFCH 1021; the number of PRBs, $N_1$, used for PSFCH 1022; and the number of PRBs, $N_2$, used for PSCCH 1023.

As shown in FIG. 10, the PSFCH can occupy the first $N_1$ PRBs in resource zone 1020. The PSFCH can occupy PRB indexes $\{prb_0, prb_0+1, \ldots, prb_0+N_1-1\}$ in the resource zone 1020 and the PSCCH can occupy PRB indexed $\{prb_0+N_1, prb_0+N_1+1, \ldots, prb_0+N_1+N_2-1\}$ in the resource zone 1020. For the resource of PSSCH 1030, a starting PRB 1031 and a number of PRBS of the resource allocated for PSSCH 1032 are configured. The starting PRB 1031 defines the location of the PSSCH resource in one slot and the number of PRBs (for PSSCH 1032) defines the length of the resource for PSSCH in frequency domain.

Figure 11:
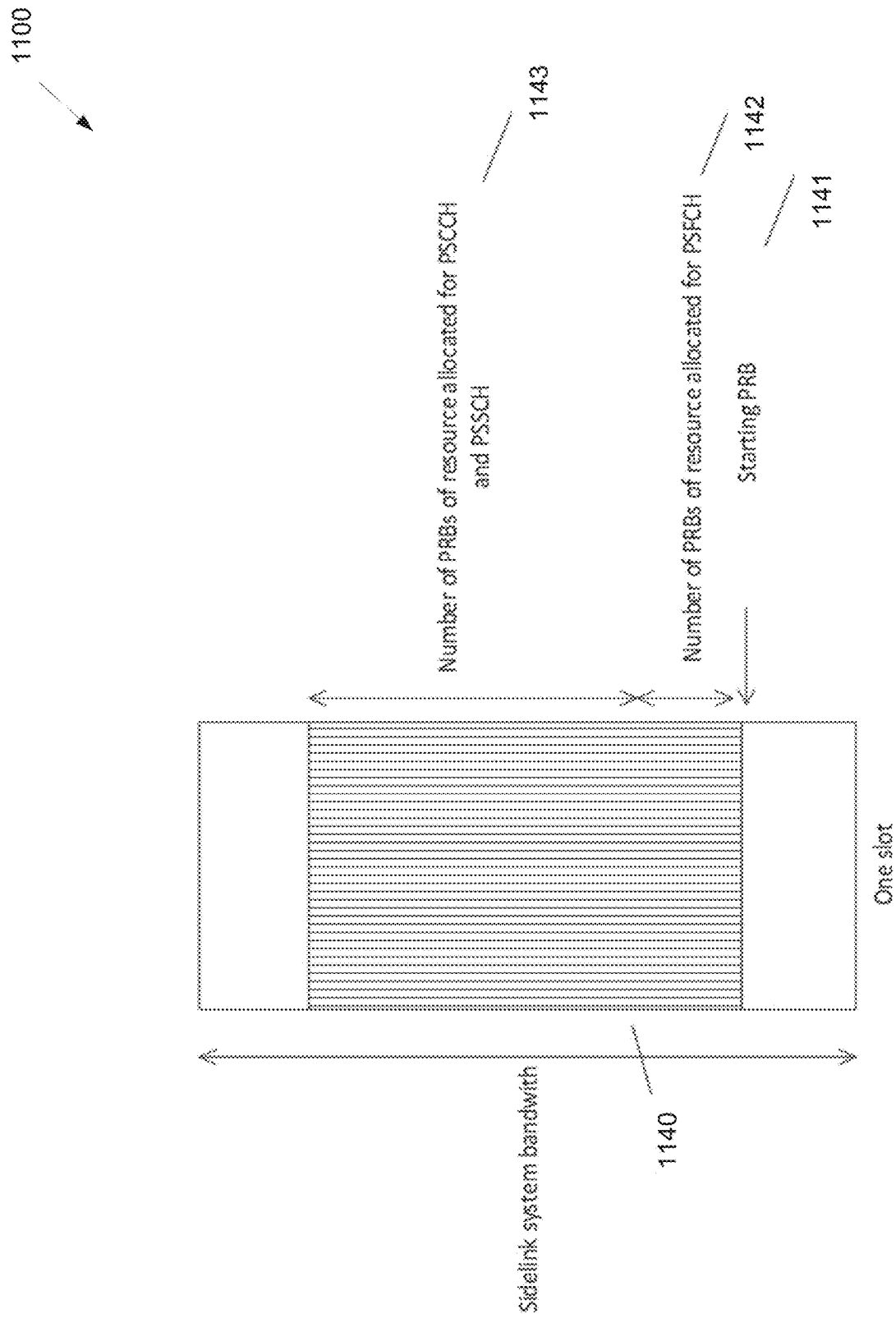
FIG. 11 illustrates an example sidelink resource pool according to embodiments of the present disclosure.

FIG. 11 illustrates an example sidelink resource pool 1100 according to embodiments of the present disclosure. The embodiment of the sidelink resource pool 1100 illustrated in FIG. 11 is for illustration only. FIG. 11 does not limit the scope of the present disclosure to any particular implementation.

FIG. 11 illustrates a sidelink resource pool design with control channel (PSCCH), data channel (PSSCH) and feedback channel (PSFCH) according to this disclosure.

As shown in FIG. 11, in one slot, resource for PSFCH/PSCCH/PSSCH 1140 is configured. For the resource zone (for PSFCH/PSCCH/PSSCH 1140), the following parameters can be configured: the starting PRB of resource, $prb_0$ for sidelink resource zone 1141; the number of PRBs, $N_3$, used for PSFCH 1142; and the number of PRBs, $N_4$, used for PSCCH and PSSCH 1143.

As shown in FIG. 11, the PSFCH can occupy the first $N_3$ PRBs in resource zone (for PSFCH/PSCCH/PSSCH 1140). The PSFCH can occupy PRB indexes $\{prb_0, prb_0+1, \ldots, prb_0+N_3-1\}$ in the resource zone 1140 and the PSCCH and PSSCH can occupy PRB indexed $\{prb_0+N_3, prb_0+N_3+1, \ldots, prb_0+N_3+N_4-1\}$ in the resource zone 1140.

In one embodiment, a UE can be configured a resource pool for sidelink communication and in the resource pool, the configuration resource pool configures the time-frequency resources for sidelink control channel (or called PSCCH), sidelink data channel (or called PSSCH) and sidelink feedback channel (or called PSFCH physical sidelink feedback channel). In each slot configured in resource pool for sidelink communication, the resource for PSSCH, PSCCH and sidelink feedback channel are time division multiplexing (TDMed), i.e., the resource for PSSCH, PSCCH and sidelink feedback channel are allocated on different symbols in one lot.

A configuration of the resource pool for sidelink can include one or more of the following information. In one example, the index(es) of slots that can be used for sidelink transmission and reception. This can be implemented by a bitmap $[b_0,b_1, \ldots ,b_{Lbitmap}]$ and the value of each bit in the bitmap $[b_0,b_1, \ldots ,b_{Lbitmap}]$ can indicate whether corresponding slot is included in that resource pool.

In another example, the symbol location (i.e., time domain location) and time domain length for PSCCH channel resources in one slot configured in the resource pool for sidelink communication. The resource pool can include the index of starting symbol for PSCCH channel resources, the number of symbols for PSCCH channel resources and the frequency domain location for PSCCH channel resources including the starting index of resource block and number of resource blocks.

In another example, the symbol location (i.e., time domain location in one slot) and time domain length for PSSCH channel resources in one slot configured in the resource pool for sidelink communication. The resource pool can include the index of starting symbol for PSCCH channel resource and the number of symbol for PSSCH channel resource and the frequency domain location for PSSCH channel resource including the starting index of resource block and number resource blocks.

In yet another example, the symbol location (i.e., time domain location in one slot) and time domain length for sidelink feedback channel resources in one slot configured in the resource pool for sidelink communication. The resource pool can include the index of starting symbol for sidelink feedback channel (PSFCH) resource and the number of symbol for PSSCH channel resource and the frequency domain location for PSFCH channel resource including the starting index of resource block and number resource blocks.

In yet another example, the number of subchannels for data channel (PSSCH), the number of subchannels for PSCCH, and/or the number of subchannel for PSFCH may be provided.

Figure 12:
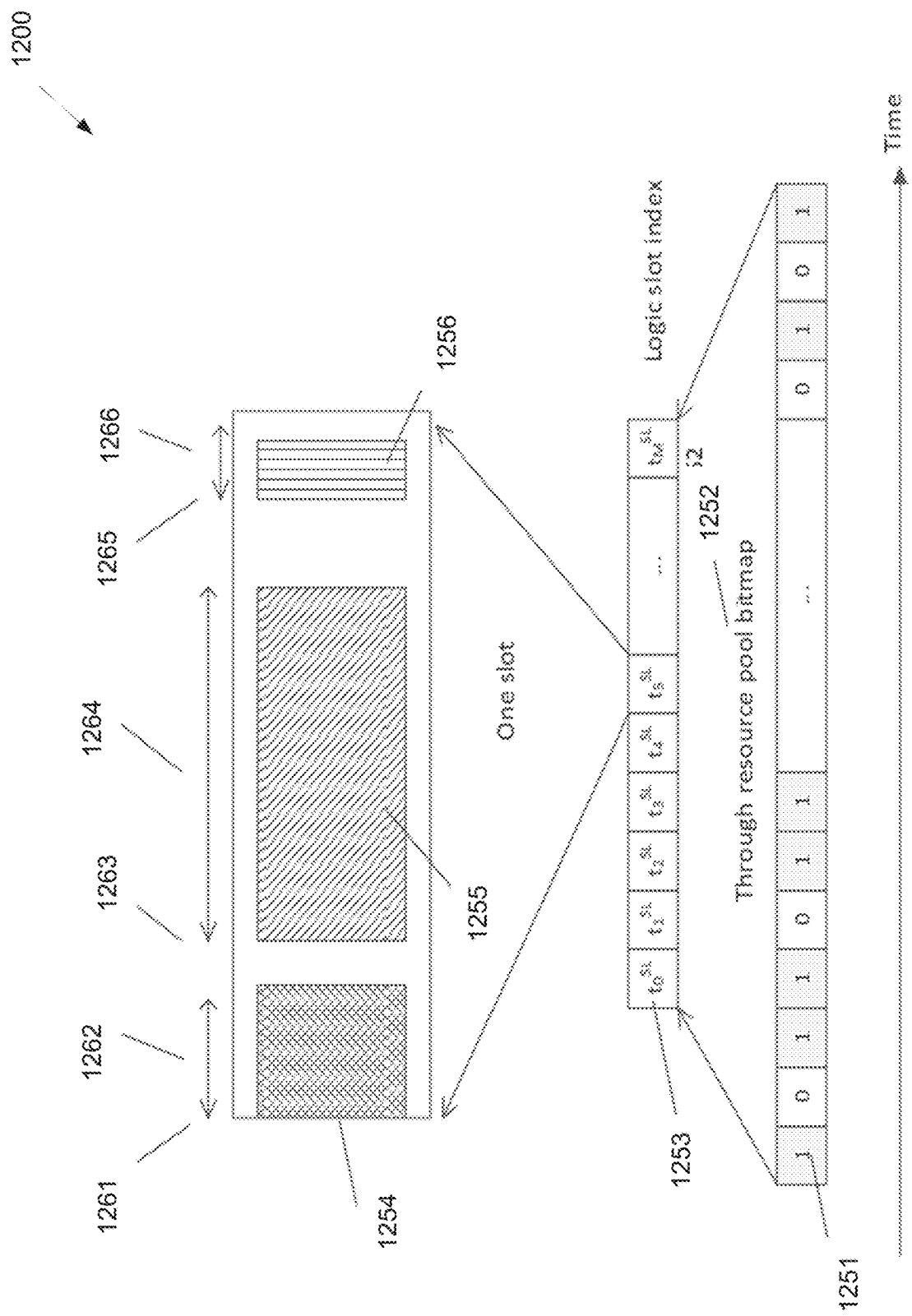
FIG. 12 illustrates an example physical slot configuration for sidelink according to embodiments of the present disclosure.

FIG. 12 illustrates an example physical slot configuration for sidelink 1200 according to embodiments of the present disclosure. The embodiment of the physical slot configuration for sidelink 1200 illustrated in FIG. 12 is for illustration only. FIG. 12 does not limit the scope of the present disclosure to any particular implementation.

FIG. 12 illustrates a sidelink resource pool design with control channel (PSCCH), data channel (PSSCH) and feedback channel (PSFCH) according to this disclosure.

As shown in FIG. 12, physical slots 1251 can be configured as slots for sidelink slot through resource pool bitmap 1222 that can be configured or preconfigured to a UE. From that, the UE can obtain the logical slot index for sidelink transmission 1253. In 12553, there are all the slots that are available for sidelink transmission resource. In one sidelink slot, resource for PSCCH 1254 and resource for PSSCH 1255 and resource for PSFCH 1256 are configured. For the resource of PSCCH 1254, a starting symbol 1261 and a number of symbols of the resource allocated for PSCCH 1262 are configured. For the resource for PSSCH 1255, a starting symbol 1263 and a number of symbols of the resource allocated for PSSCH 1264 are configured. For the resource of PSFCH 1256, a starting symbol 1265 and a number of symbols of the resource allocated for PSCCH 1266 are configured.

The resources allocated for PSSCH, PSCCH and PSFCH can be adjacent in a time domain or a non-adjacent in time domain, which would result in different alternatives for the resource configuration. The resource for PSSCH and PSCCH can have symbol overlap in a time domain but occupy different resource blocks (PRBs) in a frequency domain.

Figure 13:
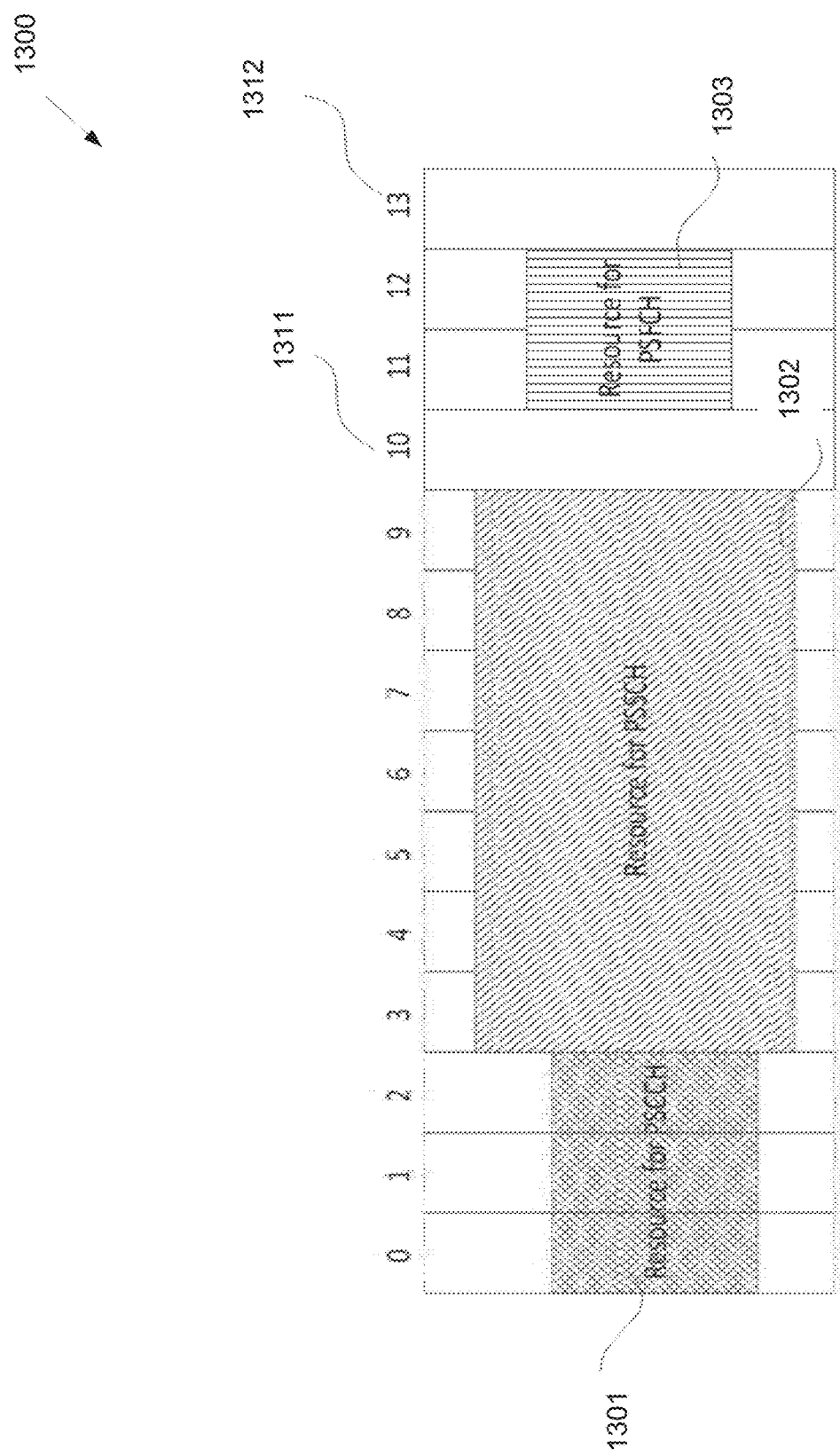
FIG. 13 illustrates an example slot configuration for sidelink according to embodiments of the present disclosure.

FIG. 13 illustrates an example slot configuration for sidelink 1300 according to embodiments of the present disclosure. The embodiment of the slot configuration for sidelink 1300 illustrated in FIG. 13 is for illustration only. FIG. 13 does not limit the scope of the present disclosure to any particular implementation.

FIG. 13 illustrates a sidelink resource pool design with control channel (PSCCH), data channel (PSSCH) and feedback channel (PSFCH) according to the present disclosure.

As shown in FIG. 13, in one slot used for sidelink, there may be the resource for PSCCH 1301, resource for PSSCH for 1302 and resource for PSFCH 1303. The sidelink slot has 14 symbols which are indexed from 0 to 13. The resource for PSCCH, i.e., physical layer sidelink control channel, 1301 occupies one or more resource blocks on symbols 0, 1 and 2. The resource for PSSCH, i.e., physical layer data channel, 1302 occupies one or more resource blocks on symbols 3, 4, 5, 6, 7, 8, 9 and the resource for PSFCH, i.e., physical layer feedback channel (PSFCH 1303) occupies one or more resource blocks on symbols 11 and 12. The resource for PSSCH and resource for PSCCH can occupy different number of resource blocks (PRBs) and different frequency domain location.

Symbol 10 1311 is left empty for no transmission and the symbol 10 1311 can be used as the GAP to accommodate the different arrival time of different UE's transmission and also the transition between Tx and Rx. Symbol 13 1312 is left empty for no transmission.

Figure 14:
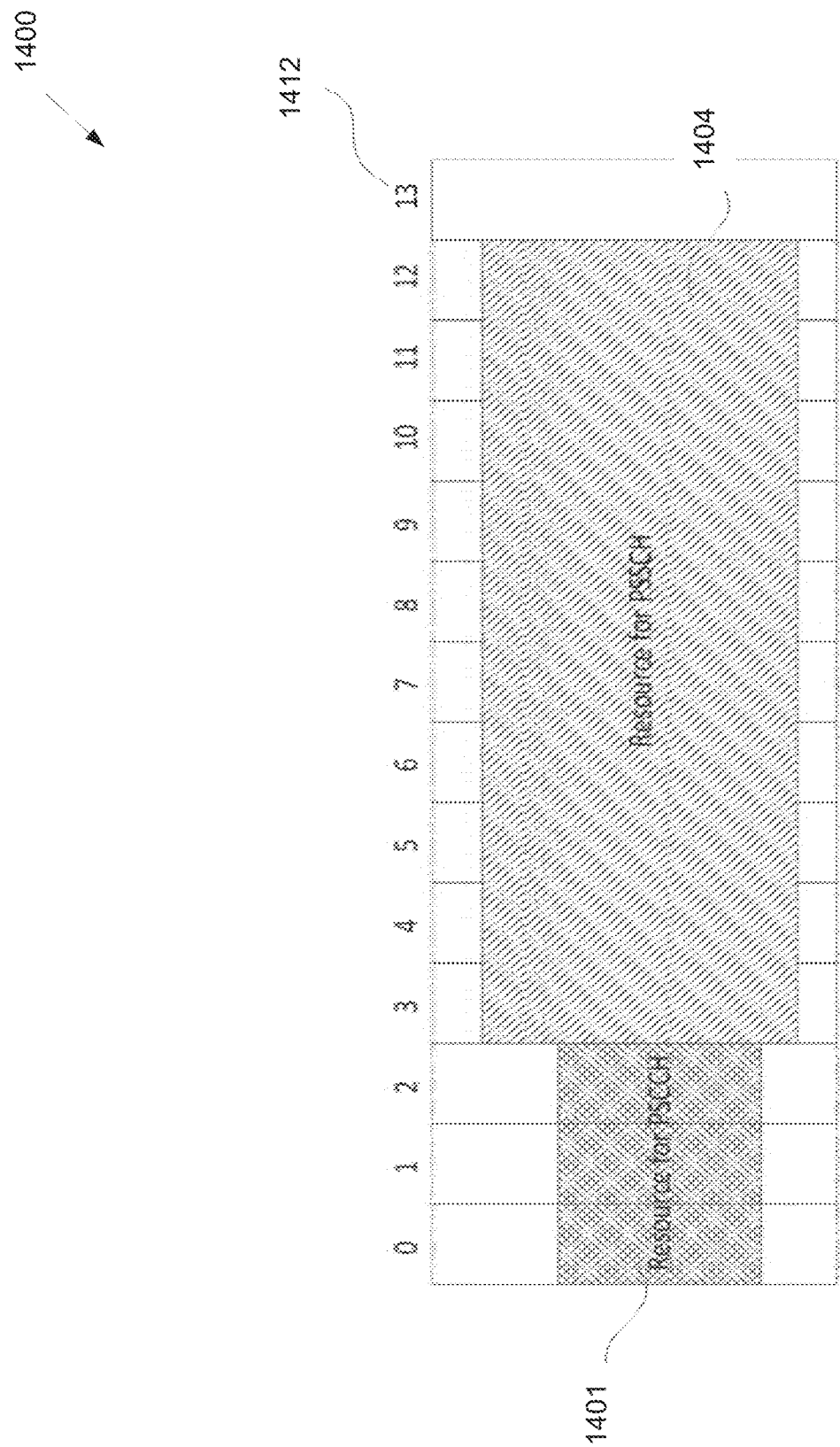
FIG. 14 illustrates another example slot configuration for sidelink according to embodiments of the present disclosure.

FIG. 14 illustrates another example slot configuration for sidelink 1400 according to embodiments of the present disclosure. The embodiment of the slot configuration for sidelink 1400 illustrated in FIG. 14 is for illustration only. FIG. 14 does not limit the scope of the present disclosure to any particular implementation.

FIG. 14 illustrates a sidelink resource pool design with control channel (PSCCH), data channel (PSSCH) and feedback channel (PSFCH) according to this disclosure.

As shown in FIG. 14, in one slot used for sidelink, there may be the resource for PSCCH 1401, resource for PSSCH for 1402. The sidelink slot has 14 symbols which are indexed from 0 to 13. The resource for PSCCH, i.e., physical layer sidelink control channel, 1401 occupies one or more resource blocks on symbols 0, 1 and 2. The resource for PSSCH, i.e., physical layer data channel, 1402 occupies one or more resource blocks on symbols 3, 4, 5, 6, 7, 8, 9, 10, 11 and 12. The resource for PSSCH and resource for PSCCH can occupy different number of resource blocks (PRBs) and different frequency domain location. Symbol 13 1412 is left empty for no transmission and the symbol 10 1411 can be used as the GAP to accommodate the different arrival time of different UE's transmission and also the transition between Tx and Rx from this slot to next slot.

Figure 15:
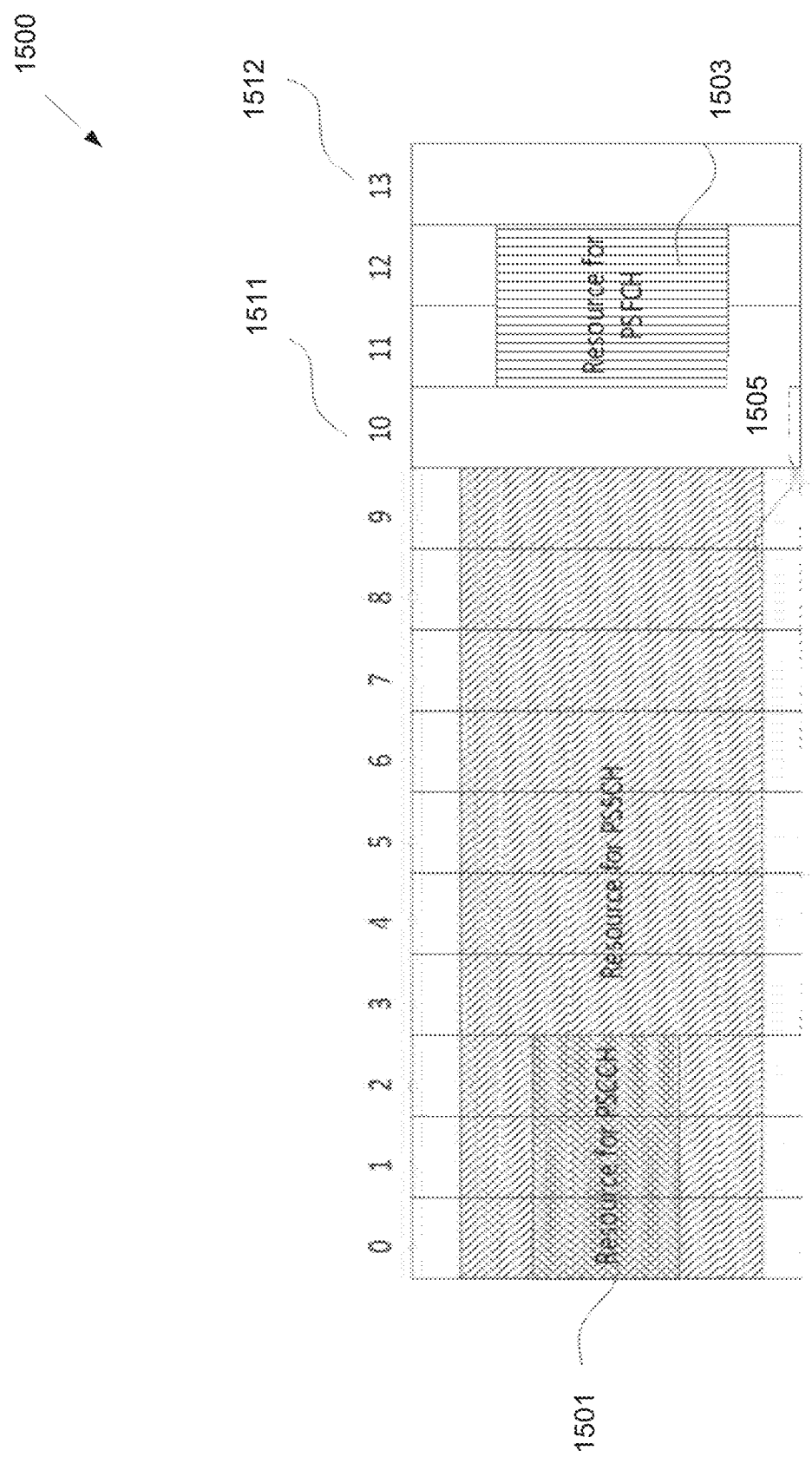
FIG. 15 illustrates yet another example slot configuration for sidelink according to embodiments of the present disclosure.

FIG. 15 illustrates yet another example slot configuration for sidelink 1500 according to embodiments of the present disclosure. The embodiment of the slot configuration for sidelink 1500 illustrated in FIG. 15 is for illustration only. FIG. 15 does not limit the scope of the present disclosure to any particular implementation.

FIG. 15 illustrates a sidelink resource pool design with control channel (PSCCH), data channel (PSSCH) and feedback channel (PSFCH) according to this disclosure.

As shown in FIG. 15, in one slot used for sidelink, there may be the resource for PSCCH 1501, resource for PSSCH for 1505 and resource for PSFCH 1503. The sidelink slot has 14 symbols which are indexed from 0 to 13. The resource for PSCCH, i.e., physical layer sidelink control channel, 1501 occupies one or more resource blocks on symbols 0, 1 and 2. The resource for PSSCH, i.e., physical layer data channel, 1502 occupies one or more resource blocks on symbols 0, 1, 2, 3, 4, 5, 6, 7, 8, 9. On symbols 0, 1 and 2, the resource for PSCCH and the resource for PSSCH are FDMed multiplexed and the resources occupy different PRBs (resource blocks); The resource for PSFCH, i.e., physical layer feedback channel (PSFCH 1503) occupies one or more resource blocks on symbols 11 and 12. The resource for PSSCH and resource for PSCCH can occupy different number of resource blocks (PRBs) and different frequency domain location. Symbol 10 1511 is left empty for no transmission and the symbol 10 1511 can be used as the GAP to accommodate the different arrival time of different UE's transmission and also the transition between Tx and Rx. Symbol 13 1512 is left empty for no transmission.

Figure 16:
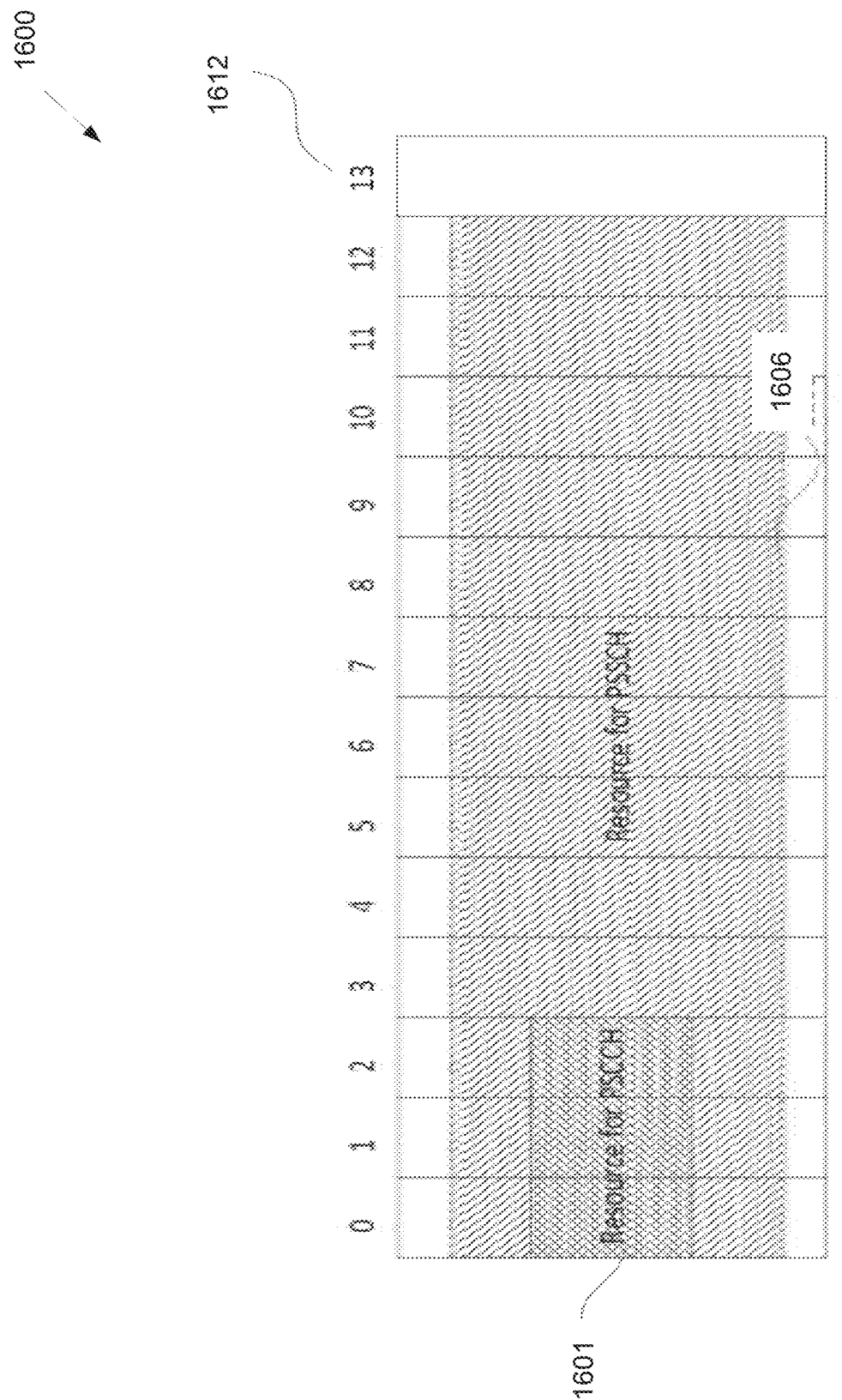
FIG. 16 illustrates yet another example slot configuration for sidelink according to embodiments of the present disclosure.

FIG. 16 illustrates yet another example slot configuration for sidelink 1600 according to embodiments of the present disclosure. The embodiment of the slot configuration for sidelink 1600 illustrated in FIG. 16 is for illustration only. FIG. 16 does not limit the scope of the present disclosure to any particular implementation.

FIG. 16 illustrates a sidelink resource pool design with control channel (PSCCH), data channel (PSSCH) and feedback channel (PSFCH) according to this disclosure.

As shown in FIG. 16, in one slot used for sidelink, there may be the resource for PSCCH 5a01, resource for PSSCH for 5a05 and resource for PSFCH 5a03. The sidelink slot has 14 symbols which are indexed from 0 to 13. The resource for PSCCH, i.e., physical layer sidelink control channel, 1601 occupies one or more resource blocks on symbols 0, 1 and 2. The resource for PSSCH, i.e., physical layer data channel, 1602 occupies one or more resource blocks on symbols 0, 1, 2, 3, 4, 5, 6, 7, 8, 9, 10, 11, and 12. On symbols 0, 1 and 2, the resource for PSCCH and the resource for PSSCH are FDMed multiplexed and the resources occupy different PRBs (resource blocks); The resource for PSSCH and resource for PSCCH can occupy different number of resource blocks (PRBs) and different frequency domain location. Symbol 13 1612 is left empty for no transmission and the symbol 10 1611 can be used as the GAP to accommodate the different arrival time of different UE's transmission and also the transition between Tx and Rx.

In one embodiment, the resource of PSFCH resource in one sidelink slot can be partitioned into one or more PSFCH subchannel and one UE can choose one PSFCH subchannel to transmit sidelink feedback information (for example ACK/NACK for adaptive HARQ, CSI feedback).

In one example, the resource of PSFCH in one sidelink slot can be partitioned into one or more PSFCH subchannels in a frequency domain and the PSFCH subchannels occupy different resource blocks within PSFCH resource. In one example, the resource of PSFCH in one sidelink slot can be partitioned into one more PSFCH subchannels in both frequency domain and time domain.

Figure 17:
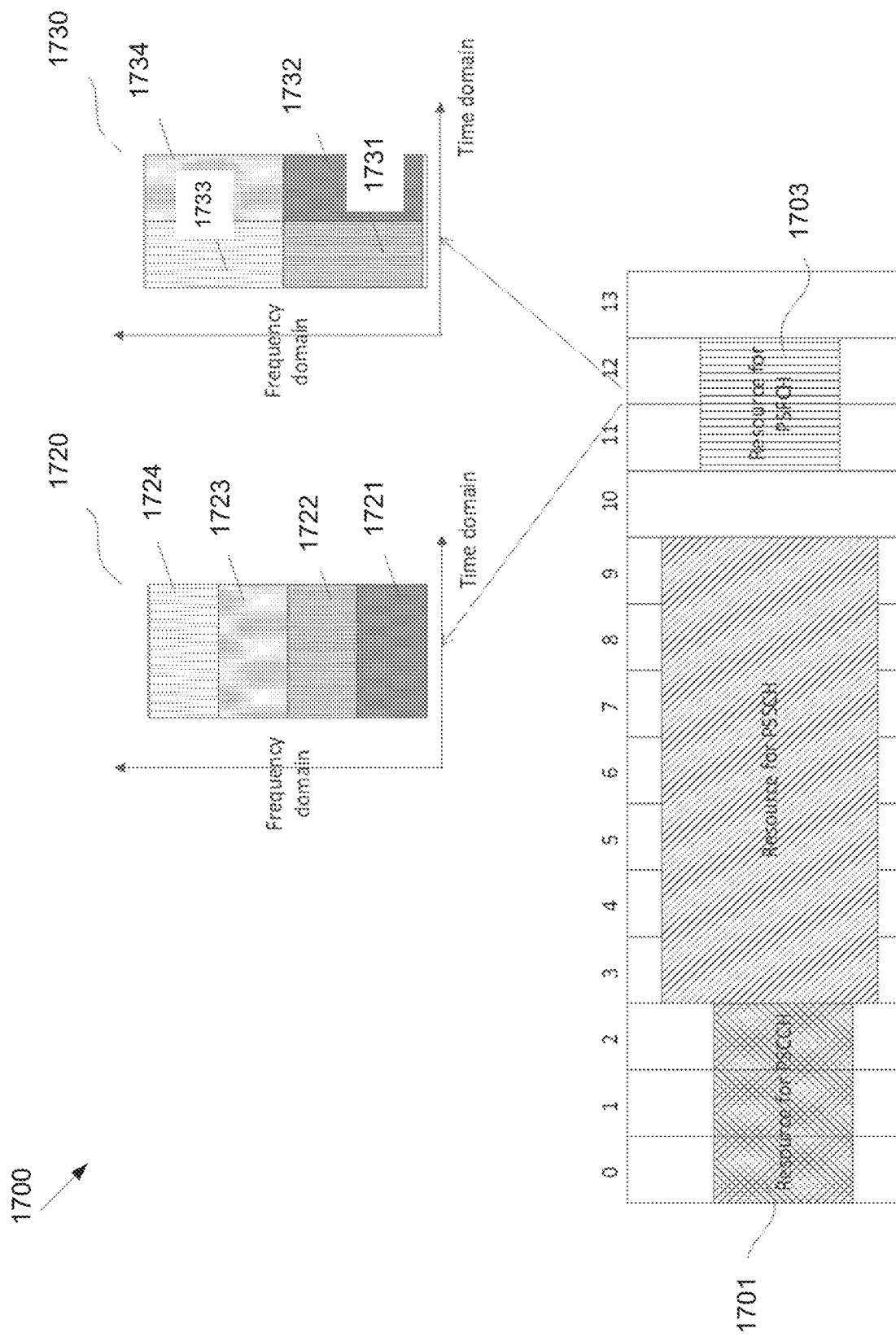
FIG. 17 illustrates yet another example slot configuration for sidelink according to embodiments of the present disclosure.

FIG. 17 illustrates yet another example slot configuration for sidelink 1700 according to embodiments of the present disclosure. The embodiment of the slot configuration for sidelink 1700 illustrated in FIG. 17 is for illustration only. FIG. 17 does not limit the scope of the present disclosure to any particular implementation.

FIG. 17 illustrates a sidelink resource pool design with control channel (PSCCH), data channel (PSSCH) and feedback channel (PSFCH) according to this disclosure.

As shown in FIG. 17, in a sidelink slot, resource for PSFCH 1703 is configured on symbol 11s and 12. And the resource for PSFCH 1703 can be partitioned into one or more PSFCH subchannels. In one example, resource for PSFCH 1703 can be partitioned into four PSFCH subchannel 1720 in frequency domain. A first subchannel 1721 occupies the first N1 (for example N1=1, 2, 4, 6, 8 . . . ) PRBs in resource for PSFCH 5a03, and a second subchannel 1722 occupies the second N1 PRBs in resource for PSFCH 1703, and a third subchannel 1723 occupies the third N1 PRBs in resource for PSFCH 1703 and a fourth subchannel 1724 occupies the forth N1 PRBs in resource for PSFCH 1703.

In one example, resource for PSFCH 1703 can be partitioned into four PSFCH subchannels 1730 in frequency domain and time domain. As shown in FIG. 17, a first subchannel 1731 occupies first N2 (for example N2=1, 2, 4, 6, 8, . . . ) PRBs on symbol 11 in the resource of PSFCH, a second subchannel 1732 occupies first N2 (for example N2=1, 2, 4, 6, 8, . . . ) PRBs on symbol 12 in the resource of PSFCH, a third subchannel 1733 occupies second N2 (for example N2=1, 2, 4, 6, 8, . . . ) PRBs on symbol 11 in the resource of PSFCH and a fourth subchannel 1734 occupies second N2 (for example N2=1, 2, 4, 6, 8, . . . ) PRBs on symbol 12 in the resource of PSFCH.

Basically, there are two options of waveform for sidelink design: CP-OFDM based and single carrier DFT-s-OFDM (or called SC-OFDM). Either of them have advantages and disadvantages. CP-OFDM is good option for multi-antenna transmission and can promote easy implementation of interference cancellation and receiving for MIMO transmission at the receiver UE side. DFT-s-OFDM has better power back off power so that the DFT-s-OFDM can deliver better coverage in the case of coverage distance is limited.

In one embodiment, for a sidelink transmission, the UE can be requested to use DFT-s-OFDM waveform for sidelink control channel, i.e., PSCCH transmission and to use either CP-OFDM or DFT-s-OFDM waveform for sidelink data channel, i.e., PSSCH transmission. Each PSSCH transmission can be indicated by one SCI (sidelink control information) transmitted in PSCCH. The waveform used by one PSSCH transmission can indicated through the corresponding SCI that indicates the transmission of that PSSCH.

In one example, a bit-field in the SCI can be used to indicate which waveform is used by the scheduled PSSCH transmission, for example, 1-bit field with value=0 indicates CP-OFDM is used and 1-bit field with value=1 indicates DFT-s-OFDM is used for that PSSCH transmission.

In one example, the waveform of PSSCH can be indicated implicitly through some information bit-field in the SCI. In one example, the waveform of PSSCH can be indicated implicitly through the transmission scheme of the PSSCH, which can be indicated in the corresponding SCI. For example, if single-layer transmission is used in that PSSCH, the UE can assume DFT-s-OFDM waveform is used for that PSSCH transmission, and if the =>2-layer transmission is used in that PSSCH, the UE can assume CP-OFDM waveform is used for that PSSCH transmission.

In one example, the waveform of PSSCH can be indicated implicitly through the type of transmission in that PSSCH. For example, if the transmission in that PSSCH is unicast transmission, the UE can assume CP-OFDM waveform is used for the transmission of that PSSCH. For example, if the transmission in that PSSCH is broadcast transmission, the UE can assume DFT-s-OFDM waveform is used for the transmission of that PSSCH.

In one embodiment, the waveform can be configured as parameter of one sidelink bandwidth part (SL-BWP). In the configuration of one SL-BWP, the UE can be configured with which waveform may be used for PSSCH transmission and which waveform may be used for PSCCH transmission.

In one embodiment, a UE can be configured or pre-configured with one or more sidelink bandwidth parts (can be called SL-BWP). One SL-BWP can configure for the UE to transmit, or to receive, or to transmit and receive. One SL-BWP configured for the UE to transmit can be called as a transmit sidelink bandwidth part (Tx SL-BWP). One SL-BWP configured for the UE to receive can be callused as a receive sidelink bandwidth part (Rx SL-BWP). One SL-BWP configured for the UE to transmit and receive can be call as SL-BWP or Tx-Rx SL-BWP.

In one SL-BWP configured for transmit operation, the UE may select some sidelink resources and transmit his packet when needed. In one SL-BWP configured for a sidelink receive operation, the UE may expect monitor the control information, decode indicated PSSCH, monitor and measured configured reference signals and transmit feedback information (for example HARQ-ACK/NACK feedback for PSSCH).

For each sidelink BWP, the UE can be configured with one or more of the following parameters. In one example, an index of SL-BWP is used to identify one SL-BWP. In one example, an associated geographical zone is provided. The associated geographical zone can be represented by one zone ID to identify one geographical region where that SL-BWP is configured for.

In one example, subcarrier spacing for OFDM or DFT-S-OFDM is used in that SL-BWP, for example the value can be 15 KHz, 30 KHz, 60 KHz, 120 KHz and 240 KHz. In one example, the cyclic prefix is used in that SL-BWP: normal cyclic prefix length or extended cyclic prefix length.

In one example, the frequency domain location and bandwidth of that SL-BWP is provided. In one example, the frequency domain location and bandwidth of that SL-BWP can be provided by the starting PRB location and the number of contiguous PRBs contained in that SL-BWP. In one example, a set of sidelink resource pools is configured in that SL-BWP.

In one example, the QoS level of traffic associated with this SL-BWP is provide, for example, one SL-BWP can be dedicated for low-latency sidelink traffic and one SL-BWP can be dedicated for non-latency-sensitive traffic. In one instance, one SL-BWP can be configured for safety-related message. In one instance, one SL-BWP can be configured for periodic traffic and one SL-BWP can be configured for aperiodic traffic.

In one example, the transmission mode associated with this SL-BWP is provided. For example, one SL-BWP can be configured for sidelink unicast transmission only and one SL-BWP can be configured for sidelink groupcast and one SL-BWP can be configured for sidelink broadcast transmission.

In one example, the resource allocation mode associated with this SL-BWP is provided. For example, one SL-BWP can be configured for mode 1 sidelink resource allocation, i.e., the sidelink resource is allocated by one serving gNB or eNB. For example, one SL-BWP can be configured for mode 2 sidelink resource allocation, i.e., the sidelink resource is allocated based on a UE-autonomous channel/sidelink signal sensing and detection. For example, one SL-BWP can be configured for both mode 1 and mode 2 resource allocation.

In one example, the resource allocation methods in mode 2 UE-automatous UE selection is provided. The resource allocation method in NR sidelink mode 2 can be categorized into mode 2a, 2b, 2c and 2d. One BWP can be associated with one of those mode 2a, 2b, 2c and 2d.

In one embodiment, the configuration of SL-BWP is associated with the geographical location of one UE and the UE may determine the configuration of SL-BWP according to geographical location of the UE and the carrier frequency.

In one example, the configuration of SL-BWP in one carrier and one particular geographical zone is preconfigured. Then the UE may first determine the zone where the UE is currently located, through for example: $x_1$=Floor (x/L) Mod Nx; $y_1$=Floor (y/W) Mod Ny; and Zone_id=$y_1$*Nx+$x_1$ where L can be the length of one zone; W is the width of one zone; Nx and Ny are two zone length and width Mod values that can be preconfigured; x and y is the geodesic distance in longitude and latitude, respectively, between UE's current location and geographical coordinates (0, 0) according to WGS84 model and the geodesic distance is expressed in meters; then the UE may choose a SL-BWP which includes a zone ID parameter that is same to the Zone_id calculated above.

In one example, one SL-BWP is configured to a UE and that SL-BWP can be used for both transmit and receive on a sidelink. Within that SL-BWP, the UE can be configured with one or more sidelink resource pools. The sidelink resource pool can be configured as Tx resource pool in which the UE may transmit his packet and the sidelink resource pool can be configured as Rx resource pool in which the UE may expect to receive packet from other UEs. Please note that one source pool can be configured as both Tx resource pool and Rx resource pool. In this alternative, that SL-BWP is used for both transmit and receive.

In one embodiment, the sidelink time and frequency resource for one UE can be configured through two aspects: a sidelink bandwidth part (SL-BWP) and a resource pool. The SL-BWP can be used to define the frequency location and width of the bandwidth, numerology (subcarrier spacing and cyclic prefix length) for the resource pool and the time location including the index of slots and symbols can be defined in resource pool. In other word, SL-BWP can be part of configuration for a sidelink resource pool.

In one embodiment, a special sidelink BWP can be configured for sidelink synchronization signal and sidelink PBCH transmission and reception so that different numerologies for synchronization signal/sidelink PBCH transmission and for the transmission of PSSCH, PSCCH and sidelink feedback channels may be used. Furthermore, the UE can assume narrower bandwidth for the transmission or reception of sidelink synchronization signals and sidelink PBCH signal to save power.

In one embodiment of in-coverage operation for a sidelink, the gNB can allocate sidelink resource to a UE for the transmission on the sidelink. The gNB can configure or indicate one SL-BWP for one UE to transmit. The gNB can also configure or indicate one SL-BWP for one UE to receive the sidelink transmission sent by other sidelink UEs.

In one embodiment, the gNB can configure one or more SL-BWP to one UE through higher layer signaling. And then the gNB can configure and indicate one UE to use on SL-BWP for transmission and/or reception.

In one embodiment, the gNB can use higher layer signaling (for example RRC signaling or MAC-CE signaling) to activate or deactivate one SL-BWP for one UE to sidelink transmission. And then the gNB can send one DCI format to the UE to schedule a transmission on sidelink. When receiving the DCI format scheduling sidelink transmission, the UE can be requested to transmit on the sidelink resource in activated SL-BWP. In the activated SL-BWP for sidelink transmission, the UE can also be requested to detect and receive sidelink feedback (e.g., HARQ-ACK/NACK, sidelink CSI) in the same SL-BWP.

In one embodiment, the gNB can include an ID of SL-BWP in the DCI format that schedules sidelink transmission for a UE. When receiving the DCI, the UE may be requested to use the resource in the indicated SL-BWP for his transmission. In one example the gNB can include a ID of SL-BWP and a ID of sidelink carrier in one DCI format that schedules sidelink transmission for a UE. The ID of SL-BWP and the ID of sidelink carrier in that DCI format indicates in which sidelink carrier and in which sidelink BWP the UE is scheduled for sidelink transmission.

In one embodiment, the gNB can use higher layer signaling (for example RRC signaling or MAC-CE signaling) to activate or deactivate one SL-BWP for one UE for sidelink reception. When one SL-BWP is activated for sidelink reception to one UE, the UE can be requested to monitor and detect PSCCH in the activated SL-BWP and then decode scheduled PSSCH accordingly. In an activated SL-BWP for sidelink reception, the UE can be requested to transmit sidelink feedback, e.g., HARQ-ACK/NACK for PSSCH received from the same SL-BWP.

In one embodiment, the gNB can use higher layer signaling (for example RRC signaling or MAC-CE signaling) to activate or deactivate one SL-BWP for one UE for sidelink transmission and reception. And then the gNB can send one DCI format to the UE to schedule a transmission on sidelink. When receiving the DCI format scheduling sidelink transmission, the UE can be requested to transmit on the sidelink resource in activated SL-BWP. When on SL-BWP is activated for sidelink transmission and reception, the UE can be requested to transmit on that SL-BWP as indicated and also monitor and detect PSCCH in the activated SL-BWP and then decode scheduled PSSCH accordingly. In the activated SL-BWP, the UE can also be requested to transmit and receive sidelink feedback, e.g., HARQ-ACK/NACK for PSSCH received from the same SL-BWP.

The gNB can use one DCI format to schedule the UE to receive some transmission on one SL-BWP. In one example, the gNB can send one DCI format X1 to a first UE to indicate a first UE to receive one transmission on sidelink and in the DCI format X1, a ID of SL-BWP can be included to indicate the SL-BWP where the a first UE are requested to receive the scheduled transmission. In one example, the DCI format X1 can include a ID of SL-BWP and a ID of sidelink carrier to indicate in which sidelink carrier and in which SL-BWP the a first UE can be requested to receive the sidelink transmission.

A UE can be configured (or preconfigured) with some sidelink resource grants and then the UE can use those configured sidelink grants for sidelink transmission. In one embodiment, a UE can be first configured with a set of sidelink resources, including the slot locations (e.g., a parameter of slot offset and a parameter of slot periodicity), the symbols and frequency domain location of resource allocation in each allocated slot, the MCS level, the transmission scheme (for example, number of layers, multi-antenna transmission scheme), sidelink DM-RS signal configuration.

Then the UE can transmit on those granted sidelink resources until re-configuration. In another example, the UE can be configured with sidelink resource grant through higher layer signaling but the UE may wait for gNB's activation/deactivation signaling to start or stop using that granted sidelink resource. When the UE receives activation from the gNB (for example, one MAC-CE message to activate one sidelink resource grant, or one DCI format to activate one sidelink resource grant), then UE can be request to start use the activated sidelink resource grant for sidelink transmission. When the UE receives deactivation from the gNB for one granted sidelink resource, the UE can be requested using the deactivated sidelink resource grant for sidelink transmission.

A UE can be configured (or preconfigured) with some sidelink resource grants and then the UE can use those configured sidelink grants for a sidelink reception. In one embodiment, a UE can be first configured with a set of sidelink resources, including the slot locations (e.g., a parameter of slot offset and a parameter of slot periodicity), the symbols and frequency domain location of resource allocation in each allocated slot, the MCS level, the transmission scheme (for example, number of layers, multi-antenna transmission scheme), sidelink DM-RS signal configuration.

Then the UE can detect PSCCH and then indicated PSSCH on those granted sidelink resources until re-configuration. In another example, the UE can be configured with sidelink resource grant through higher layer signaling but the UE may wait for gNB's activation/deactivation signaling to start or stop monitoring that granted sidelink resource. When the UE receives activation from the gNB (for example, one MAC-CE message to activate one sidelink resource grant, or one DCI format to activate one sidelink resource grant), then UE can be requested to start use the activated sidelink resource grant for sidelink reception. When the UE receives deactivation from the gNB for one granted sidelink resource, the UE can be requested using the deactivated sidelink resource grant for sidelink reception.

In other word, the aforementioned embodiments and example for the sidelink resource grant can be called semi-persistent sidelink resource allocation and grant-free sidelink resource allocation, respectively.

Regarding the configuration and operation on granted sidelink resource with related with a sidelink BWP operation, there can be a few alternatives.

In one embodiment, the granted sidelink resource is configured per SL-BWP. In other word, within one SL-BWP, the UE can be configured with one or more sidelink resource grant.

In another embodiment, the granted sidelink resource is configured independently from the SL-BWP configuration. The UE can be configured with one or more sidelink resource grant. When the sidelink resource grant is activated, the UE may assume the granted sidelink resource happens in the currently activated SL-BWP and then use the corresponding sidelink resource for transmission and/or receive.

When the active SL-BWP is switched, the UE needs to deal with one activated sidelink resource grant. In one example, when the active SL-BWP is switched, the UE can be requested to assume the activated sidelink resource grant is also deactivated and thus cease the operation on that sidelink resource grant. In one example, when the active SL-BWP is switched, the UE can be requested to assume an activated sidelink resource grant may be moved from the previous SL-BWP to the new activated SL-BWP and the UE can continue to assume that sidelink resource grant is activated and continue to use until the sidelink resource grant is deactivated or re-configured.

When a UE is out-of-coverage, the UE can be pre-configured with one or more SL-BWPs for sidelink transmission and one or more SL-BWPs for sidelink receive.

In one embodiment, in one carrier, the UE can be configured to monitor and detect PSSCH and then decode scheduled PSSCH in all the configured SL-BWPs configured for sidelink receive.

In one embodiment, in one carrier, the UE can be configured with one or more SL-BWPs for sidelink transmission and then each SL-BWP for sidelink transmission is associated with traffic type: periodic or aperiodic traffic. And then the UE can select one SL-BWP for transmission based on the traffic type of each incoming packet. If the incoming packet is periodic traffic, the UE may choose the SL-BWP associated with periodic traffic and if the incoming packet is aperiodic traffic, the UE may choose the SL-BWP associated with aperiodic traffic.

In one embodiment, in one carrier, the UE can be configured with one or more SL-BWPs for sidelink transmission and then each SL-BWP for sidelink transmission is associated with transmission type: unicast, groupcast, or broadcast. And then the UE can select one SL-BWP for transmission based on the transmission type of each incoming packet. If the incoming packet is unicast transmission, the UE may choose the SL-BWP associated with unicast transmission and if the incoming packet is groupcast transmission, the UE may choose the SL-BWP associated with groupcast transmission, and if the incoming packet is broadcast transmission, the UE may choose the SL-BWP associated with broadcast transmission.

In one embodiment, in one carrier, the UE can be configured with one or more SL-BWPs for sidelink transmission and then one SL-BWP for sidelink transmission is associated with the transmission of basic road safety messages. If the packet is for basic road safety message, the UE may choose the SL-BWP associated with that type of message.

In one example, in one carrier, the UE can be configured with one or more SL-BWPs for sidelink transmission and/or receive. One SL-BWP can be associated with the V2X services of low latency. If the packet is low-latency traffic, the UE may choose the SL-BWP associated low latency service to transmit those packets. This design is useful for supporting low latency service in V2X. To achieve low latency, a larger subcarrier spacing for shorter symbol and thus shorter slot length are selected. However, choosing larger subcarrier spacing might not be optimal for non-latency-sensitive services due to larger overhead of cyclic prefix. Thus the low-latency services and non-latency-sensitive services can be split into different SL-BWPs where different subcarrier spacing can be used for optimal implementation.

In one example, in one carrier, the UE can be configured with one or more SL-BWPs for sidelink transmission and/or receive. Each SL-BWP can be associated with sidelink QoS (quality of service) level (or called priority level) for sidelink traffic. And then the UE can be requested to choose SL-BWP for sidelink communication based on the QoS level (or priority level) of each packet to be transmitted. In one example, packets with low-latency and non-low-latency can be assigned with different QoS levels or priority levels. And then the packets are transmitted in corresponding SL-BWP with configured numerology that is optimized for corresponding traffic QoS or priority.

One sidelink TTI is the duration of a transmission on the sidelink. For example, in LTE, one sidelink TTI is one subframe, where the length of one subframe is 1 ms and 14 symbols with subcarrier spacing=15 KHz are contained in one subframe, i.e., one sidelink TTI. In NR V2X, it may be defined that sidelink TTI and each sidelink TTI can contain some given time length. A sidelink TTI can also be called a sidelink slot.

Figure 18:
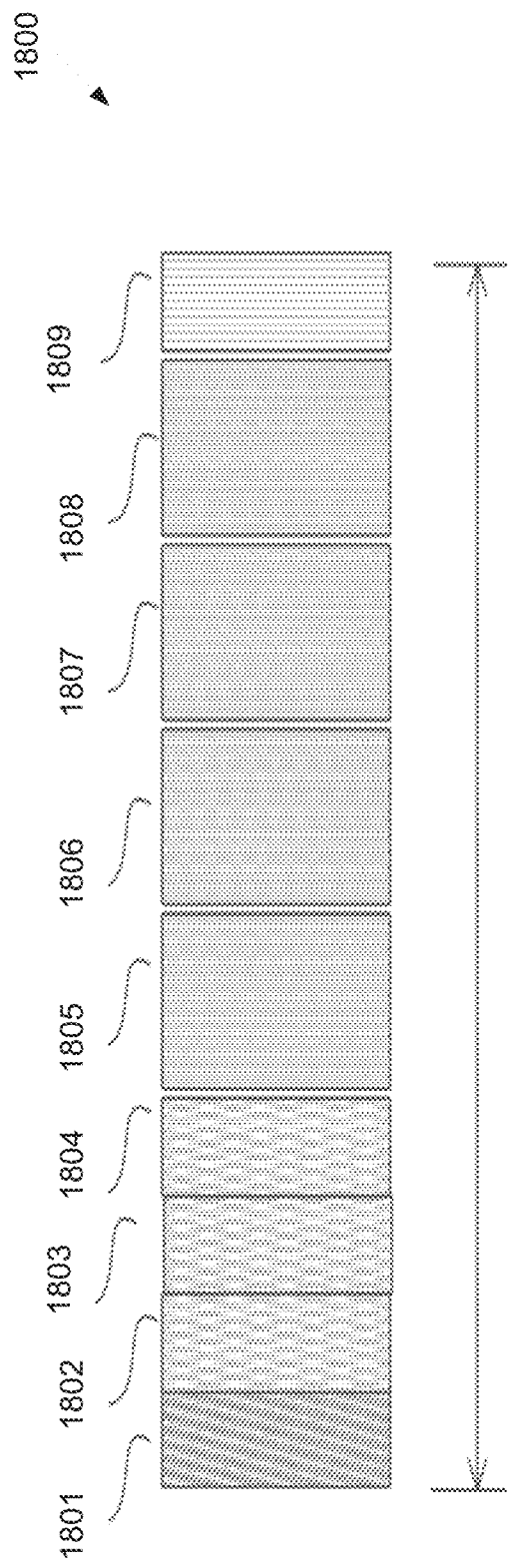
FIG. 18 illustrates an example gap symbol and AGC symbol according to embodiments of the present disclosure.

FIG. 18 illustrates an example gap symbol and AGC symbol 1800 according to embodiments of the present disclosure. The embodiment of the gap symbol and AGC symbol 1800 illustrated in FIG. 18 is for illustration only. FIG. 18 does not limit the scope of the present disclosure to any particular implementation.

In one embodiment, a sidelink TTI can contains one or more OFDM or DFT-s-OFDM symbol with two different numerologies, for example, subcarrier spacing and cyclic prefix length. An example is shown in FIG. 18. A side link TTI can be partitioned into a few sub time duration. In the first time duration 1801, a signal is transmitted. In each time duration of the 1802, 1803, 1804, an OFDM (or DFT-s-OFDM) symbol with subcarrier spacing=a first subcarrier spacing and cyclic prefix length=a first cyclic prefix length is transmitted and in each time duration of the 1805, 1806, 1807, and 1808, a OFDM symbol (or DFT-s-OFDM symbol) with subcarrier spacing=a second subcarrier spacing and cyclic prefix length=a second cyclic prefix length is transmitted, where a first subcarrier spacing can be different from a second subcarrier spacing and a first cyclic prefix can be different from a second cyclic prefix length. The time duration 1809, which is the last time duration in 1800 can be used as gap duration.

Such design can enable flexible sidelink TTI partition in different environment and AGC requirement. For example, the AGC requirement time is only 15 us but one symbol length would be 71 us with 15 KHz subcarrier spacing. Using one whole symbol for AGC is big time resource waste. In NR, subcarrier spacing 15 KHz, 30 KHz and 60 KHz are used in FR1 (frequency range 1). A few examples of sidelink TTI or sidelink slot designs may be provided. Such design can also enable flexible sidelink TTI partition for different AGC requirement and GAP requirement. In the example of FIG. 18, the symbol (first time duration 1801) can be used for gap symbols and the symbol 1802 can be used for AGC symbol.

Figure 19:
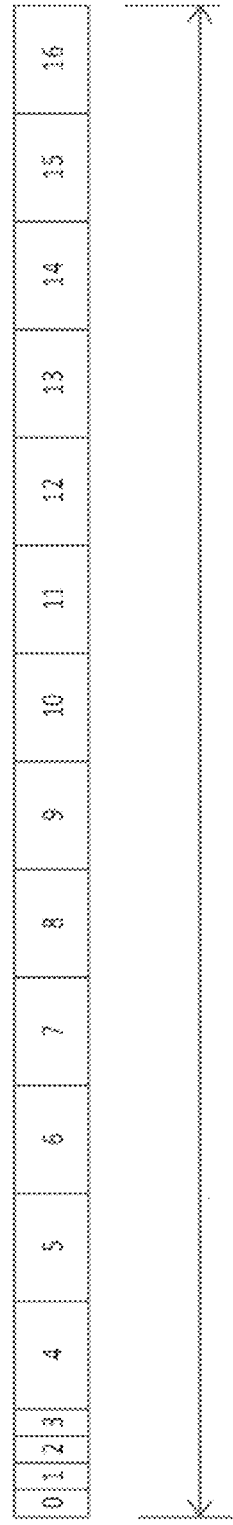
FIG. 19 illustrates an example sidelink TTI according to embodiments of the present disclosure.

FIG. 19 illustrates an example sidelink TTI 1900 according to embodiments of the present disclosure. The embodiment of the sidelink TTI 1900 illustrated in FIG. 19 is for illustration only. FIG. 19 does not limit the scope of the present disclosure to any particular implementation.

One example is a sidelink TTI or slot length is 1 ms. 15 KHz and 60 KHz are used in each TTI. Example is shown in FIG. 19. A TTI length is 1 ms and is partitioned into 17 symbols. Symbol 0 is for AGC signal and the length can be ~17.7 us and symbols 1, 2 and 3 are OFDM symbol (or DFT-s-OFDM) symbol using subcarrier spacing=60 KHz, where the each symbol length (including cyclic prefix length) is ~17.7 us. The symbols 4~15 are OFDM symbols (or DFT-s-OFDM symbols) using subcarrier spacing=15 KHz, where each symbol length (including cyclic prefix length) is ~71 us. The last symbol 16 is used as gap symbol. Here there may be other alternative designs: for example, symbol 4 can also be further partitioned into 4 sub symbols and each sub symbol uses 60 KHz subcarrier spacing and the length of each sub symbol is ~17.7 us, and can be extended to symbol 5, 6, . . . . In another example, symbol 1 can be used for AGC signal or AGC purpose and symbol 0 is left empty for the purpose of GAP symbol and symbol 16 can be used for normal data or control data transmission.

Figure 20:
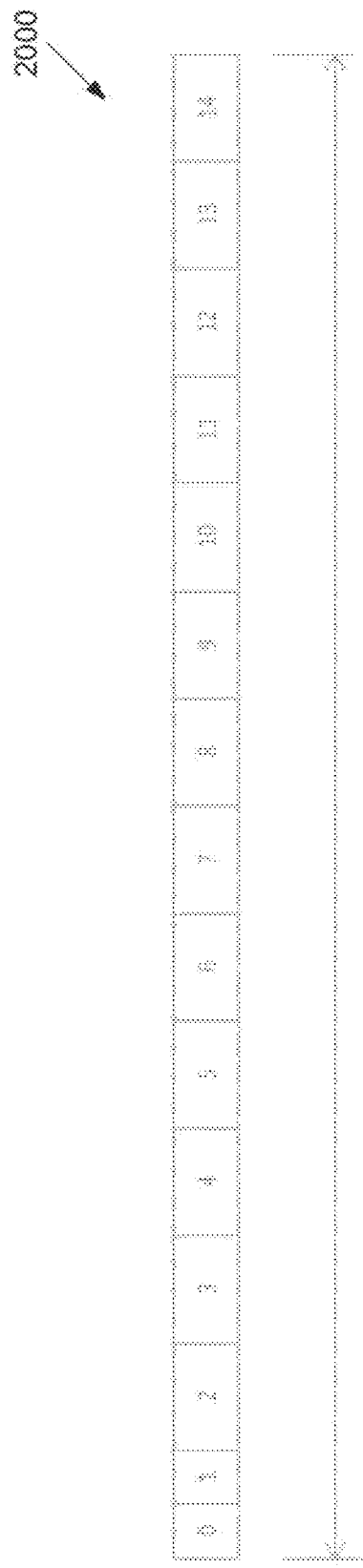
FIG. 20 illustrates another example sidelink TTI according to embodiments of the present disclosure.

FIG. 20 illustrates another example sidelink TTI 2000 according to embodiments of the present disclosure. The embodiment of the sidelink TTI 2000 illustrated in FIG. 20 is for illustration only. FIG. 20 does not limit the scope of the present disclosure to any particular implementation.

One example is a sidelink TTI or slot length is 0.5 ms. 30 KHz and 60 KHz are used in each TTI. Example is shown in FIG. 20. A TTI length is 0.5 ms and is partitioned into 15 symbols. Symbol 0 is for AGC signal and the length can be ~17.7 us and symbol 1 is OFDM symbol (or DFT-s-OFDM) symbol using subcarrier spacing=60 KHz, where the each symbol length (including cyclic prefix length) is ~17.7 us. The symbols 2~13 are OFDM symbols (or DFT-s-OFDM symbols) using subcarrier spacing=30 KHz, where the each symbol length (including cyclic prefix length) is ~35.7 us. The last symbol 14 is used as gap symbol. In another example, symbol 1 can be used for AGC signal or AGC purpose and symbol 0 is left empty for the purpose of GAP symbol and symbol 16 can be used for normal data or control data transmission.

One example is a sidelink TTI or slot length is 1 ms. 15 KHz and 30 KHz are used in each TTI. Example is shown in FIG. 20. A TTI length is 1 ms and is partitioned into 15 symbols. Symbol 0 is for AGC signal and the length can be ~35.7 us and symbol 1 is OFDM symbol (or DFT-s-OFDM) symbol using subcarrier spacing=30 KHz, where the each symbol length (including cyclic prefix length) is ~35.7 us. The symbols 2~13 are OFDM symbols (or DFT-s-OFDM symbols) using subcarrier spacing=15 KHz, where the each symbol length (including cyclic prefix length) is ~71 us. The last symbol 14 is used as gap symbol. In another example, symbol 1 can be used for AGC signal or AGC purpose and symbol 0 is left empty for the purpose of GAP symbol and symbol 16 can be used for normal data or control data transmission.

Figure 21:
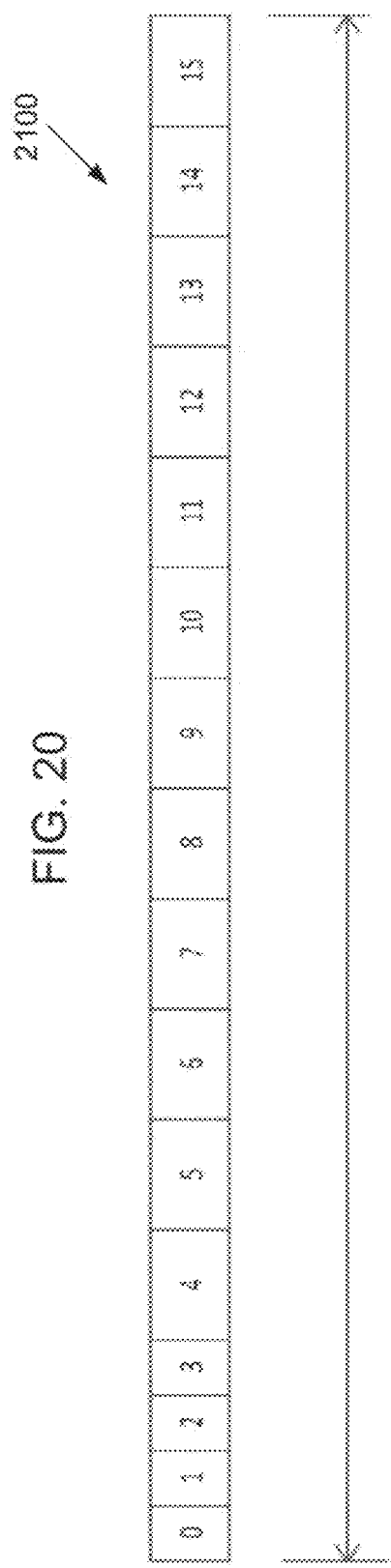
FIG. 21 illustrates yet another example sidelink TTI according to embodiments of the present disclosure.

FIG. 21 illustrates yet another example sidelink TTI 2100 according to embodiments of the present disclosure. The embodiment of the sidelink TTI 2100 illustrated in FIG. 21 is for illustration only. FIG. 21 does not limit the scope of the present disclosure to any particular implementation.

One example is a sidelink TTI or slot length is 1 ms. 15 KHz and 30 KHz are used in each TTI. Example is shown in FIG. 21. A TTI length is 1 ms and is partitioned into 16 symbols. Symbols 0~3 use length ~35.7 us, which corresponding to subcarrier spacing 30 KHz and symbols 4~15 uses subcarrier spacing=15 KHz, where the each symbol length (including cyclic prefix length) is ~71 us. In one example, the symbol 0 can be used for AGC purpose. In another example, symbol 1 can be used for AGC signal or AGC purpose and symbol 0 is left empty for the purpose of GAP symbol. In the design of FIG. 21, there can be another example of a sidelink TTI of slot length is 0.5 ms and 30 KHa and 60 KHz are used in each TTI. TTI 1130 length is 0.5 ms and is partitioned into 19 symbols. Symbols 0~3 use length ~17.7 us, which corresponding to subcarrier spacing 60 KHz and symbols 4~15 uses subcarrier spacing=30 KHz, where the each symbol length (including cyclic prefix length) is ~35.7 us.

In one embodiment, the resource configured for PSFCH can be partitioned into one or multiple PSFCH subchannels. A UE can choose one PSFCH subchannel to transmit the for example ACK/NACK feedback for one previously received data transmission.

Figure 22:
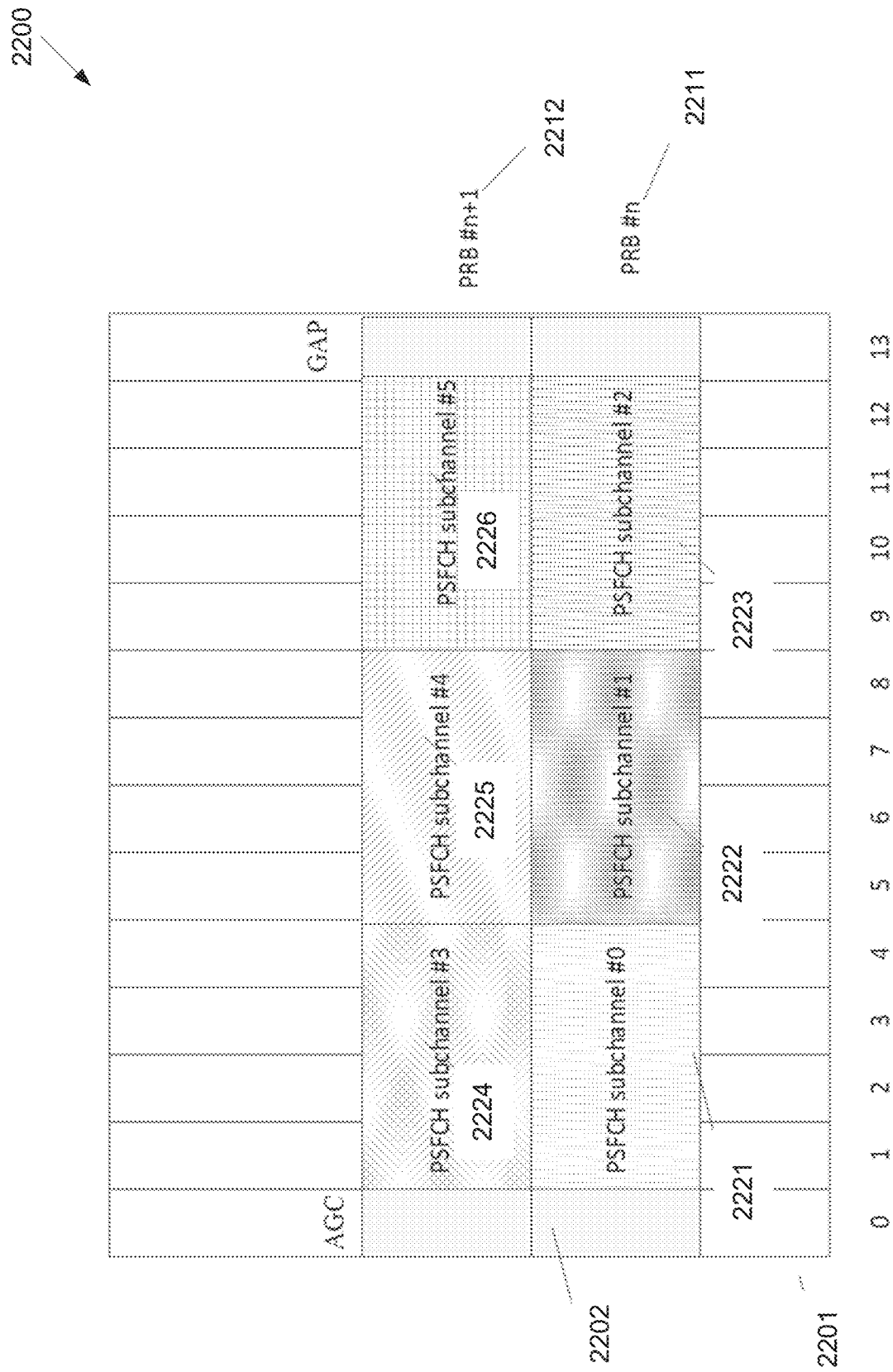
FIG. 22 illustrates an example PSFCH subchannel configuration according to embodiments of the present disclosure.

FIG. 22 illustrates an example PSFCH subchannel configuration 2200 according to embodiments of the present disclosure. The embodiment of the PSFCH subchannel configuration 2200 illustrated in FIG. 22 is for illustration only. FIG. 22 does not limit the scope of the present disclosure to any particular implementation.

As shown in FIG. 22, in one slot 2201, a resource zone for PSFCH 2202 is configured. PFSCH resource zone 2202 occupies two PRBs 2211 and 2212. In other words, the PFSCH resource 2202 has starting PRB location 2211 and the number of PRBs is two. PSFCH resource zone 2202 is further partitioned into six PSFCH subchannels 2221~2226. PSFCH subchannel #0 2221 occupies symbols 1~4 and PRB #n 2211. PSFCH subchannel #1 2222 occupies symbols 5~8 and PRB #n 2211. PSFCH subchannel #2 2223 occupies symbols 9~12 and PRB #n 2211. PSFCH subchannel #3 2224 occupies symbols 1~4 and PRB #n+1 2212. PSFCH subchannel #4 2225 occupies symbols 5~8 and PRB #n+1 2212 and PSFCH subchannel #5 2226 occupies symbols 9~13 and PRB #n+1 2212. The symbol 0 is skipped for AGC function and the symbol 13 is skipped as guard interval for the purpose of time alignment.

In one PSFCH subchannel, one UE can transmit some feedback information, for example, a NACK/ACK feedback for one corresponding PSSCH transmission. The PSFCH subchannel design may be able to support reliable transmission in high velocity movement. A few embodiments for one PSFCH subchannel are presented in the following sections.

Figure 23:
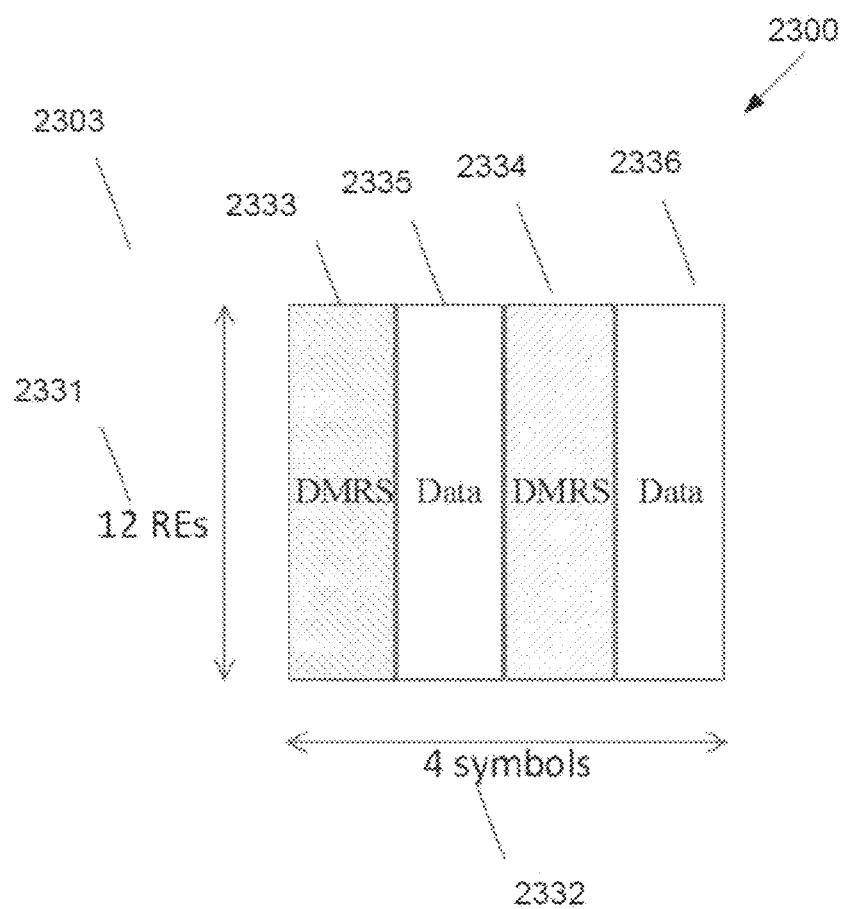
FIG. 23 illustrates an example PSFCH subchannel design according to embodiments of the present disclosure.

FIG. 23 illustrates an example PSFCH subchannel design 2300 according to embodiments of the present disclosure. The embodiment of the PSFCH subchannel design 2300 illustrated in FIG. 23 is for illustration only. FIG. 23 does not limit the scope of the present disclosure to any particular implementation. FIG. 23 illustrates one PSFCH subchannel design according to this disclosure.

As shown in FIG. 23, one PSFCH subchannel 2303 occupies 4 OFDM symbols 2332 in time domain and 12 RE (resource element) 2331 in frequency domain. The first OFDM symbol 2333 ad third OFDM symbol 2334 in the PSFCH subchannel can be used to transmit DMRS signals and the second OFDM symbol 2335 and the forth OFDM symbol 2336 in the PSFCH subchannel can be used to transmit PSCH data signal. Such design of PSFCH channel enables the receiver UE to measure and compensate large frequency rotation and offset due to high velocity in V2X communication.

Figure 24:
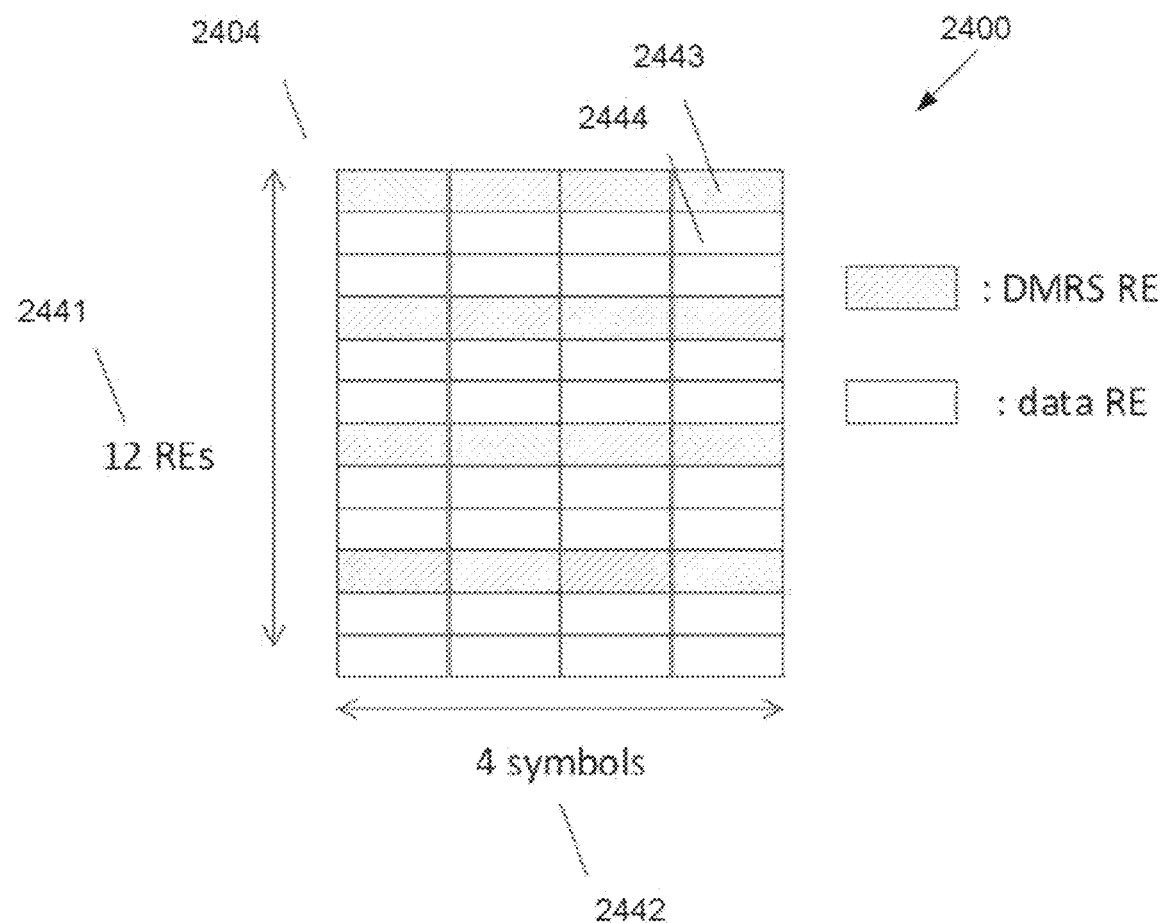
FIG. 24 illustrates another example PSFCH subchannel design according to embodiments of the present disclosure.

FIG. 24 illustrates another example PSFCH subchannel design 2400 according to embodiments of the present disclosure. The embodiment of the PSFCH subchannel design 2400 illustrated in FIG. 24 is for illustration only. FIG. 24 does not limit the scope of the present disclosure to any particular implementation. FIG. 24 illustrates PSFCH subchannel design according to this disclosure.

As shown in FIG. 24, one PFSCH subchannel 2404 can occupy 4 symbols 2442 in time domain and 12 Res 2441 in frequency domain. On each symbol, some Res are used as DM-RS and the other REs 2444 can be used to transmit data signals. The advantage of this design is all 4 symbols have DM-RS so that the receiver UE has a better estimation of frequency offset.

Figure 25:
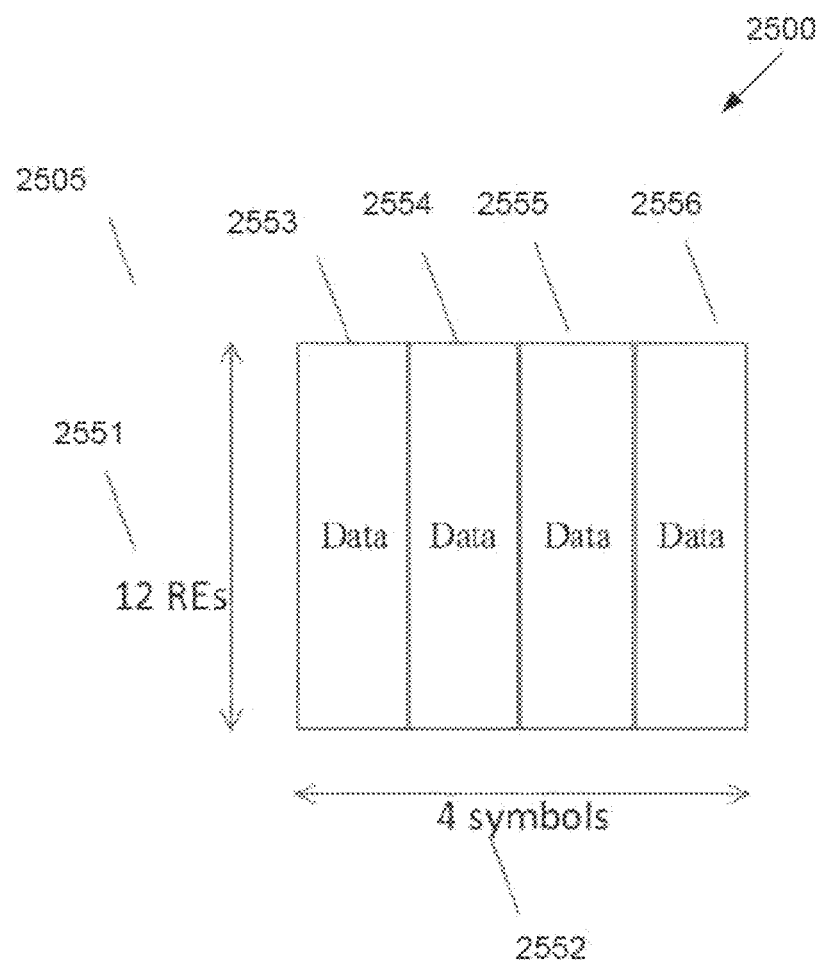
FIG. 25 illustrates yet another example PSFCH subchannel design according to embodiments of the present disclosure.

FIG. 25 illustrates yet another example PSFCH subchannel design 2500 according to embodiments of the present disclosure. The embodiment of the PSFCH subchannel design 2500 illustrated in FIG. 25 is for illustration only. FIG. 25 does not limit the scope of the present disclosure to any particular implementation. FIG. 25 illustrates PSFCH subchannel design according to this disclosure.

As shown in FIG. 25, one PFSCH subchannel 2505 can occupy 4 symbols 2552 in time domain and 12 REs 2551 in frequency domain. All 48 REs in one PFSCH subchannel can be used to transmit feedback data signal.

Figure 26:
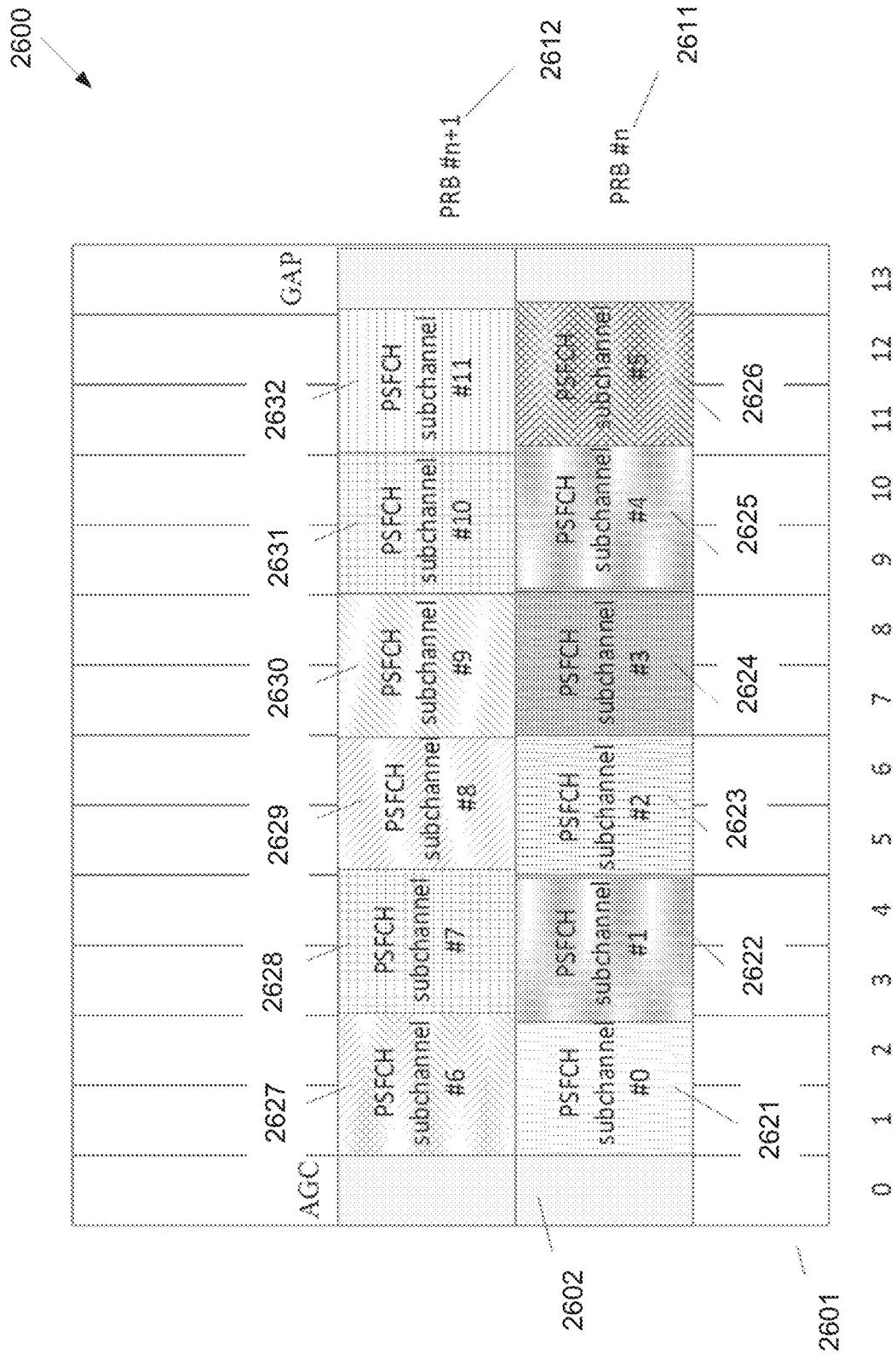
FIG. 26 illustrates an example PSFCH subchannel configuration according to embodiments of the present disclosure.

FIG. 26 illustrates an example PSFCH subchannel configuration 2600 according to embodiments of the present disclosure. The embodiment of the PSFCH subchannel configuration 2600 illustrated in FIG. 26 is for illustration only. FIG. 26 does not limit the scope of the present disclosure to any particular implementation. FIG. 26 illustrates a PSFCH subchannel configuration according to this disclosure.

As shown in FIG. 26, in one slot 2601, a resource zone for PSFCH 2602 is configured. A PFSCH resource zone 2602 occupies two PRBs 2611 and 2612. In other words, the PFSCH resource pool 2602 has starting PRB location 2611 and the number of PRBs is two. PSFCH resource zone 2602 (PSFCH resource pool) is further partitioned into 12 PSFCH subchannels 2621~2632.

In one example, a PSFCH subchannel #0 2621 occupies symbols 1~2 and PRB #n 2611. PSFCH subchannel #1 2622 occupies symbols 3~4 and PRB #n 2611. A PSFCH subchannel #2 2623 occupies symbols 5~6 and PRB #n 2611. A PSFCH subchannel #3 2624 occupies symbols 7~8 and PRB #n 2611. A PSFCH subchannel #4 2625 occupies symbols 9~10 and PRB #n 2611. A PSFCH subchannel #5 2626 occupies symbols 11~12 and PRB #n 2611.

In one example, a PSFCH subchannel #6 2627 occupies symbols 1~2 and PRB #n+1 2612. A PSFCH subchannel #7 2628 occupies symbols 3~4 and PRB #n+1 2612 and a PSFCH subchannel #8 2629 occupies symbols 5~6 and PRB #n+1 2612. A PSFCH subchannel #9 2630 occupies symbols 7~8 and PRB #n+1 2612. A PSFCH subchannel #10 2631 occupies symbols 9~10 and PRB #n+1 2612 and a PSFCH subchannel #11 2632 occupies symbols 11~12 and PRB #n+1 2612.

In one example, the symbol 0 is skipped for AGC function and the symbol 13 is skipped as guard interval for the purpose of time alignment.

FIG. 27 illustrates another example PSFCH subchannel configuration 2700 according to embodiments of the present disclosure. The embodiment of the PSFCH subchannel configuration 2700 illustrated in FIG. 27 is for illustration only. FIG. 27 does not limit the scope of the present disclosure to any particular implementation. FIG. 27 illustrates one PSFCH subchannel design according to this disclosure.

As shown in FIG. 27, one PSFCH subchannel 2703 occupies 2 OFDM symbols 2742 in time domain and 12 RE (resource element) 2741 in frequency domain. The first OFDM symbol 2743 in the PSFCH subchannel can be used to transmit DMRS signals and the second OFDM symbol 2744.

FIG. 28 illustrates yet another example PSFCH subchannel configuration 2800 according to embodiments of the present disclosure. The embodiment of the PSFCH subchannel configuration 2800 illustrated in FIG. 28 is for illustration only. FIG. 28 does not limit the scope of the present disclosure to any particular implementation. FIG. 28 illustrates a PSFCH subchannel design according to this disclosure.

As shown in FIG. 28, one PFSCH subchannel 2805 can occupy 2 symbols 2852 in a time domain and 12 Res 2851 in a frequency domain. On each symbol, some REs 2853 are used as DM-RS and the other REs 2854 can be used to transmit data signals. The advantage of this design is all 2 symbols have DM-RS so that the receiver UE has a better estimation of frequency offset.

Figure 29:
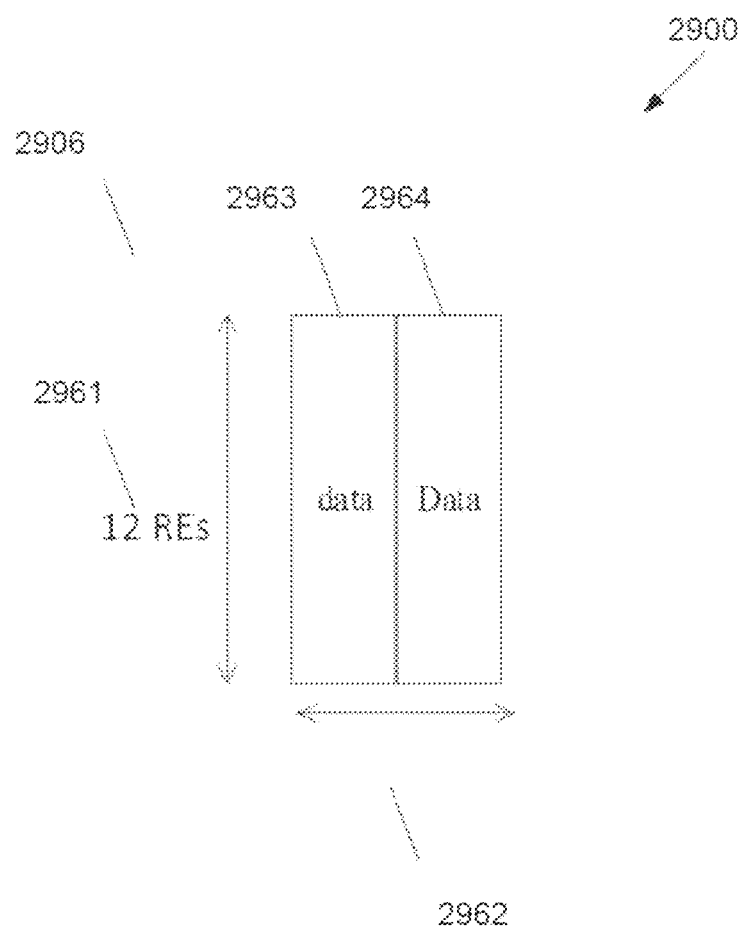
FIG. 29 illustrates yet another example PSFCH subchannel configuration according to embodiments of the present disclosure.

FIG. 29 illustrates yet another example PSFCH subchannel configuration 2900 according to embodiments of the present disclosure. The embodiment of the PSFCH subchannel configuration 2900 illustrated in FIG. 29 is for illustration only. FIG. 29 does not limit the scope of the present disclosure to any particular implementation. FIG. 29 illustrates PSFCH subchannel design according to this disclosure.

As shown in FIG. 29, one PFSCH subchannel 2906 can occupy 2 symbols 2962 in a time domain and 12 REs 2961 in frequency domain. All 24 REs in one PFSCH subchannel can be used to transmit feedback data signal.

In one embodiment, a receiver UE can send signal in one PSFCH subchannel for the NACK/ACK information of one decoded PSSCH according one or more of the following examples.

In one example, the receiver UE can send NACK information in one PSFCH subchannel if the received PSSCH is decoded wrongly and send ACK information in one PSFCH subchannel if the received PSSCH is decoded correctly. This example can be applied to unicast transmission where one receiver UE is the target.

In one example, the receiver UE can send NACK information in one PSFCH subchannel if the received PSSCH is decoded wrongly. If the PSSCH is decoded correctly, the receiver UE does not transmit signal in the associated PSFCH subchannel. This example can be applied to groupcast transmission where multiple receiver UEs are suppose receive one same PSSCH.

In one embodiment, a UE can be configured or preconfigured with the association between a PSCCH resource (or a PSSCH subchannel) and a PSFCH subchannel. In one example, the association between a first PSCCH resource (or PSSCH subchannel) at slot n and a second PSFCH subchannel at slot n+1 (where m can be 0, 1, 2, 3, 4 . . . ) can imply that the receiver UE can send the HARQ feedback for the data transmission scheduled by SA (scheduling assignment) signaling (for example one SCI) in a first PSCCH resource at slot n in a second PSFCH subchannel at slot n+m.

The association between PSCCH resource or a PSSCH transmission and PDSCH subchannel is useful for the receiver UE(s) to correctly identify the physical resource for feedback HARQ-ACK/NACK.

In one example, one SCI can be associated with one PSFCH subchannel. This example is useful for unicast transmission where a number of receiver UEs is single.

In one example, one SCI and the scheduled PSSCH can be associated with more than one PSFCH subchannels. This example is useful for a groupcast transmission where a number of receiver UEs is more than one.

In one example, one SCI and scheduled PSSCH can be associated with two PSFCH subchannels. One receiver UE may determine to transmit which PSFCH subchannel according to the PSSCH decoding result. If the PSSCH is decoded correctly, the receiver UE may transmit ACK in the first of those two PSFCH subchannel and if the PSSCH is not decoded correctly, the receiver UE may transmit NACK in the second of those two PSFCH subchannel In one example, one SCI and scheduled PSSCH can be associated with multiple PSFCH subchannels and each UE can determine to use one of those PSFCH subchannel based on the UE's ID order among the UEs in the receiver UE group.

In one example, one SCI and the scheduled PSSCH can be associated with one PFSCH subchannel. The receiver UE can be requested to transmit ACK in the associated PFSCH subchannel if the PSSCH is decoded correctly but if the PSSCH is not decoded correctly, the receiver UE may not transmit anything in the associated PFSCH subchannel.

In one example, each UE in the receiver group can be assigned with a PFSCH sequence, for example, different cyclic delay shift. Those UE can be allocated with a set of cyclic delay shifts $\{\alpha_1, \alpha_2, \ldots, \alpha_N\}$. And each receiver UE can choose one of those cyclic delay shifts according to a UE index (or ID) order among all the UE in the receiver UE group except the transmitter UE. For example, the receiver UE with the lowest UE ID can choose $\alpha_1$, the receiver UE with the second lowest UE ID can choose $\alpha_2$, . . . . Then for each receiver UE, if each UE decodes the PSSCH correctly, that receiver UE may transmit the ACK sequence with chosen cyclic delay shift $\alpha_n$ in the associated PSFCH subchannel and if the UE does not decode the PSSCH correctly, the receiver UE does not transmit anything in the associated PSFCH subchannel.

In one example, there is a sidelink UE group containing a UE-A, a UE-B, a UE-C, and a UE-D. Each UE is configured with a HARQ-ACK sequence cyclic shift values $\{\alpha_1, \alpha_2, \alpha_3, \alpha_4\}$: the UE-A is configured with $\alpha_1$, the UE-B is configured with $\alpha_2$, the UE-C is configured with $\alpha_3$, and the UE-D is configured with $\alpha_4$. When one UE receives one PSSCH and the PSSCH is decoded correctly, that UE can be requested to transmit the HARQ-ACK sequence with configured cyclic shift value to feedback ACK for that PSSCH. But if that UE does not decode the PSSCH correctly, the UE can be requested to feedback nothing in the associated feedback channel. The time-frequency resource can be configured through the association with PSSCH or PSCCH. For example, the resource location of one SCI or one PSSCH can implicitly indicate the time-frequency resource for a sidelink feedback channel.

In one embodiment, for a UE group for groupcast transmission, all the UE in that UE group can be configured with a cyclic shift value $\alpha_n$ and for one groupcast transmission targeted to that UE group, each receiver UE in that UE group may transmit the HARQ sequence with cyclic shift value $\alpha_n$ if the UE group does not decode PSSCH correctly.

In one example, for the unicast transmission between two UEs, those two UEs can be configured with two cyclic shift value $\alpha_{n1}$ and $\alpha_{n2}$. Then for one unicast transmission between them, the receiver UE may transmit the HARQ feedback with sequence with $\alpha_{n1}$ if the PSSCH is decoded correctly and the receiver UE may transmit the HARQ feedback with sequence with $\alpha_{n2}$ if the PSSCH is not decoded correctly.

In one alternative, a UE can be configured or preconfigured with the association between a PSSCH subchannel and a PSFCH subchannel. The receiver UE and the transmitter UE can calculate the index of PFSCH subchannel based on the index of PSSCH subchannel where the sidelink data is transmitted. In the presented embodiment, PSCCH resource can be replaced with PSSCH resource without changing the design of the embodiments.

In one method, the set of slots that belong to a PSSCH/PSCCH/PSFCH resource pool for a sidelink transmission can be slots $(t_0^{SL}, t_1^{SL}, \ldots, t_{T_{max}}^{SL})$. For the NACK/ACK feedback transmission, a PSCCH resource m (where m=0, 1, 2, 3 . . . ) at slot $t_n^{SL}$ can be associated with a PSFCH subchannel m at slot $t_{n+L}^{SL}$, where the example value of L can be 1, 2, 3, 4, 5, 6, 7, 8, . . . . The value of L can be preconfigured or configured through the system. When a UE transmits one SA (for example SCI) in PSCCH resource m at slot $t_n^{SL}$, the transmitter UE can expect to receive NACK or ACK feedback from PSFCH subchannel m at slot $t_{n+L}^{SL}$, where the NACK/ACK feedback is for the data transmission scheduled by the SA sent in PSCCH resource m at slot $t_n^{SL}$. For one UE, if the UE receives a SA from PSCCH resource m at slot $t_n^{SL}$ and this SA schedules a data transmission, the UE can send NACK or ACK for the scheduled data transmission in PFSCH subchannel m at slot $t_{n+L}^{SL}$.

Figure 30A:
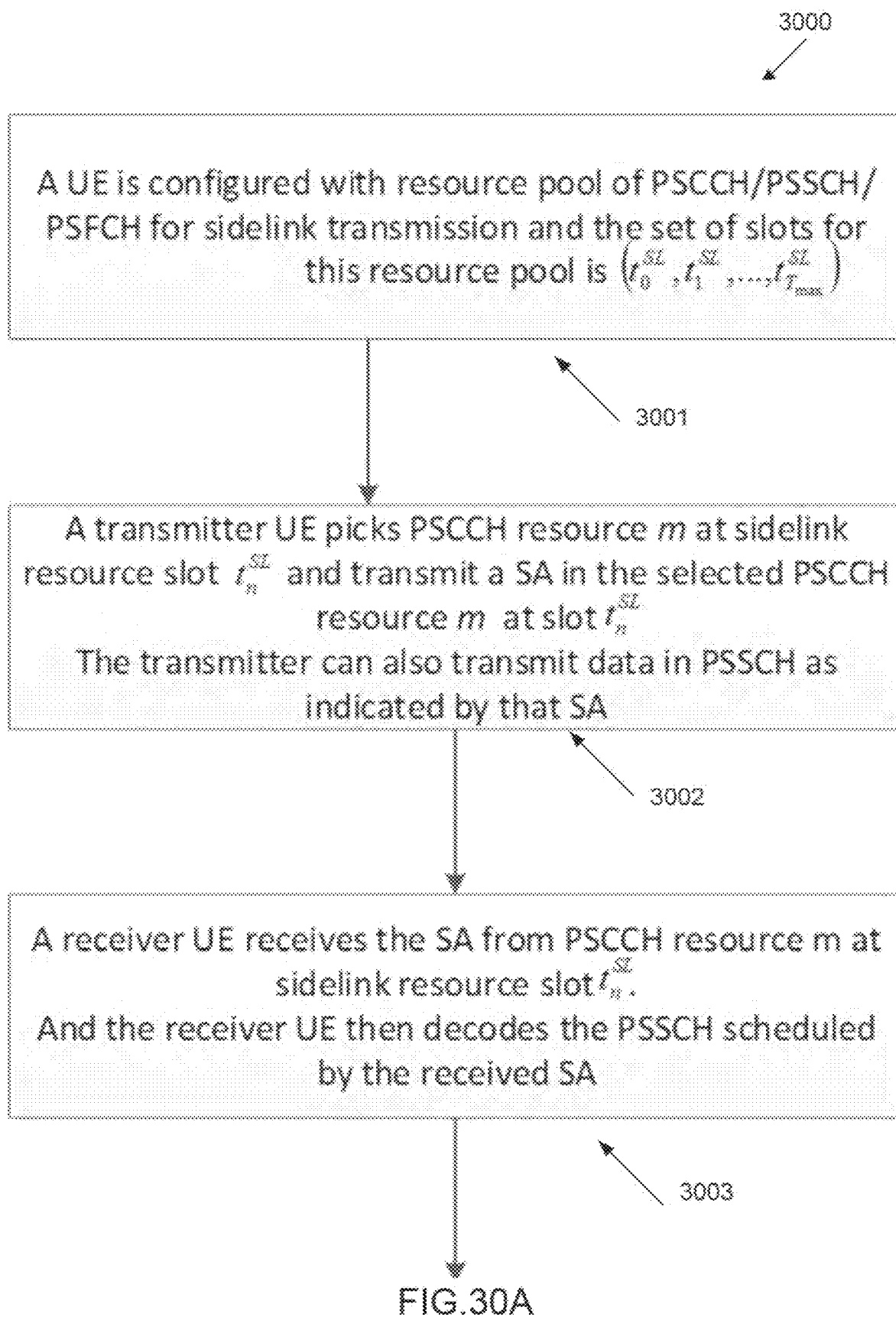
FIG. 30A illustrates a flow chart of a method for PSCCH/PSSCH and PSFCH subchannel configuration according to embodiments of the present disclosure.

FIG. 30A illustrates a flow chart of a method 3000 for PSCCH/PSSCH and PSFCH subchannel configuration according to embodiments of the present disclosure. The embodiment of the method 3000 illustrated in FIG. 30A is for illustration only. FIG. 30A does not limit the scope of the present disclosure to any particular implementation.

Figure 30B:
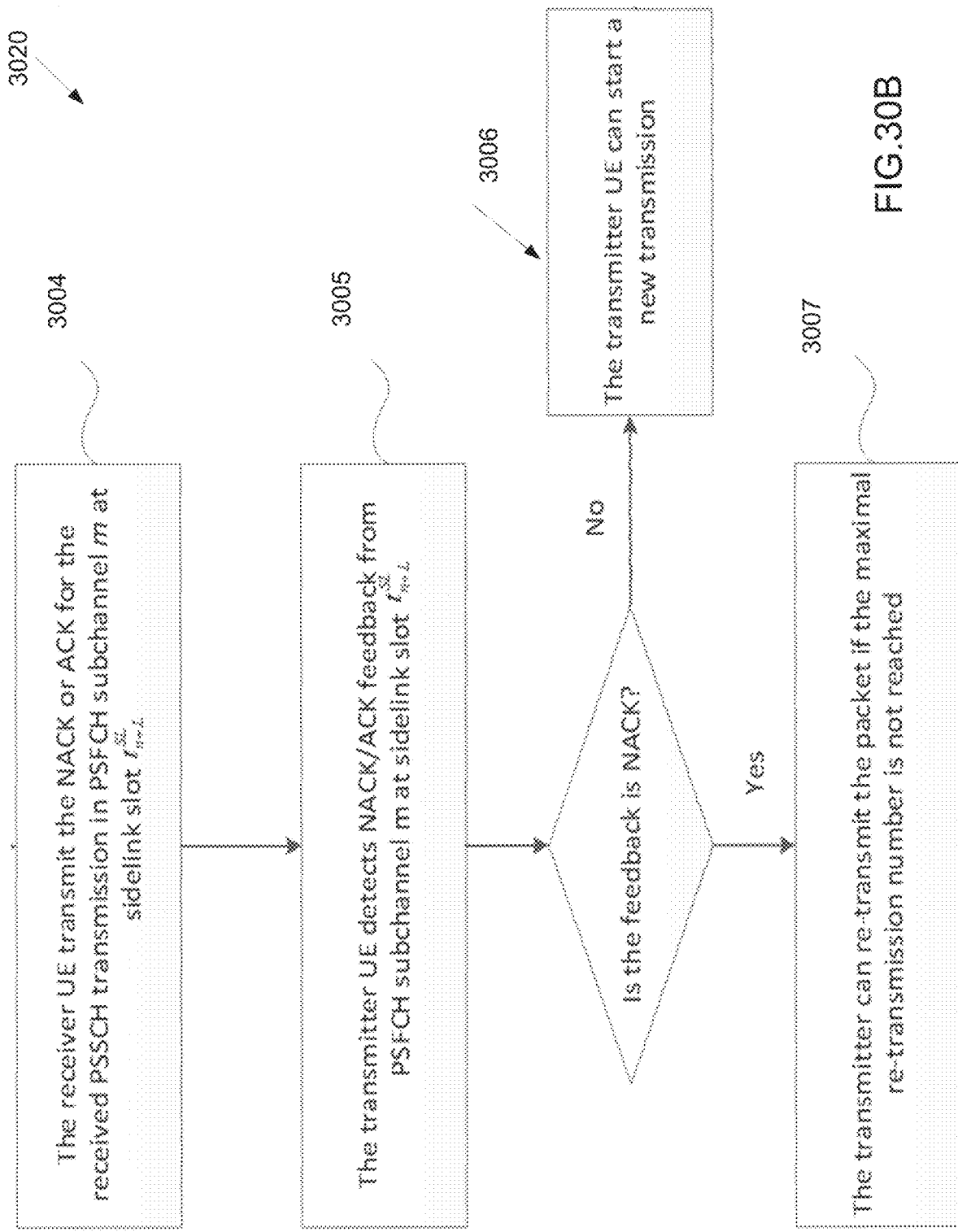
FIG. 30B illustrates another flow chart of a method for PSCCH/PSSCH and PSFCH subchannel configuration according to embodiments of the present disclosure.

FIG. 30B illustrates another flow chart of a method 3020 for PSCCH/PSSCH and PSFCH subchannel configuration according to embodiments of the present disclosure. The embodiment of the method 3020 illustrated in FIG. 30B is for illustration only. FIG. 30B does not limit the scope of the present disclosure to any particular implementation.

FIGS. 30A and 30B illustrate an embodiment of PSCCH/PSSCH and PSFCH subchannel configuration according to this disclosure.

As shown in FIGS. 30A and 30B, a UE can be configured with resource pool of PSSCH/PSCCH/PSFCH for sidelink transmission in 3001. The set of slots for the resource pool is $(t_0^{SL}, t_1^{SL}, \ldots, t_{T_{max}}^{SL})$. In 3002, when one transmitter UE has some packet to transmit through sidelink, the transmitter UE can pick PSSCH and PSCCH resource from the (pre) configured resource pool. In 3002, the transmitter UE picks PSCCH resource m at sidelink slot $t_n^{SL}$ and then transmit one SA (e.g., one SCI) in the selected PSCCH resource m at slot $t_n^{SL}$. In 3002, the transmitter UE also transmits data in PSSCH as indicated in the SA. A receiver UE can receive the SA from PSCCH resource m at slot $t_n^{SL}$ and then decode the SCI in 3003.

The receiver UE can also decodes the PSSCH as indicated by the decoded SCI in 3003. After decoding the data PSSCH, the UE can formulate the NACK or ACK for the received PSSCH. Then in 3004, the receiver can transmit the information of NACK or ACK for the received PSSCH in the PSFCH subchannel that is associated with the PSSCH resource m at sidelink slot $t_n^{SL}$ where the receiver UE detects the SA that schedules the decoded PSSCH in 3003. In the example of 3004, the associated PSFCH subchannel is PSFCH subchannel (or called PSFCH resource) m at sidelink slot $t_{n+L}^{SL}$, where the value L>0 can be configured or preconfigured. Then the transmitter UE can try to detect the information of NACK or ACK feedback from the PSFCH subchannel that is associated with the SA that the transmitter UE transmitted in 3002 (or the PSFCH subchannel that is associated with the PSSCH resource where the transmitter UE transmitted SA in 3002).

In the example of 3005, the associated PSFCH subchannel is PSFCH subchannel (or called PSFCH resource) m at sidelink slot $t_{n+L}^{SL}$, where the value L>0 can be configured or preconfigured. If the feedback is NACK, the transmitter UE can re-transmit the packet if the maximal re-transmission number is not reached in 3007. On the other hand, if the feedback is not NACK (for example, if the feedback is ACK, for example if no feedback signal is detected), the transmitter UE can start a new transmission.

In one method, the association between one PSSCH resource/the scheduled PSSCH transmission and one PSFCH subchannel (or resource) can be indicated in the SA (scheduling assignment). For example, one SCI is transmitted in PSSCH resource m to schedule a data transmission at slot n.

This SCI can contain one or more of the following information. In one embodiment, the slot location of the corresponding PFSCH subchannel (resource) for the receiver to feedback NACK/ACK for the reception of the PSSCH scheduled by this SCI. In one example, the slot location can be signaled through a slot offset that is the slot offset between the slot where SCI is transmitted and the slot where the indicated PSFCH resource is.

In one example, the PFSCH subchannel (or resource) number for the receiver to feedback NACK/ACK for the reception of the PSSCH scheduled this SCI.

Figure 31:
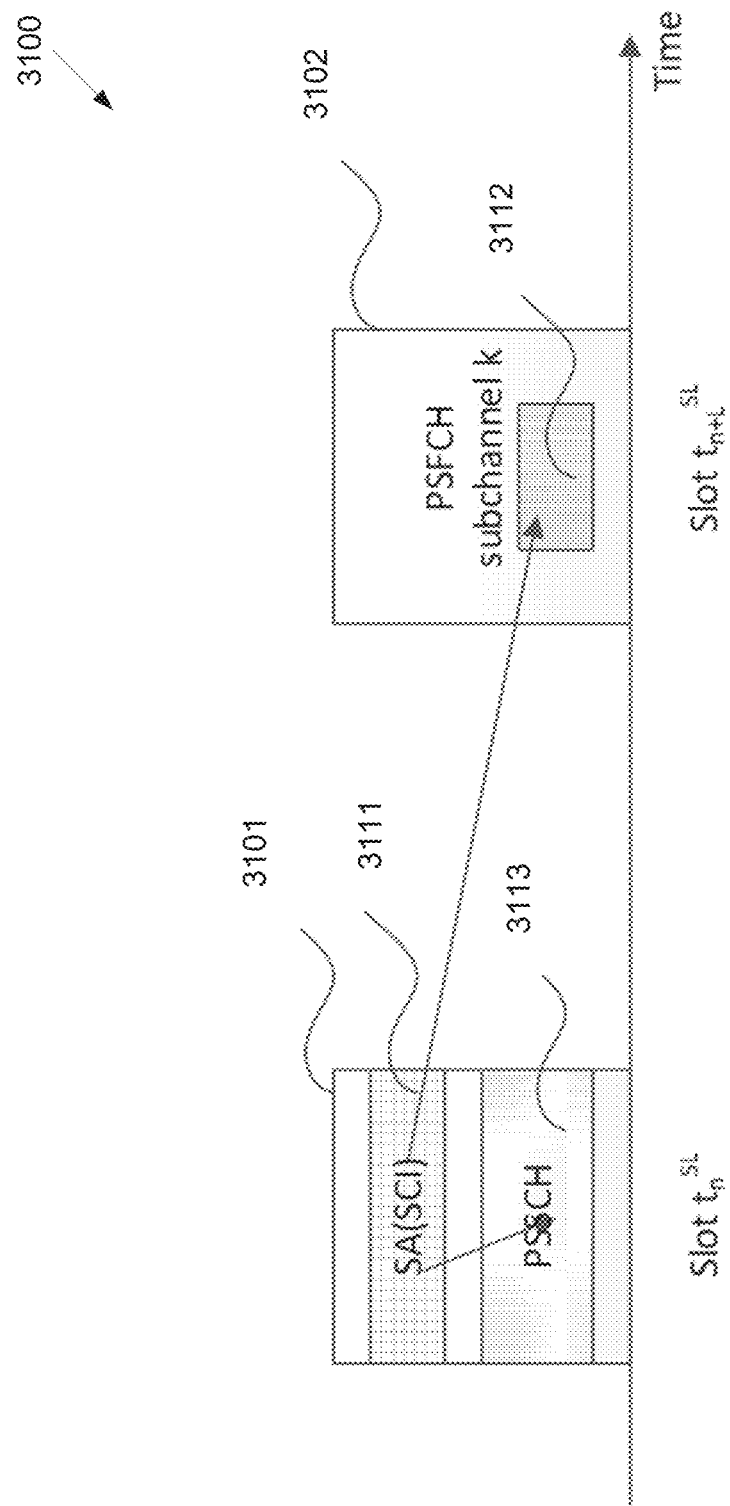
FIG. 31 illustrates an example PSFCH subchannel configuration according to embodiments of the present disclosure.

FIG. 31 illustrates an example PSFCH subchannel configuration 3100 according to embodiments of the present disclosure. The embodiment of the PSFCH subchannel configuration 3100 illustrated in FIG. 31 is for illustration only. FIG. 31 does not limit the scope of the present disclosure to any particular implementation. FIG. 31 illustrates a PSFCH subchannel configuration according to this disclosure.

As shown in FIG. 31, a UE transmits a SA (SCI) in PSSCH subchannel 3111 at slot $t_n^{SL}$. This SA can schedule one data transmission in PSSCH 3113. This SA can also indicate one associated PSFCH subchannel k 3112 at slot $t_{n+L}^{SL}$ 3102. A receiver UE can first decode SA from PSSCH subchannel 3111. Based on the decoded SA from PSSCH subchannel 3111, the receiver UE can obtain the configuration information of data transmission in 3113 as indicated in the decoded SA. Based on the decoded SA from PSSCH subchannel 3111, the receiver UE can also obtain the configuration information of associated PSFCH resource k 3112 at slot $t_{n+L}^{SL}$.

In one example, the index of the PSFCH resource k can be calculated based a pre-configured function f of the index of PSSCH resource or the index of PSCCH resource and the slot index. For example, the resource k and the slot index of one associated PSFCH resource can be calculated as: $\{k, t_p^{SL}\} = f(m, t_n^{SL})$ where k is the PSFCH resource index and $t_p^{SL}$ is the slot index for the PSFCH resource, m and $t_n^{SL}$ are the resource index and slot index of PSCCH (or PSSCH) respectively. And where the function f(.) can be predefined in the specification.

In one embodiment, one transmission of PSCCH and PSSCH can be associated with more than one PSFCH subchannels. The use case for this design is the group-cast transmission where multiple UEs are the receiver of one PSSCH transmission.

In one embodiment, in the configuration of one sidelink resource pool, the association between one PSCCH and one or more PSFCH channels can be configured. The association between one PSCCH and one PSFCH is useful for unicast transmission where a target UE is only one UE. And the association between one PSCCH and two or more PSFCH is useful for a groupcast transmission (or even broadcast transmission if HARQ feedback is supported for sidelink broadcast transmission).

The transmission one sidelink from one UE to another UE(s) can be scheduled by a gNB, for example mode 3 defined in LTE V2X. However, adaptive HARQ-type transmission on sidelink being scheduled by a gNB is not supported yet.

Figure 32:
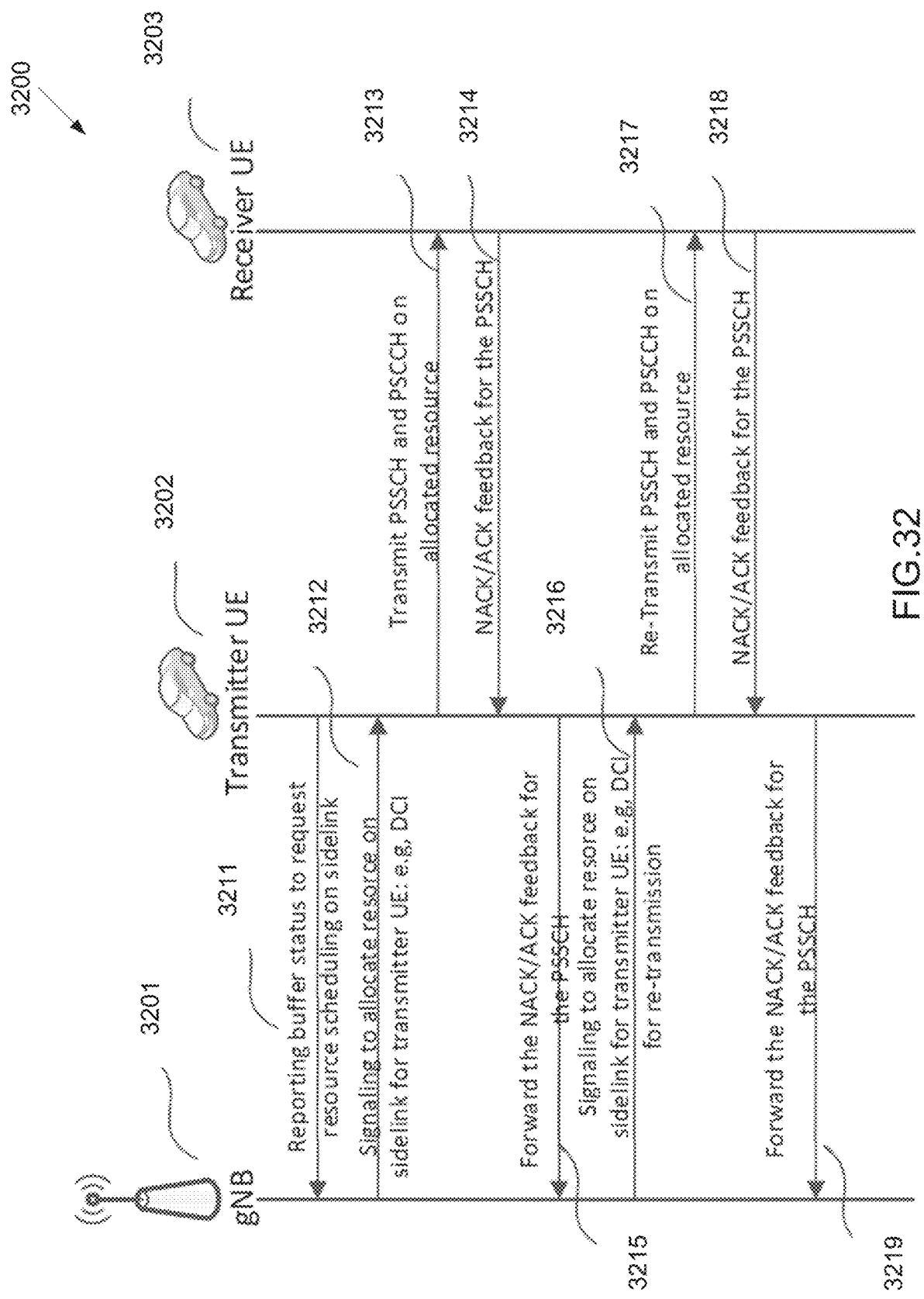
FIG. 32 illustrates an example call flow for V2X communication according to embodiments of the present disclosure.

FIG. 32 illustrates an example call flow for V2X communication 3200 according to embodiments of the present disclosure. The embodiment of the call flow for V2X communication 3200 illustrated in FIG. 32 is for illustration only. FIG. 32 does not limit the scope of the present disclosure to any particular implementation.

In one embodiment, a transmitter UE can report the NACK/ACK information for one PSCCH/PSSCH transmission whose resource is allocated by a gNB to the gNB. One example of this embodiment is illustrated in FIG. 32. As shown in FIG. 32, a transmitter UE 3202 has a serving gNB 3201. The gNB 3201 can schedule the transmission on sidelink for transmitter UE 3202. As shown in FIG. 320, the transmitter UE 3202 reports buffer status to the serving gNB 3201 to request the serving gNB 3201 to allocate resource on sidelink in 3211. The serving gNB send signaling to allocate sidelink resource for the transmitter UE 3202 in 3212. One example for 3212 is that the gNB can send one DCI to allocate sidelink resource for PSCCH and PSSCH transmission to the transmitter UE 3202. After receiving the allocation from the serving gNB 3201, the transmitter UE can transmit PSSCH and PSCCH in allocated resource as indicated by the serving gNB in 3213.

Then the receiver UE 3203 can feedback the NACK/ACK information for the decoded PSSCH in a configured PSFCH subchannel in 3214. After receiving the NACK/ACK from receiver UE, the transmitter UE can forward the NACK/ACK information through uplink to the serving gNB in 3215. One example design can be a PUCCH resource can be configured for the DCI sent by the serving gNB in 3212. If the serving gNB receives NACK for the transmission of PSSCH in sidelink in 3213, the serving gNB can send a second DCI to schedule a re-transmission on sidelink for the transmitter UE 3202 in 3216. After receiving the configuration for re-transmission, the transmitter UE 3202 can re-transmit the PSSCH in the allocated sidelink resource as indicated by the serving gNB 3201.

In one example, the DCI used by the gNB 3201 to schedule transmission on sidelink in 3212 and 3216 can include one or more of the following information elements: the configuration of PUCCH resource for the UE to report the NACK/ACK information of sidelink PSSCH transmission scheduled through this DCI by the serving gNB 3201; the HARQ process number that the transmitter UE may use for the transmission on sidelink; the resource allocation on sidelink for the transmitter UE; the indicator for new or re-transmission of PSSCH transmission on sidelink; and/or the allocation of NACK/ACK feedback subchannel (i.e., one PSFCH subchannel) on sidelink for the receiver the send NACK/ACK for the received PSSCH.

In one embodiment, a serving gNB can allocate multiple (N>1) sidelink resources for a UE to transmit initial transmission and potential re-transmission for one data packet. A serving gNB can allocate multiple sidelink resources in multiple slots n, n+n1, n+n2, ... n+$n_{N+1}$ and the UE can send initial transmission in the allocated resource in slot n and re-transmission in allocated resource in slots n1, n+n2, ... n+$n_{N+1}$. If the packet is sent successfully before all the resource allocated by the gNB is used, the UE can send notification to the serving gNB to release the resource allocation. In another example, if the packet is sent successfully before all the resource allocated by the gNB is used up, the UE continue to use the rest of the allocated resource to send other packets.

In one embodiment, the DCI sent by a serving gNB can include one or more of the following information elements: the configuration of PUCCH resource for the UE to report the NACK/ACK information of sidelink PSSCH transmission scheduled through this DCI by the serving gNB 3201; the HARQ process number that the transmitter UE may use for the transmission on sidelink; the resource allocation on sidelink for the transmitter UE; and/or the indicator for new or re-transmission of PSSCH transmission on sidelink.

In one embodiment, the DCI sent by a serving gNB can further include the information of multi-shot resource allocation on sidelink. In such embodiment, the information can include the information of indices of sidelink slots where resource are allocated for the UE: $\{t_{n1}^{SL}, t_{n2}^{SL}, \ldots, t_{nN}^{SL}\}$ and the PSSCH/PSCCH resource allocation in each allocated slots of $\{t_{n1}^{SL}, t_{n2}^{SL}, \ldots, t_{nN}^{SL}\}$.

In one example, the information for allocated sidelink slots can be signaled through an interval, L, between two adjacent slots and the number, N, of allocated slots. Then the UE can determine the allocated slots $\{t_{n1}^{SL}, t_{n2}^{SL}, \ldots, t_{nN}^{SL}\}$ as: the first sidelink slot $t_{n1}^{SL}$ is the first sidelink slot in the configured resource pool no later than the time of t0+Δ where t0 is the time when the DCI from a gNB is received and Δ is a time offset that can be configured or preconfigured. Then the UE can determine the rest of allocated slots based on $t_{n1}^{SL}$ and indicated interval L.

Figure 33:
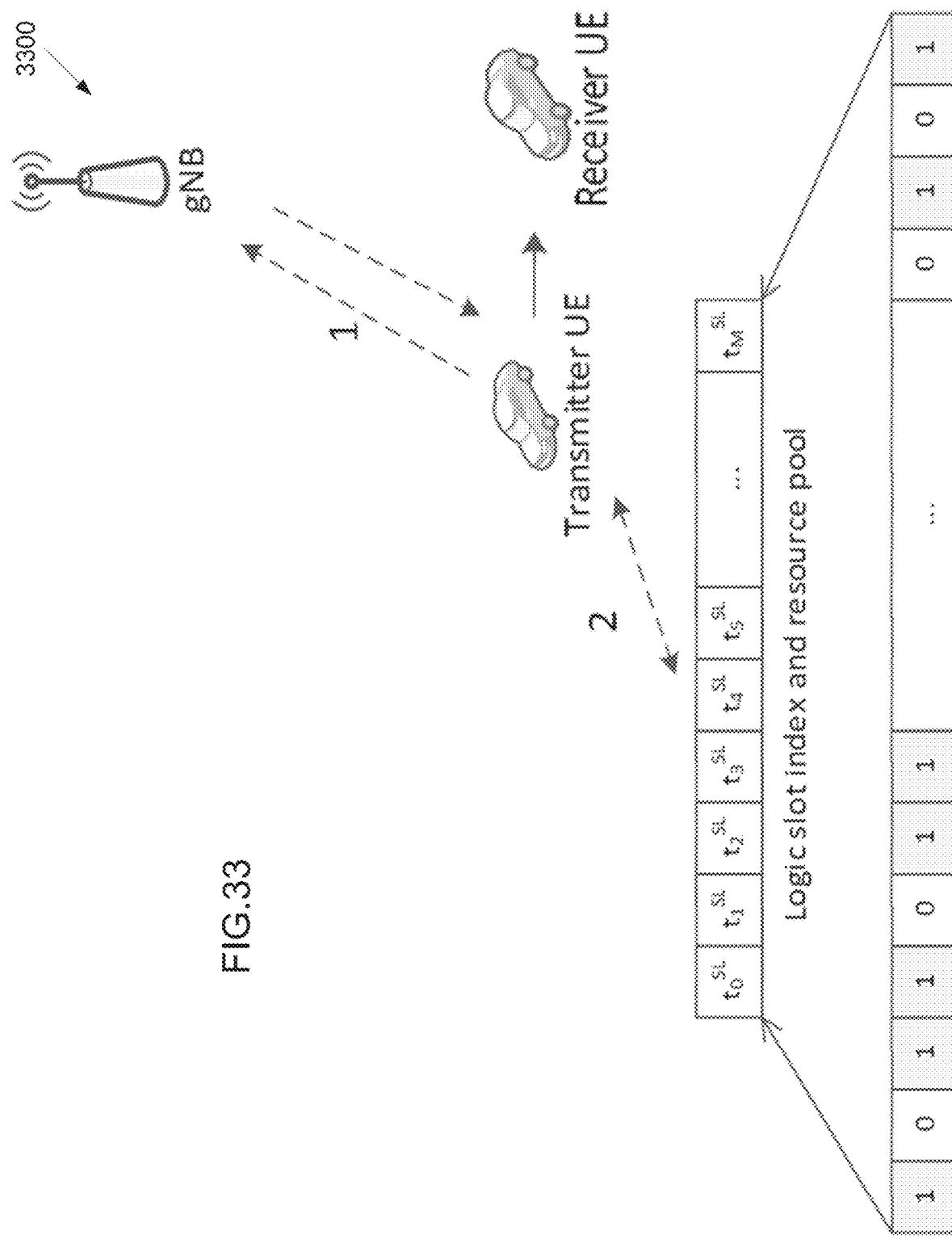
FIG. 33 illustrates an example slot configuration for V2X communication according to embodiments of the present disclosure.

FIG. 33 illustrates an example slot configuration for V2X communication 3300 according to embodiments of the present disclosure. The embodiment of the slot configuration for V2X communication 3300 illustrated in FIG. 33 is for illustration only. FIG. 33 does not limit the scope of the present disclosure to any particular implementation.

To transmit one packet on sidelink, there are generally two different modes to obtain one resource on sidelink. One mode is the transmitter UE can request the serving gNB to allocate one resource on sidelink for his transmission. In this mode, the gNB coordinates all the transmissions on sidelink and thus the collision can be avoided and transmission reliability can be improved, as shown in FIG. 33. Another mode is the transmitter UE can select one resource from a configure resource pool based on some random selection and channel sensing, as shown in FIG. 33.

5G V2X imposes stringent requirements on latency and reliability. For example, one use case defined for 5G V2X requires end-to-end latency to be 3 ms and reliability to be 99.99%. To achieve 99.99% reliability, HARQ with up to 2 transmissions are required if 1% is assumed for one-time transmission. Assume 60 KHz subcarrier spacing and then 1ms would have 4 slots. To achieve 99.99%, it may need to allow that the transmitter can finish two HARQ transmissions within 12 slots after the packet arrives.

In a sidelink transmission, a resource pool can be configured to a UE for the UE to determine the time-frequency resources that the UE can transmit on sidelink. A resource pool can contain the following information: the indexes of slots in time domain, which gives the UE information of which slots are used for sidelink transmission in time domain; and the PRBs in each slot that can be used by the UE for sidelink transmission and/or reception. Those PRBs can be divided into one or more sidelink subchannels and each subchannel can contain one or more PRBs.

Figure 34:
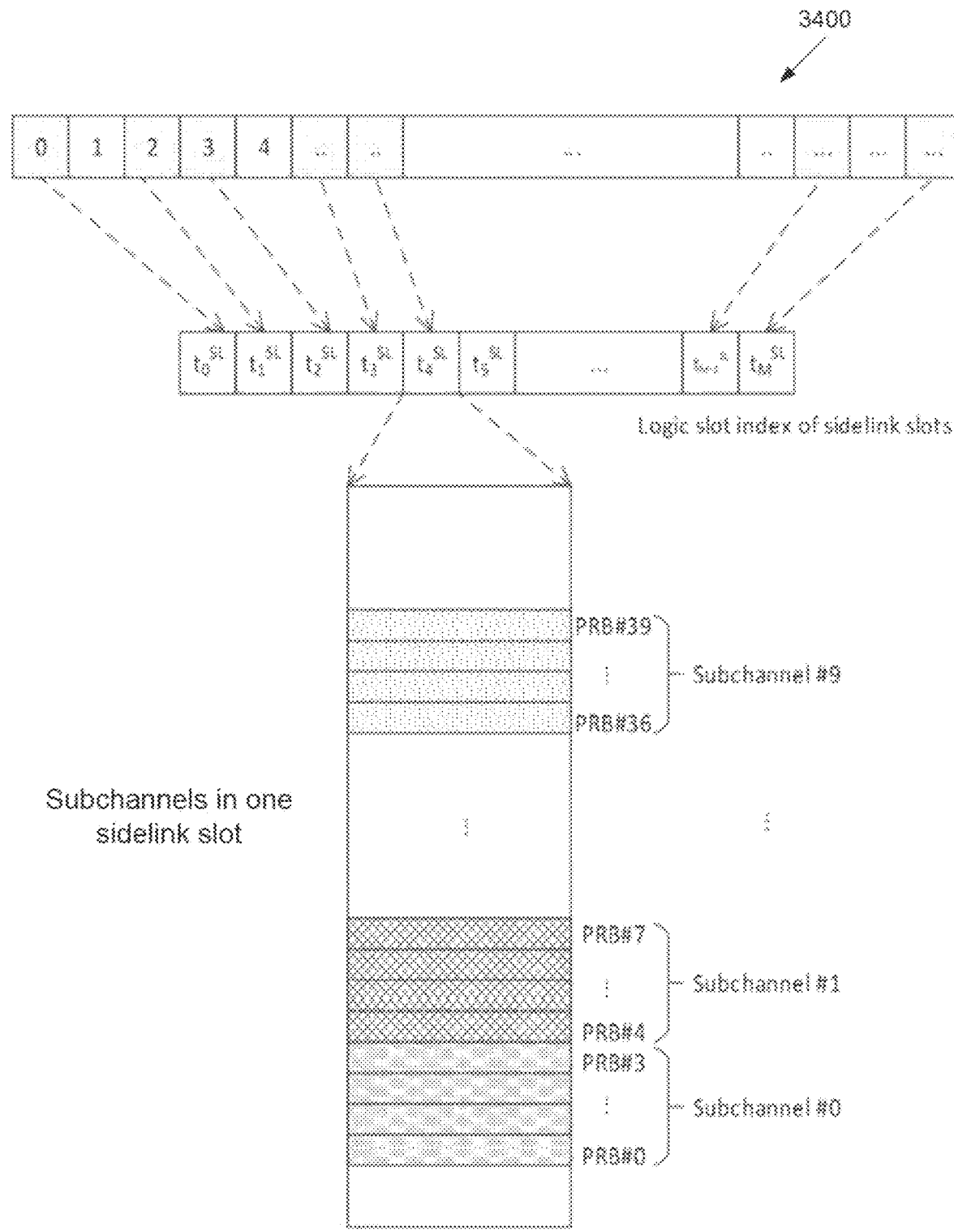
FIG. 34 illustrates an example sidelink resource pool configuration according to embodiments of the present disclosure.

FIG. 34 illustrates an example sidelink resource pool configuration 3400 according to embodiments of the present disclosure. The embodiment of the sidelink resource pool configuration 3400 illustrated in FIG. 34 is for illustration only. FIG. 34 does not limit the scope of the present disclosure to any particular implementation.

An example of sidelink resource pool configuration is shown in FIG. 34. As shown in FIG. 34, in one resource pool, some slots are selected as sidelink slots from all the available physical slots in time domain. The logical slot index for each sidelink slot can be defined. Then in each sidelink slot, some PRBs can be used for sidelink transmission. Those PRBs are divided into sidelink subchannels. As shown in FIG. 34, PRB #0~39 are allocated for sidelink transmission as configured in the resource pool. 4 PRBs are called one subchannel. Subchannel #0 has PRB #0~3, subchannel #1 has PRB #4~7, subchannel #n has PRB #4×n~4×n+3 (where n=0,1, . . . ,9).

In one embodiment, one UE can be configured with a UE-specific resource pool of multiple time-frequency resources (or called subchannels) and the UE can use the resources in that configured resource pool to transmit packet of low-latency services. When some packets of low-latency are coming and the UE needs to transmit them on sidelink, the UE can pick some resources for the transmission and report the information of resources (or subchannels) to the gNB. The resource in that resource pool configured to one UE for transmitting packets of low-latency services can also be used by the gNB to allocate to other UEs. The configuration of UE-specific resource pool configure for UE for the transmission of low-latency services can include one or more of the following parameters.

In one example, the information of indexes of slots are included in this resource pool. In such example, the information can be indicated by a bitmap and a common resource pool configured for sidelink transmission. And then the UE can derive the slot locations based on the bitmap and slot locations contained in the common resource pool.

In one example, the frequency-location of PRBs allocated to this resource pool in each included slots is provided. In such example, this can be indicated by an index of starting PRB to indicate the starting location of the resource and a number of PRBs to indicate the length of the resource in frequency domain in one slot. In such example, this can be indicated by an index of subchannel index and the number of subchannels and a common resource pool configured for sidelink transmission. The UE can derive the frequency domain location for the configured resource based on the common resource pool configuration and the indicated starting subchannel index and the number of subchannels allocated to the UE.

Figure 35:
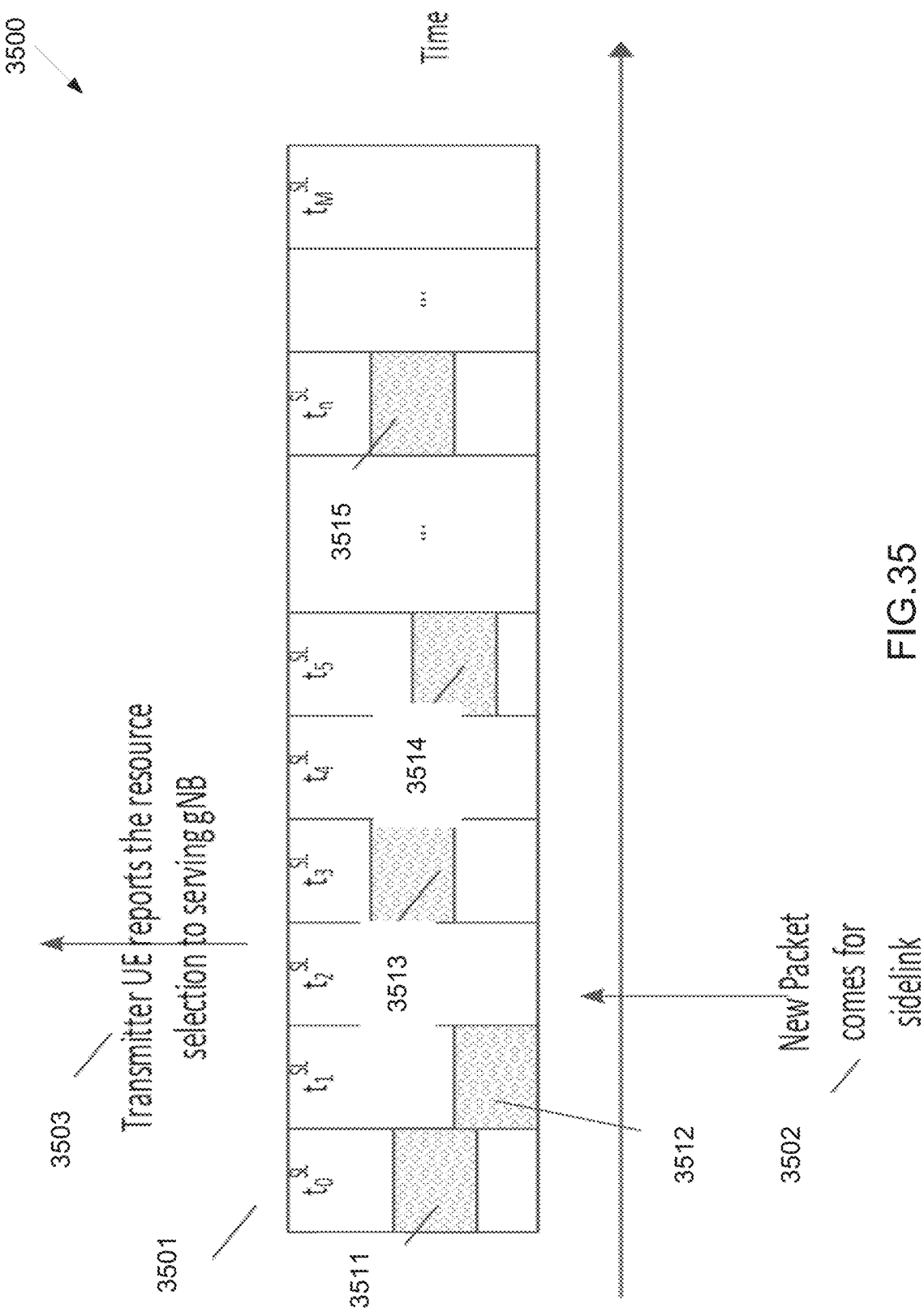
FIG. 35 illustrates an example UE dedicated resource pool design according to embodiments of the present disclosure.

FIG. 35 illustrates an example UE dedicated resource pool design 3500 according to embodiments of the present disclosure. The embodiment of the UE dedicated resource pool design 3500 illustrated in FIG. 35 is for illustration only. FIG. 35 does not limit the scope of the present disclosure to any particular implementation.

FIG. 35 illustrates a UE dedicated resource pool design for low-latency packet according to the embodiments in this disclosure.

As shown in FIG. 35, a UE can be configured with a common resource pool 3501. In the resource pool 3501, there are slots $\{t_0^{SL}, t_1^{SL}, t_2^{SL}, \ldots, t_M^{SL}\}$. The UE can be further configured with a first resource pool for the transmission of packet of low-latency services. That first resource pool contains resource 3511 in slot $t_0^{SL}$, resource 3512 in slot $t_1^{SL}$, resource 3513 in slot $t_3^{SL}$, resource 3514 in slot $t_5^{SL}$, . . . and resource 3515 in slot $t_n^{SL}$. When the UE needs to transmit some packet for low latency service, the UE can quickly select some resource from a first resource pool (e.g., without sensing the channel) and then report the resource selection to the serving gNB. And then the UE can transmit on the selected resource.

As illustrated in FIG. 35, at some moment, the UE receive some new packets of low latency for the sidelink 3502. Then the UE can select resource 3513 and 3514 for the transmission. Before the transmission, the UE can report the selection of 3513 and 3514 to the serving gNB at 3503 and then the UE can transmit the packet in resource 3513 and 3514.

In one embodiment, if the UE finish the transmission before the selected resource is use up, the UE can send a message to report to the serving gNB that the rest of the resource can be released. This is useful for efficient resource usage. One UE might select more resource to support multiple HARQ transmissions. However, with very high probability, the UE can complete the transmission successfully before maximal number of HARQ transmission is achieved. Then the UE can release the rest of the selected resource so that the serving gNB can allocate the resource to other UEs. In one example, the UE can send a message at slot m to the serving gNB to notify the serving gNB that the UE has finished the sidelink transmission and the serving gNB can assume all the selected resource and slots after slot m are released by the UE.

In one embodiment, a dedicated resource pool configured to a UE A for the transmission of packets of low-latency services. This resource pool can also be used by other UE. If the resource in that resource pool is not used by UE A, then the serving gNB can allocate resources in this resource pool to other UE for sidelink transmission. The serving gNB can send message (for example a MAC-CE message or a DCI) to request the UE A to report whether the UE A will select some resources.

Figure 36:
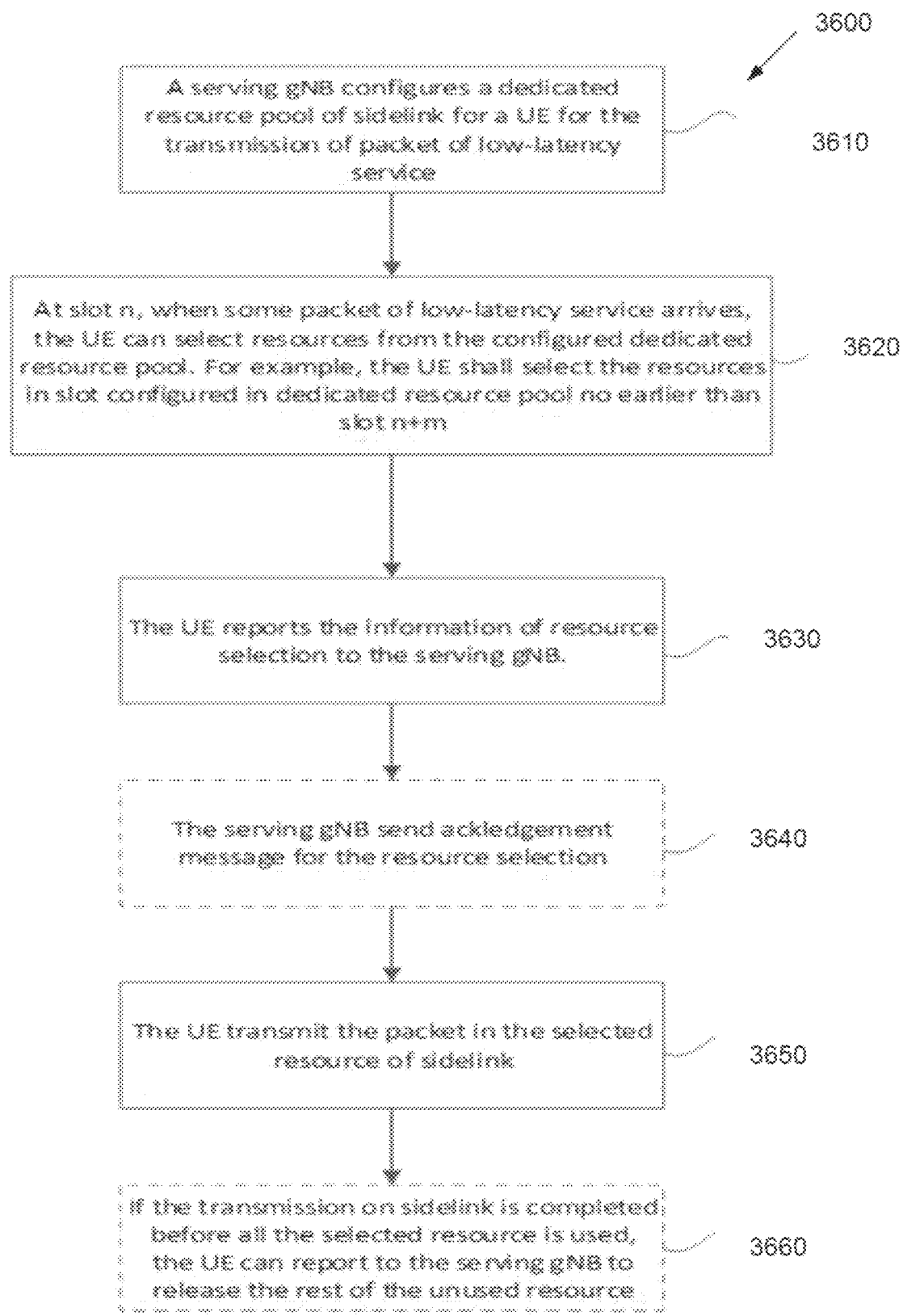
FIG. 36 illustrates a flow chart of a method for low latency packet transmission on sidelink according to embodiments of the present disclosure.

FIG. 36 illustrates a flow chart of a method 3600 for low latency packet transmission on sidelink according to embodiments of the present disclosure. The embodiment of the method 3600 illustrated in FIG. 36 is for illustration only. FIG. 36 does not limit the scope of the present disclosure to any particular implementation.

FIG. 36 illustrates a procedure of a UE transmitting low-latency packet on sidelink according to the embodiments in this disclosure.

As shown in FIG. 36, a UE can be configured with a dedicated resource pool for sidelink for the transmission of packet of low-latency service by a serving gNB at 3610. In one example, the UE can choose resources from that resource pool when some packets for sidelink arrives for the transmission on sidelink. At 3620, in slot n, the UE has some packets of low-latency service to transmit on sidelink. The UE can choose resources from the configured pool. In one example the UE can select the resources in slots from the resource pool, which are not earlier than the time of slot n+m (where m can be 0 or a positive number (pre)configured by the system). Then the UE reports the selection of the resource of sidelink to the serving gNB 3630.

In one example, the UE can report the information of indexes of selected slot for sidelink transmission. In one example, the UE can reports the index of starting slot and the number of selected slot. In one example, the UE can report the information of indexes of selected slot and the information of indexes of subchannels in each selected slot for sidelink transmission. In one example, it can be assumed that the UE would use all the resource in one selected slot in the configured resource pool, then the UE can report only the indexes of selected slot. After sending reports of the selected resources (slots, subchannels) to the serving gNB, the UE can go ahead to transmit the packet on the slots and resources on sidelink at 3650.

After the gNB receives the report of selected resource of sidelink from the UE, the gNB can send acknowledgment message to the UE to ACK the selection of sidelink resource 3640. After receiving the ACK message from the serving gNB, the UE can use the selected sidelink resources for sidelink transmission. If the UE completed the transmission on sidelink before all the selected resources and slots are used, then the UE can report that to the serving gNB to notify the serving gNB that the rest of the selected resource and slots can be released at 3660.

In one embodiment, a UE can send a request message to one serving gNB to request the resource allocation in sidelink. The request message can include one or more of the following information: the number of total PSSCH resources (or PSSCH subchannel) the UE is requesting; the number of total PRBs for PSSCH the UE is requesting; the number of PSSCH resources in one slot and the number of slot the UE is requesting; the number of PSSCH PRBs in one slot and the number of slots the UE is requesting; and/or the total number of bytes the UE need to transmit in physical channel PSSCH in sidelink.

After the gNB receives the request from one UE, the gNB can send signaling (for example one DCI) to allocate resource(s) of sidelink for that UE. The gNB can use a single downlink signaling (for example one DCI) to allocate the sidelink resource in one slot or in multiple slots.

In one embodiment, a UE can send sidelink resource request through a uplink PUCCH channel to the serving gNB. The benefit for that method is low latency and low overhead.

Figure 37:
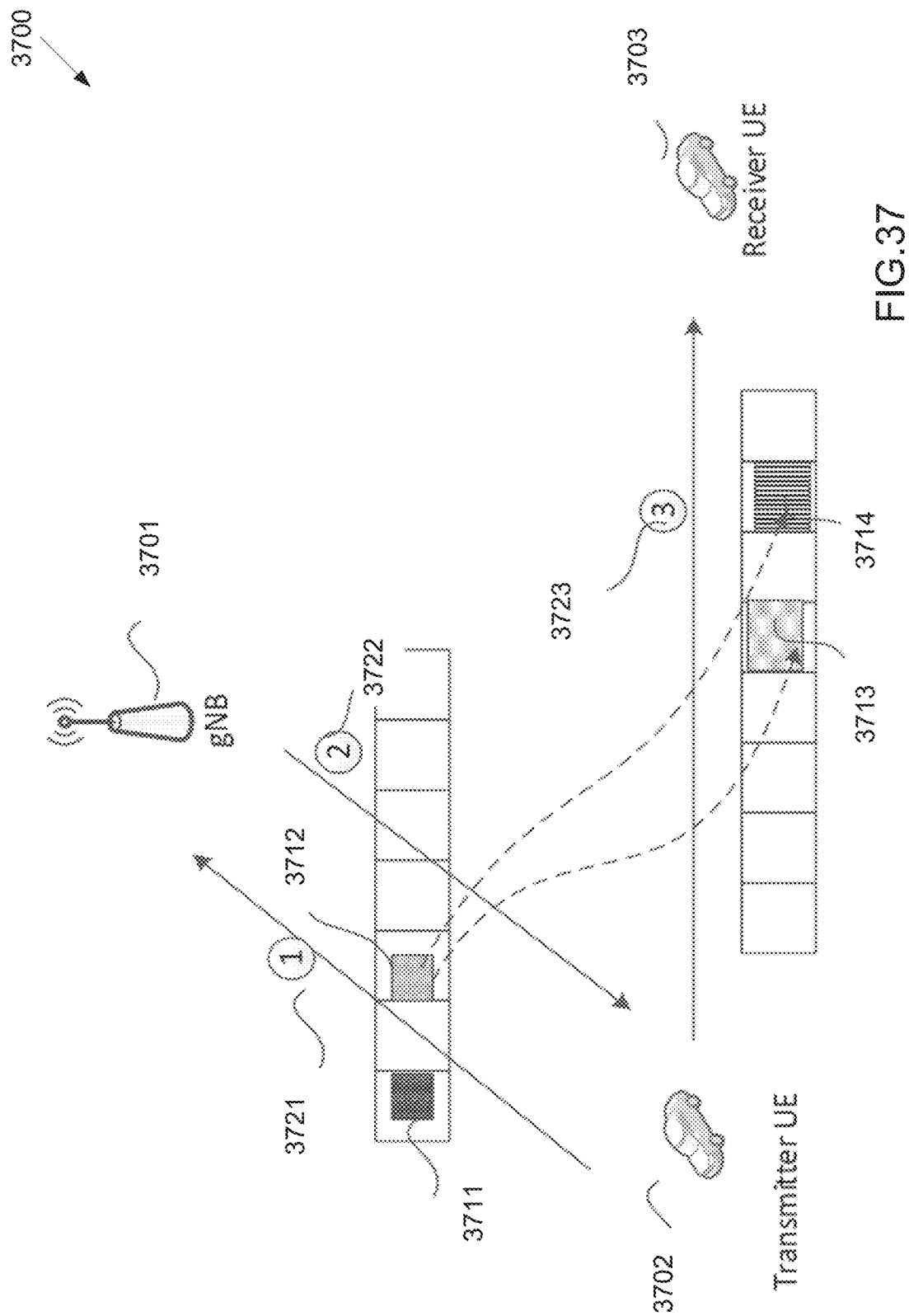
FIG. 37 illustrates an example resource allocation and transmission on sidelink according to embodiments of the present disclosure.

FIG. 37 illustrates an example resource allocation and transmission on sidelink 3700 according to embodiments of the present disclosure. The embodiment of the resource allocation and transmission on sidelink 3700 illustrated in FIG. 37 is for illustration only. FIG. 37 does not limit the scope of the present disclosure to any particular implementation.

FIG. 37 illustrates a procedure of a resource allocation and transmission sidelink according to the embodiments in this disclosure.

As shown in FIG. 37, a transmitter UE 3702 has some packets to transmit to receiver UE 3703 through sidelink and thus transmitter UE 3702 needs some sidelink resource. The transmitter UE 3702 sends a sidelink resource request message 3711 in uplink to the serving gNB 3701. One example for the sidelink resource request message 3711 can be some bits transmitted in one PUCCH resource that is configured by the serving gNB. The sidelink resource request message 3711 can include the number of sidelink slots and number of sidelink subchannels the UE requests.

Then the serving gNB can send a downlink control signaling 3712 (e.g., DCI) to the transmitter UE 3702 to schedule some sidelink resource. In the example shown in FIG. 37, downlink control signaling 3712 can allocate a sidelink resource 3713. In another example, one downlink control signaling 3712 (e.g., DCI) can allocate sidelink resources in more than one slot.

As illustrated in FIG. 37, downlink control signaling 3712 can allocate a sidelink resource 3713 and a sidelink resource 3714, that are in two different slots. So at step 3, 3723, the transmitter UE can transmit on allocated sidelink resource 3713 and/or 3714.

In one embodiment, a UE can be requested to send sidelink request on one configured PUCCH only for packet of low-latency transmission on sidelink.

In one embodiment, a serving gNB can configure a UE with a periodic PUCCH resource for the UE to report sidelink resource allocation request for sidelink transmission. The UE can report $N_B$ bits in the configured PUCCH resource to indicate the amount of sidelink resource the UE requests from the serving gNB.

There are a few alternatives for the designing of $N_B$ bits in the configured PUCCH resource.

In one example of Alt #1, $N_B$ bits info in PUCCH represents the total number of sidelink subchannels that the UE requests. One subchannel is equal to one or multiple PRBs in one slot, as configured in resource pool for sidelink.

In another example of Alt #2, $N_B$ bits info in PUCCH represents the total number of slots and the number of subchannel in each slot that the UE requests.

In yet another example of Alt #3, $N_B$ bits info in PUCCH represents the total number of that the UE requests, and the number of subchannels in each slot can be (pre)configured, which is known by both the serving gNB and UE.

In yet another example of Alt #4, $N_B$ bits info in PUCCH represents the number of subchannels in each slot that the UE requests, and the number of slots that the UE requests can be implicitly or explicitly configured by the system. In one example, the number of slots can be the maximal number HARQ transmission allowed in sidelink.

In one example, a $N_B=3$ bits can indicate the following information as shown in TABLE 3.

TABLE 3

| The value of reported bit-field | Alt#1: number of resource requested | Alt#2: number of resource requested |
| --- | --- | --- |
| 000 | 0 subchannel, or no resource request | 0 subchannels or no resource request |
| 001 | Totally 1 subchannels | 1 slot and 2 subchannel in each slot |
| 010 | Totally 2 subchannels | 1 slot and 4 subchannel in each slot |
| 011 | Totally 4 subchannels | 2 slots and 2 subchannels in each slot |
| 100 | Totally 8 subchannels | 2 slots and 4 subchannels in each slot |
| 101 | Totally 16 subchannels | 2 slots and 8 subchannels in each slot |
| 110 | Totally 32subchannels | 4 slots and 4 subchannels in each slot |
| 111 | Totally 64 subchannels | 4 slots and 4 subchannels in each slot |

In one embodiment, a UE-A can use a 2-step RACH (random access) channel to request sidelink resource allocation to a serving gNB. The UE-A can be configured with: a RACH preamble for 2-step RACH; and/or PRACH channels for 2-step RACH.

When the UE-A needs sidelink resources, the UE-A can send his configured RACH preamble with proper payload in the msg1 of 2-step RACH in the configured PRACH channels. After the gNB detects the preamble configured to the UE-A, the gNB can decode the payload in the msg1 to obtain the information of requested sidelink resource by the UE-A. And then the gNB can send a DCI format X to the UE-A to schedule the transmission on sidelink.

Figure 38:
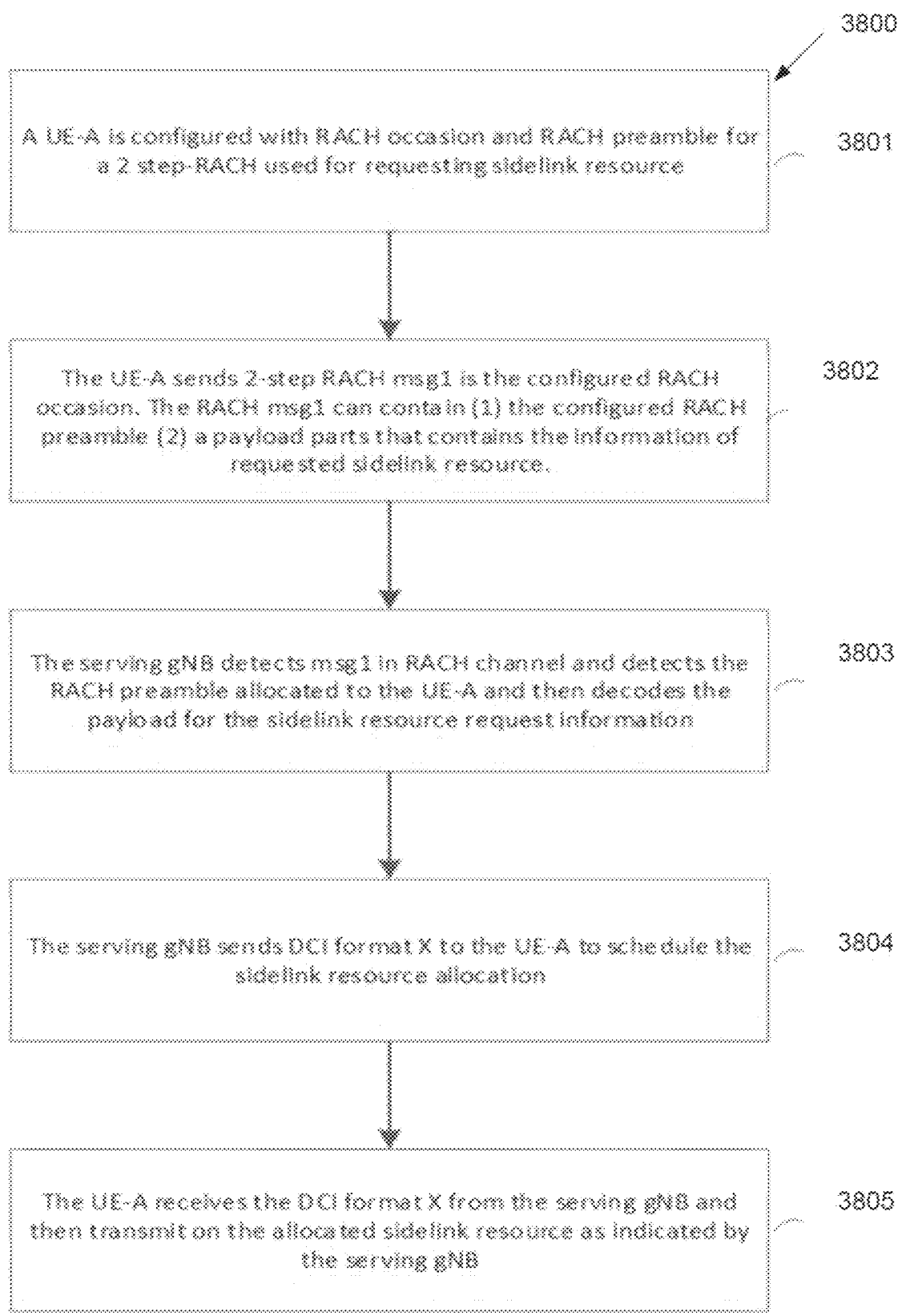
FIG. 38 illustrates a flow chart of a method for sidelink resource request and allocation according to embodiments of the present disclosure.

FIG. 38 illustrates a flow chart of a method 3800 for sidelink resource request and allocation according to embodiments of the present disclosure. The embodiment of the method 3800 illustrated in FIG. 38 is for illustration only. FIG. 38 does not limit the scope of the present disclosure to any particular implementation.

FIG. 38 illustrates a procedure of sidelink resource request and allocation according to the embodiments in this disclosure.

As shown in FIG. 38, a UE-A can be configured with RACH resources (RACH occasions and RACH preamble) for the UE-A to send sidelink resource request to a serving gNB in 3801. Then when the UE-A needs sidelink resource, the UE-A can send the configured msg1 of 2-step RACH as configured by the gNB to request sidelink resource from the serving gNB in 3802.

In that msg1, the UE-A can include the following message: the configured RACH preamble configured to the UE-A. This preamble can be used to identify the UE-A; and bits in msg1 payload to represent the information on how much sidelink resource is requested by the UE-A. The information can be included in the msg1 payload can be: the ID of transmitter V2X UE; the number of bytes of the packet that the UE-A needs to transmit on sidelink; the ID of the receiver UE or ID of receiver UE group of the packet of UE-A; the QoS requirement of the packet that the UE-A needs to transmit on sidelink, which can include the latency requirement, reliability, traffic priority, minimal transmission range; the number of PRBs that the UE-A requests; the number of transmission that the UE-A requests for sidelink; the maximal number of re-transmission that the UE-A requests; and/or whether HARQ feedback is requested or not.

As illustrated in FIG. 38, at 3803, the serving gNB detects the RACH transmission and decodes the RACH preamble. The gNB can detect the preamble sent by the UE-A and then the gNB decodes the msg1 payload for the sidelink resource request information of the UE-A at 3803. Then at 3804, the serving gNB can send one DCI format X to the UE-A to schedule sidelink resource and transmission for the UE-A. At 3805, the UE-A receives DCI format X from the serving gNB and then transmit PSSCH and PSCCH on sidelink in the sidelink resource allocated by the serving gNB.

The method of 2-step RACH based sidelink resource request has the following benefits. In one example, the latency for sidelink resource request is short. That is necessary to satisfy the low latency of advanced V2X services. In another example, it does not need to allocate UE-specific uplink resource for a V2X UE to send the sidelink resource request message. Therefore, uplink resource efficient implementation technology are provided.

In one embodiment, the UE can be requested to use 2-step RACH method to request sidelink resource only for the packets whose QoS requirement meets some condition. In one example, the UE can only use 2-step RACH method to request sidelink resource for the packets that is low latency packet. In one example, the UE can only use 2-step RACH method to request sidelink resource for the packets whose priority is higher than some priority threshold (in one example, the sidelink packet has 8 priority levels: 0~7 and 0 is the highest priority and 7 is the lowest priority. The UE can be requested to only use 2-step RACH method to request sidelink resource for the packets whose priority level is lower than some threshold).

There can be a few alternatives for the RACH msg1 design for 2-step RACH for UE to send sidelink resource request.

In one example of Alt1, msg1 has two parts: a RACH preamble and a RACH payload message. The RACH preamble can implicitly carry the information of UE ID of the sidelink transmitter UE who requests sidelink resource. Thus, each V2X UE would be configured by the serving gNB with a RACH preamble for that UE to request sidelink resource from the serving gNB. The RACH payload message can include the information of how much sidelink resource is requested by the UE, as described in the above methods; In the RACH payload message part, the UE can transmit DM-RS for the purpose of decoding RACH payload message. The generation and/or mapping of DM-RS of one RACH payload message can be a function of index of the RACH preamble transmitted in the same msg1.

In one example of Alt2, msg1 has two parts: a PRACH preamble and a RACH payload message. The RACH preamble can be used to implicitly indicate that that RACH transmission is requesting sidelink resource some V2X UEs. In this design, each V2X UE can be configured with a pool of PRACH preambles by the serving gNB for the purpose of sidelink resource request and one V2X UE can randomly choose one of those configured RACH preambles for one sidelink resource request transmission. The RACH payload message can contain the information of the UE ID of the V2X UE that is requesting the sidelink resource. The RACH payload message can also contain the information of sidelink resource requested by the V2X UE, as described by above methods. In the RACH payload message part, the UE can transmit DM-RS for the purpose of decoding RACH payload message. The generation and/or mapping of DM-RS of one RACH payload message can be a function of index of the RACH preamble transmitted in the same msg1.

In one example of Alt3, msg1 has two parts: a PRACH preamble and a RACH payload message. The RACH preamble part is one preamble that the V2X UE can choose from the preambles that are configured by the serving gNB for 2-step RACH transmission. The RACH payload message can contain the following information elements: a first bit-field to indicate the purpose of that RACH transmission, for example, one value of a first bit-field can indicate that the RACH transmission is used to request sidelink resource by a V2X UE; a UE ID of transmitter V2X UE who requests sidelink resource; and/or the information of sidelink resource that the V2X UE requests, as aforementioned.

In one embodiment, a UE-A can be request to begin monitor DCI format X scrambled by SL-C-RNTI that is configured as the UE ID for monitoring DCI format that schedules sidelink resource, after the UE-A sends sidelink resource request through PRACH channel. In one example, the UE-A sends sidelink resource request in PRACH channel at slot n, then the UE-A can be requested to monitor DCI format X starting from slot n+m where m is >0. In one example, DCI format X can contain bit-fields that indicate the sidelink resource allocation and configuration of sidelink transmission on sidelink for the UE-A. In one example, after a UE-A sends sidelink resource request in PRACH channel at slot n, if the UE-A does not receive any DCI format X scrambled by SL-C-RNTI within a time window after slot n when the UE-A sends the sidelink resource request in PRACH channel, the UE-A can re-send the sidelink resource request through PRACH channel after the time window expires.

In one embodiment, a serving gNB can send one DCI to schedule a resource allocation on sidelink transmission for UE A. That DCI can include the information of slot and resource (subchannel) index information that are allocated to the UE for transmission on sidelink. The gNB can also allocate one PUCCH resource on the uplink between the gNB and a UE A for the UE A to report the ACK/NACK information of transmission on the sidelink resource scheduled by that DCI. This embodiment is useful for the gNB to efficiently control the resource allocation on sidelink.

If adaptive HARQ transmission is used on sidelink, the transmission time on sidelink would be variable. A first option is that the gNB can allocate the resource to consider the maximal number of transmissions. This could cause huge waste of resource because the probability of re-transmission is very rare. A second option is that the gNB only allocate the sidelink resource for one-time transmission on sidelink and if the transmission on sidelink fails, the gNB can further allocate sidelink resource for re-transmission. The provided embodiment is useful for the $2^{nd}$ options.

For example, assume the error rate for one transmission is 1%. To achieve 99.99% reliability, a first option would need 98% more resources than a second option. The gNB can also implement a first option or a second option based on the size of allocated sidelink resource and the size of ACK/NACK PUCCH resource in uplink between the serving gNB and the UE. If the size of allocated sidelink resource is much larger the ACK/NACK PUCCH resource, the gNB might choose a second option. If the size of allocated sidelink resource is similar to or even smaller than the size of ACK/NACK PUCCH resource, the gNB can choose a first option.

In one example, the gNB can indicate the allocation PUCCH resource on uplink between the gNB and the UE in a first DCI that allocates the sidelink resource. If a first DCI indicates PUCCH resource for the UE to send the ACK/NACK of sidelink transmission, the UE may report the ACK/NACK information of sidelink transmission on the resource allocated by a first DCI to the gNB. And if a first DCI does not indicate PUCCH resources for the UE to send the ACK/NACK of sidelink transmission, the UE may not report the ACK/NACK information of sidelink transmission on the resource allocated by a first DCI.

Figure 39:
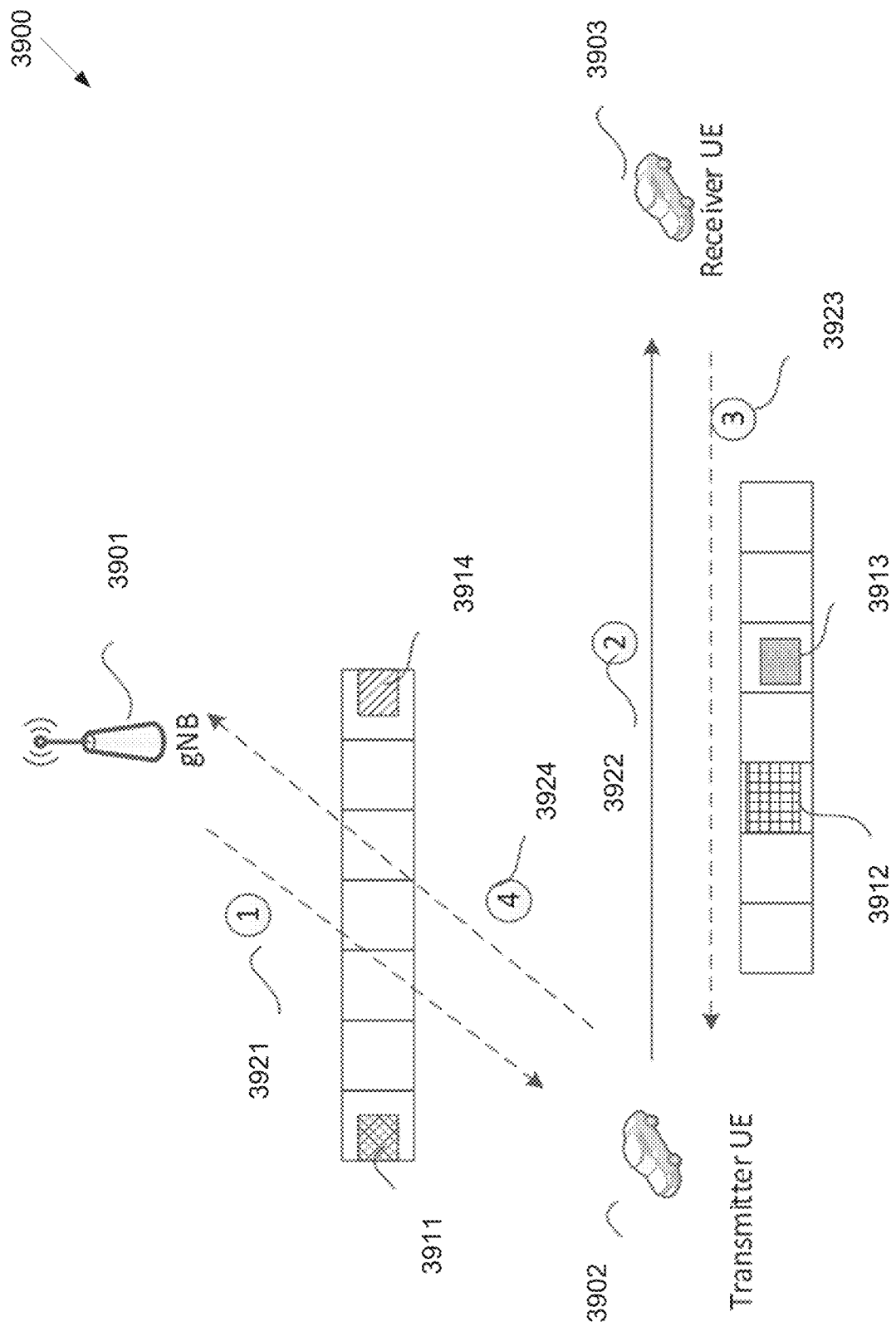
FIG. 39 illustrates an example resource allocation and transmission on sidelink according to embodiments of the present disclosure.

FIG. 39 illustrates an example resource allocation and transmission on sidelink 3900 according to embodiments of the present disclosure. The embodiment of the resource allocation and transmission on sidelink 3900 illustrated in FIG. 39 is for illustration only. FIG. 39 does not limit the scope of the present disclosure to any particular implementation.

FIG. 39 illustrates a procedure of a resource allocation and transmission sidelink according to the embodiments in this disclosure.

As shown in FIG. 39, a transmitter UE 3902 has some packet to transmit through sidelink to a receiver UE 3903. At step 1 of 3921, the serving gNB 3901 can send a DCI 3911 in one downlink slot to schedule sidelink resource 3912 for the transmitter UE 3902. The DCI 3911 can also allocate one uplink channel 3914 (e.g., one PUCCH resource) for the UE to report ACK/NACK information of allocated sidelink transmission. Then the transmitter UE 3902 can send transmission on the allocated sidelink resource 3912 at step 2 of 3922 to the receiver UE 3903. After receiving the packet from the transmitter UE in resource 3912, the receiver UE 3903 can send the NACK/ACK feedback for the transmission in resource 3912 in one sidelink feedback resource 3913 at step 3 of 3924.

An association between resource 3912 and feedback resource 3913 can be (pre)configured so that the UE can find the proper feedback resource 3913 based on the location of resource 3912 for sidelink transmission. Then the transmitter UE can forward the ACK/NACK for transmission on resource 3912 to the gNB through the uplink channel 3914 at step 4.

In one embodiment, the transmitter UE 3902 can report the information ACK/NACK for sidelink transmission to the serving gNB.

In one example of Alt1, the transmitter UE 3902 can report the ACK to the serving gNB if the UE receives HARQ ACK from the receiver UE 3903 and the transmitter UE 3902 can report the NACK to the serving gNB if the UE receives HARQ NACK from the receiver UE 3903.

In one example of Alt2, the transmitter UE 3902 can report the NACK to the serving gNB if the UE receives HARQ NACK from the receiver UE 3903 and but the transmitter UE 3902 does not report to the serving gNB if the UE receives HARQ ACK from the receiver UE 3903.

In one example of Alt3, the transmitter UE 3902 can report the NACK to the serving gNB if the UE does not receives HARQ ACK from the receiver UE 3903 and the transmitter UE 3902 does not report to the serving gNB if the UE receives HARQ ACK from the receiver UE 3903.

The technical reason for this design is because only when the sidelink transmission is failed, the gNB needs know that and then allocate resource for re-transmission. But if the sidelink transmission is decoded correctly, gNB does not need any further action.

Figure 40:
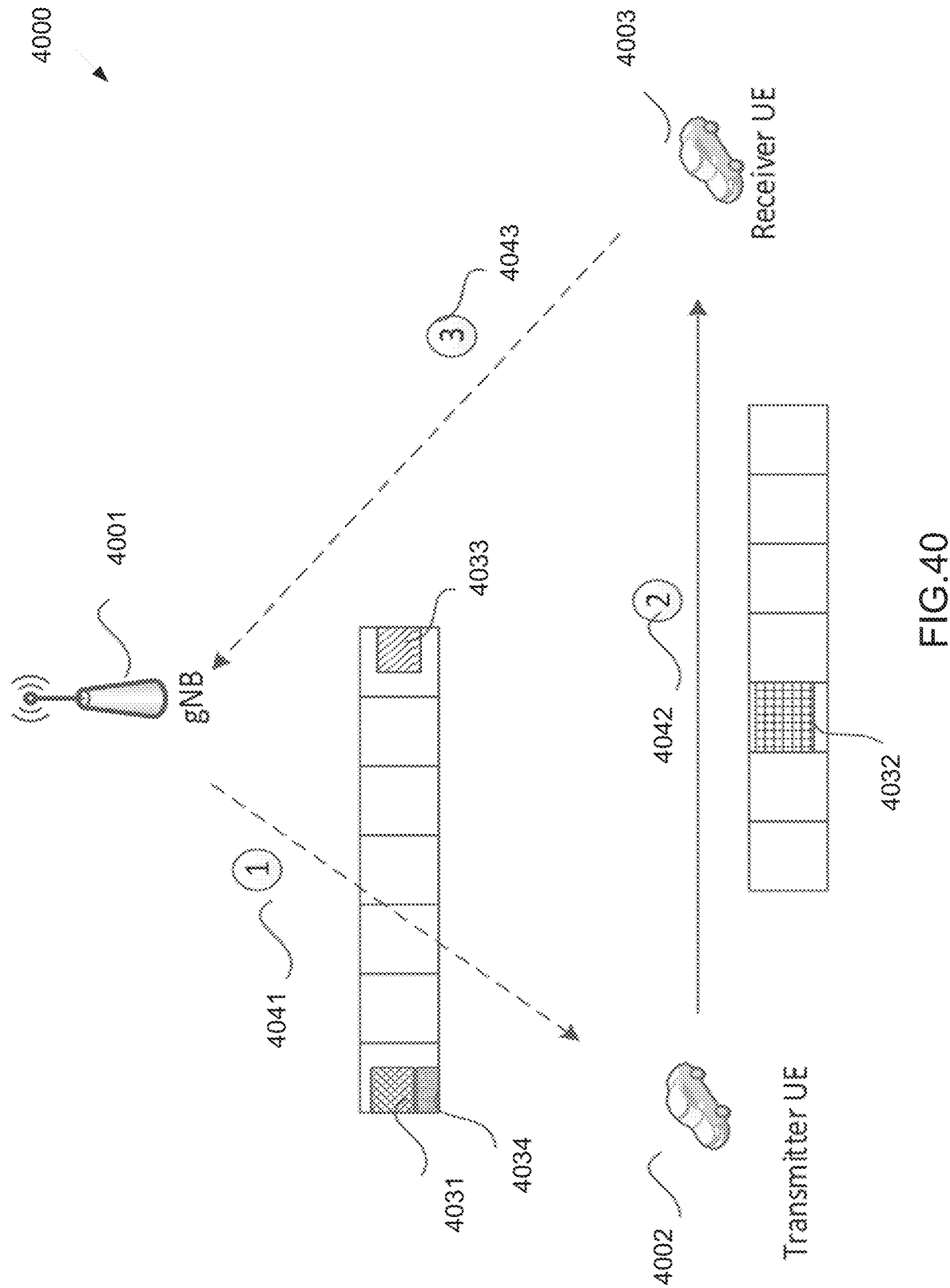
FIG. 40 illustrates another example resource allocation and transmission on sidelink according to embodiments of the present disclosure.

FIG. 40 illustrates another example resource allocation and transmission on sidelink 4000 according to embodiments of the present disclosure. The embodiment of the resource allocation and transmission on sidelink 4000 illustrated in FIG. 40 is for illustration only. FIG. 40 does not limit the scope of the present disclosure to any particular implementation.

In one embodiment, a serving gNB can send a first DCI format X (for example DCI format 4011 in the example of FIG. 40) to a V2X UE-A to schedule the transmission on sidelink of UE-A. A first DCI format sent at slot n from the serving gNB and UE-A can include bit-field(s) (for example one bit-field, or for example two bit fields) to indicate one PUCCH resource in one slot n+m1 and the UE-A can report the ACK/NACK information for the PSSCH transmission on sidelink scheduled by the a first DCI format indicated by the serving gNB.

In one embodiment, a DCI format X can include two bit-fields. A first bit-field signals one PUCCH resource indicator that can be used to indicate one PUCCH resource for the UE-A to report the ACK/NACK information of PSSCH transmission on sidelink as scheduled by DCI format X from the serving gNB. A second bit-field signals a sidelink-to-HARQ-feedback timing indicator that is used to indicate information of the slot index where the UE-A can report the ACK/NACK information for the PSSCH transmission on sidelink that is scheduled by DCI format X from the serving gNB. In one example, the a second bit-field can signal a slot offset m and for the PSSCH transmission scheduled by DCI format X received at slot n, the UE can be requested to report the ACK/NACK at slot n+m$_1$.

In another embodiment, a DCI format X sent at slot n can use one bit-filed, a first bit-field, to configure the PUCCH resource at slot n+m$_1$ for the UE-A to report ACK/NACK for PSSCH transmission on sidelink resource that is scheduled by DCI format X from the serving gNB. One codepoint of a first bit-field can indicate the information of {a PUCCH resource ID, slot offset m$_1$ for the sidelink ACK/NACK feedback}. The mapping between codepoint of a first bit-field and the combination of {PUCCH resource ID, slot offset m$_1$ for sidelink ACK/NACK feedback} can be configured by higher layer signaling or pre-configured.

In one embodiment, a receiver UE of sidelink transmission can be configured with a uplink resource for the receiver UE to send the ACK/NACK of sidelink transmission to the serving gNB. For a receiver UE, after the receiver UE receives the transmission on one resource of sidelink, the receiver UE may transmit the NACK/ACK for the transmission on sidelink to the serving gNB through the uplink feedback channel that is configured to be associated with the transmission on sidelink.

As shown in FIG. 40, a transmitter UE 4002 has some packets to transmit to a receiver UE 4003 through the sidelink. The serving gNB 4001 can first send a downlink control signaling (for example one DCI) 4031 to allocate one sidelink resource 4032 for the transmitter UE 4002 to transmit packets to the receiver UE 4003. The gNB can also configure one uplink resource 4033 (for example one PUCCH resource) for the receiver UE to feedback the NACK/ACK for the transmission on sidelink resource 4032.

In one example, the feedback resource (uplink resources 4033) can be configured in the same DCI 4031 that allocates the sidelink resource 4032, where both transmitter UE 4002 and receiver UE 4003 may receive the DCI 4031 to obtain the sidelink resource allocation and the uplink feedback resource configuration.

In another example, the feedback resource (uplink resources 4033) can also be configured in another DCI 4034. The DCI 4034 and DCI 4031 can transmit in same or different slots. In this option, the transmitter UE 4002 only needs to decode DCI 4031 and the receiver UE 4003 only needs to decode DCI 4034.

In one embodiment, DCI 4034 can include one or more of the following information fields: the configuration of uplink feedback channel, for example, the configuration of one PUCCH resource including the location of slot, the location of symbols and the location of PRBs in frequency domain; and the location of associated sidelink resource. In the aforementioned embodiments and examples, there may be the information of allocated sidelink resource 4032. One example of the information can be the indexes of starting PRB of resource allocation 4032. One example of the information can be the indexes of the starting resource (or starting subchannel) of sidelink resource allocation 4032.

As shown in FIG. 40, the procedure and method for sending packet on sidelink can be: at step 1, 4041, the serving gNB can send a downlink control signaling 4031 (e.g., DCI) to allocate the sidelink resource 4042 for the transmitter UE 4002. The serving gNB can send a downlink control signaling (e.g., DCI 4034) to allocate an uplink feedback channel (uplink resources 4033) for the receiver UE 4003 to feedback NACK/ACK of the transmission on sidelink resource 4032.

Another alternative of step 1 is that the serving gNB send a downlink control signaling 4031 to allocate the sidelink resource 4042 for the transmitter UE 4002 and to allocate an uplink feedback channel (uplink resources 4033) for the receiver UE 4003 to feedback NACK/ACK of the transmission on sidelink resource 4032. Then the transmitter UE 4002 sends packet on allocated sidelink resource 4032 to the receiver UE 4003 at step 2 (e.g., 4042). After the receiver UE 4003 decodes the data from the PSSCH transmission in sidelink resource 4032, the receiver UE 4003 can report NACK/ACK in uplink feedback channel (uplink resources 4033) to the serving gNB 4001.

As shown in FIG. 40, the sidelink receiver UE can feedback ACK/NACK for one PSSCH transmission in sidelink to a serving gNB. The benefit for this design is that the ACK/NACK for PSSCH can be feed-backed to gNB with low latency and thus the gNB can schedule sidelink transmission with low latency. There are various embodiments and alternatives for configuring the PUCCH channel for V2X receiver UE to report ACK/NACK.

In one embodiment, the serving gNB can send one DCI format X1 to the V2X transmitter UE to schedule sidelink transmission for the transmitter UE. In the DCI format X1, the serving gNB can use one or more bit-field(s) to indicate one PUCCH channel in uplink for the V2X receiver UE to report the ACK/NACK for the PSSCH transmission that is allocated by the DCI format X1. When the V2X transmitter UE receives DCI format X1, the transmitter UE transmit PSSCH and PSCCH on sidelink on the sidelink resource according to the configuration and indication information contained in the DCI format X1. In the SCI sent in PSCCH, the transmitter UE can include the configuration of PUCCH channel for ACK/NACK indicated in the received DCI format X. In one example, the SCI element can contain the same bit-field(s) for indicating PUCCH resource for sidelink ACK/NACK sent in DCI format X. When the receiver UE receives the SCI element from PSCCH, the receiver UE can decode the PSSCH according to the scheduling information in the received SCI and then report the ACK/NACK of the decoded PSSCH in the PUCCH channel to the serving gNB according to the configuration in SCI.

In another embodiment, the serving gNB can send two DCI formats to allocate the sidelink transmission to a V2X transmitter UE and to configure PUCCH channel for reporting ACK/NACK of sidelink PSSCH to a V2X receiver UE. The serving gNB can send one DCI format Y1 to allocate sidelink resource to a V2X transmitter UE-A. When the UE-A receives DCI format Y1, the UE-A transmit PSCCH and PSSCH on a sidelink in the sidelink resource according to the configuration in DCI format Y1. The serving gNB can send one DCI format Y2 to the sidelink receiver UE-B to allocate PUCCH in one slot for the receiver UE-B to report ACK/NACK for the PSSCH transmission that is transmitted by UE-A according to the configuration in DCI format Y1. The receiver UE-B needs to know which PSSCH transmission the UE-B may report ACK/NACK for in the PUCCH configured through DCI format Y2.

In one example, both DCI format Y1 and Y2 can signal one-bit field, for example called SL process indicator. One DCI format Y1 and Y2 with the same codepoint of SL process indicator bit-field can schedule the sidelink transmission (PSCCH/PSSCH) to the transmitter UE and corresponding PUCCH channel for the receiver UE-B to report ACK/NACK of the PSSCH. The SCI element in PSCCH sent by the transmitter UE-B can include the bit-field SL process indicator, where the UE-B can be requested to put the same value in SL process indicator bit-field as in the DCI format Y1 the UE-B receives from the serving gNB.

In one embodiment, the receiver UE 4003 can report the information ACK/NACK for sidelink transmission to the serving gNB. In one example Alt1, the receiver UE 4003 can report the ACK to the serving gNB if the PSSCH is correctly decoded and the receiver UE 4003 can report the NACK to the serving gNB if the PSSCH is not correctly decoded. In another example of Alt2, the receiver UE 4003 can report the NACK to the serving gNB if the PSSCH is not correctly decoded and but the receiver UE 4003 does not report to the serving gNB if the PSSCH is correctly decoded.

One question is how to calculate the slot location for the PUCCH channel where the V2X receiver UE reports the ACK/NACK for PSSCH transmission. As designed in some of the methods in this disclosure, SCI sent in sidelink can include one bit-field to indicate the slot location for PUCCH channel for the receiver UE to report ACK/NACK of PSSCH to the serving gNB.

In one example, to report the ACK/NACK of PSSCH indicated by one SCI with one bit-field indicating slot offset for PUCCH channel, the receiver UE may report ACK/NACK of PSSCH in slot $k_1$ to the gNB and the slot $k_1$ is calculated as: $k_1$ is the first slot that starts not earlier than the time $T_0 + \Delta \times t_{slot} + \delta$, where $T_0$ is the start of the sidelink slot (or called subframe) carrying the SCI that indicates the corresponding PSSCH transmission, $\Delta$ is the slot offset of PUCCH channel indicated by the bit-field in SCI, $t_{slot}$ is the time length of one slot used by the serving gNB and $\delta$ is adjustment parameter that can be pre-configured or pre-defined. In one alternative, $T_0$ can be the start time of first symbol carrying the SCI. $T_0$ can be the start time of sidelink slot or subframe carrying the PSSCH transmission. $T_0$ can be the start time of first symbol carrying the PSSCH transmission.

For the transmission of PSSCH on sidelink, a receiver UE can feedback the ACK/NACK for that PSSCH transmission to the transmitter UE through sidelink. In one example a transmitter UE-A sends PSCCH and PSSCH in sidelink to a receiver UE-B and then the UE-B can feedback ACK/NACK for that PSSCH transmission to the UE-A.

In one embodiment, the sidelink feedback for UE-B to feedback ACK/NACK can be configured and indicated by the sidelink assignment message sent in PSCCH by the UE-A. The SCI can contain one or more bit-field to indicate one sidelink feedback channel for the UE-B to feedback ACK/NACK. In one example, SCI can contain two bit fields: bit field SL_feedback_channel_indicator to indicate the index of one SL feedback channel and bit field SL_feedback_time_indicator to indicate the sidelink slot offset for ACK/NACK transmission.

In one embodiment, the sidelink feedback for UE-B to feedback ACK/NACK can be configured through a preconfigured mapping between the feedback subchannel and PSCCH subchannel. In one example, the PSCCH subchannel p at sidelink slot $n_1$ is associated with the sidelink feedback subchannel p at sidelink slot $n_1 + \Delta_{ACK}$. The receiver UE can be requested to transmit ACK/NACK for PSSCH transmission that is indicated by SCI sent in PSCCH that is transmitted with starting from PSCCH subchannel p at sidelink slot $n_1$ in sidelink feedback subchannel p at sidelink slot $n_1 + \Delta_{ACK}$.

In one example, PSCCH can occupy one or more than one subchannels. If one PSCCH occupy more than one subchannels, for example, starting from subchannel p and occupying L subchannels at sidelink slot $n_1$. Then for the PSSCH transmission indicated by that PSCCH, the receiver UE can be requested to report ACK/NACK in feedback subchannels starting from subchannel p and occupying L subchannels at sidelink slot $n_1 + \Delta_{ACK}$.

In one embodiment, the ACK/NACK can be sent in PSSCH channel too. Thus in the above design, the indicated index of SL feedback subchannel would be an index of PSSCH subchannel in the resource pool configured for PSSCH.

In some examples, the transmitter UE would want to transmit the same packet multiple times without requiring the receiver UE to report ACK/NACK. By doing that, the transmitter UE is able to transmit the same packets through physical channel with short latency and thus can satisfy with the tight latency requirement of some advanced V2X services. To support that, the SCI for indicating transmission of PSSCH can have one or more of the following designs.

In one embodiment, the SCI that indicates the transmission of PSSCH can include a bit-field HARQ-process-number, a bit-field coding-redundancy-version, a bit-field transmission and re-transmission index. In one example, where for all the SCIs that indicates the PSSCH of same data packet, bit-field HARQ-process-number may be put the same value. In another example, the bit-field transmission and re-transmission index can be used to indicate the order of the indicate PSSCH transmission for one packet. In one example, the value of the bit-field transmission and re-transmission index in SCI indicating the first PSSCH transmission for a packet is set to 0 and the value of the bit-field transmission and re-transmission index in SCI indicating the second PSSCH transmission for a packet is set to 1.

In one embodiment, the SCI that indicates the transmission of PSSCH can include a bit-field Offset-next-transmission that can be used to indicate the time location for a potential retransmission of the same packet. In one example, a UE receives one SCI that indicates the transmission of PSSCH of one packet A or one TB (transport block). If that SCI contains bit field Offset-next-transmission, the UE can assume the transmitter UE might send a SCI in the time location as indicated by the codepoint of Offset-next-transmission, where the potential SCI would indicate the transmission of a PSSCH of the same packet A or the same TB. This design is useful to resolve the half-duplex problem in sidelink transmission.

In one example, the codepoint of Offset-next-transmission being a special value, for example 0, can be used to indicate that there will be no further retransmission for the same packet or TB (transport block).

In another example, the codepoint of Offset-next-transmission can be used to indicate the slot offset between the time location of current SCI and the time location where next SCI is transmitted potentially.

In another example, the codepoint of Offset-next-transmission can be used to indicate the symbol offset between the time location of current SCI and the time location where next SCI is transmitted potentially.

In one embodiment, the SCI that indicates the transmission of PSSCH can include a bit-field Offset-before-transmission that can be used to indicate the time location for a transmission of the same packet or TB before the current SCI. In one example, a UE receives one SCI that indicates the transmission of PSSCH of one packet A or one TB (transport block). If that SCI contains bit field Offset-before-transmission, the UE can assume the transmitter UE sent a SCI in the time location as indicated by the codepoint of Offset-before-transmission, where that SCI indicated the transmission of a PSSCH of the same packet A or the same TB. This design is useful to resolve the half-duplex problem in sidelink transmission.

In one example, the codepoint of Offset-before-transmission being a special value, for example 0, can be used to indicate that there is no transmission for the same packet or TB (transport block) before the current SCI transmission.

In another example, the codepoint of Offset-before-transmission can be used to indicate the slot offset between the time location of current SCI and the time location where the SCI before the current SCI is transmitted.

In yet another example, the codepoint of Offset-before-transmission can be used to indicate the symbol offset between the time location of current SCI and the time location where the SCI before the current SCI is transmitted.

In some embodiments, one UE can select sidelink resource through an autonomous way without s serving gNB to coordinate the resource allocation for sidelink. Such a resource selection method is called sidelink mode 4 in 3GPP specification. In mode 4, at time moment t, a UE can sense the channel for last 1 second to determine the availability of channels during a time window $t+t_1$ to $t+t_2$. The drawback for that resource selection method is that the transmission latency could be big due to the selection time window design. In 5G V2X, the end-to-end latency for some use case is as small as 2~3 milliseconds.

In one embodiment, a UE can be requested to select sidelink resource for transmission based on both decoding SA (scheduling assignment) and LBT (listen before talk)-type channel sensing. At time moment t, a UE can decode the SA received during time window $t-\Delta T_1 \sim t-\Delta T_2$ to determine which subchannels in slots in the time window $t+\Delta T_3 \sim t+\Delta T_4$ are reserved by other UEs, where $\Delta T_1 >= 0$, $\Delta T_2 >= 0$ and $\Delta T_1 > \Delta T_2$ and $\Delta T_3 >= 0$, $\Delta T_4 >= 0$ and $\Delta T_4 > \Delta T_3$. Each SA transmitted at slot n can include the information to indicate resource reservation at some future slot n+m (m>0). Based on the resource reservation from the decoded SAs, the UE can exclude all the subchannels in time window $t+\Delta T_3 \sim t+\Delta T_4$ that has been reserved by other UEs. Then the UE can do per-subchannel LBT to select subchannels from the remaining subchannel in time window $t+\Delta T_3 \sim t+\Delta T_4$.

The UE can sense measure the energy of each subchannel to do per-subchannel LBT. If the LBT of one subchannel passes, the UE can use that subchannel until, for example time $t+\Delta T_4$ or for example some (pre)configured occupying time length, for example the availability of that selected subchannel(s) before time $t+\Delta T_4$ is finished.

In one embodiment, when a UE A needs to select some sidelink subchannels to transmit packets on sidelink at slot $t_n^{SL}$, the UE can be requested to select one or more subchannels as follows.

In one example, the UE A can be requested to select subchannels from slots $\{t_{n+l1}^{SL}, t_{n+l1+1}^{SL}, \ldots, t_{n+l2}^{SL}\}$, where $l1>0$, $l2>0$ and $l2 \geq l1$. One example is $l1=1$ and $l2=4$. In one method, the choice of values of l1 and l2 can depend on the subcarrier spacing of the sidelink. For example, different values for l1 and l2 for subcarrier spacing 15 KHz, 30 KHz, 60 KHz, 120 KHz and 240 KHz may be chosen. A general method can be: choosing larger values for l1 and l2 for lager subcarrier spacing. Then the UE may choose the values of l1 and l2 based on the configured sidelink subcarrier spacing.

In one example, the UE A can be requested to first decode all the SA transmitted from other UEs in slots $\{t_{n-l3}^{SL}, t_{n-l3+1}^{SL}, \ldots t_{n-1}^{SL}\}$ and based on the decoded SAs, the UE A can find all the sidelink subchannels in slots $\{t_{+l1}^{SL}, t_{n+l1+1}^{SL}, \ldots, t_{n+l2}^{SL}\}$ that has been reserved by other UEs. The UE excludes all the subchannels of slots $\{t_{n+l1}^{SL}, t_{n+l1+1}^{SL}, \ldots, t_{n+l2}^{SL}\}$ that has been reserved by other UEs.

In one example, then the UE A can choose one or more subchannels from the remaining subchannel as candidate resource selection. The UE A performs per-subchannel (or called per-subband) LBT for those selected subchannel(s). If the LBT passes, the UE A can begin to transmit on the selected subchannel(s) until the last slots in which the selected subchannel(s) is not reserved by other UEs and no later than $t_{n+l2}^{SL}$.

Figure 41:
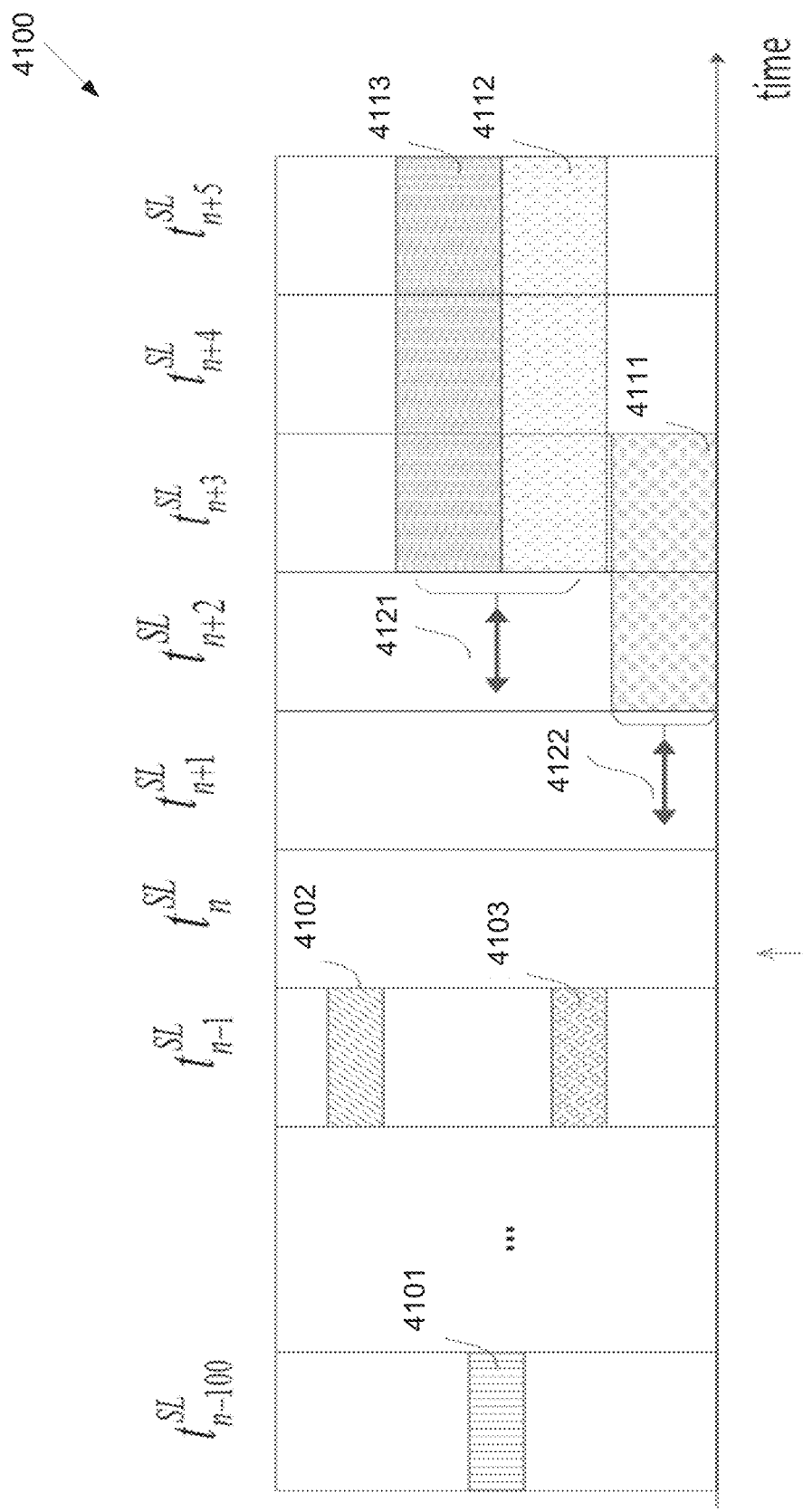
FIG. 41 illustrates an example sidelink resource selection by UE according to embodiments of the present disclosure.

FIG. 41 illustrates an example sidelink resource selection by UE 4100 according to embodiments of the present disclosure. The embodiment of the sidelink resource selection by UE 4100 illustrated in FIG. 41 is for illustration only. FIG. 41 does not limit the scope of the present disclosure to any particular implementation.

FIG. 41 illustrates an example of UE selecting sidelink resource (sidelink subchannels) based on the embodiments in this disclosure.

As shown in FIG. 41, a UE A has new packet arrival and need to select sidelink resource for transmission at the time of slot $t_n^{SL}$. The UE A can select some subchannels from sidelink slots $\{t_{n+2}^{SL}, t_{n+3}^{SL}, t_{n+4}^{SL}, t_{n+5}^{SL}\}$. The UE A can be requested to first decode all the SAs from slot $\{t_{n-100}^{SL}, \ldots, t_{n-1}^{SL}\}$.

As illustrated in FIG. 41, the UE A can decode SA 4101, SA 4102, and SA 414003. Based on the decoded SAs, the UE A can find out subchannel #1 4111 in slots $t_{n+2}^{SL}$ and $t_{n+3}^{SL}$ are not reserved by other UEs and subchannel #2 and #3, 4112 and 4113 in slots $t_{n+3}^{SL}$, $t_{n+4}^{SL}$ and $t_{n+5}^{SL}$ are not reserved by other UEs. If the UE A choose to select subchannel #1 4111, then the UE A can operate a LBT on the PRBs of subchannel #1 4111.

As shown in FIG. 41, the UE A can operate LBT 4122 for the subband occupied by subchannel 4111. If the LBT passes, the UE A can use subchannel #1 4111 in slots $t_{n+2}^{SL}$ and $t_{n+3}^{SL}$. If the UE A choose to select subchannel #2 and #3 4112, and 4113, then the UE A can operate a LBT on the PRBs of subchannel #2 and #3 4112 and 4113.

As shown in FIG. 41, the UE A can operate LBT 4121 for the subband occupied by subchannel #2 and #3 4112 and

4113. If the LBT passes, the UE A can use subchannel #1 4111 in slots $t_{n+3}^{SL}$ and $t_{n+4}^{SL}$ and $t_{n+5}^{SL}$.

In one embodiment, to operate the LBT for subchannel #1 4111 in FIG. 41, the UE A can measure the signal energy from the PRBs of subchannel #1 4111 for a given time duration. If the signal energy measured in the PRBs of subchannel #1 4111 is below some threshold, then the UE A can claim the LBT for subchannel #1 4111 passes. Otherwise, the UE A can claim the LBT for subchannel #1 4111 fails.

In one embodiment, to operate the LBT for subchannel #2 4112 and #3 4113 in FIG. 41, the UE A can do one or more of the followings.

In one example, the UE A measures the energy from the PRBs of 4112 and 4113. If the signal energy measured in the PRBs of 4112 and 4113 is below some threshold, then the UE A can claim the LBT for 4112 and 4113 passes. Otherwise, the UE A can claim the LBT for 4112 and 4113 fails.

In another example, the UE A can operate LBT on 4112 and 4113 separately. The UE A measures the signal energy of PRBs of 4112 for the LBT of 4112 and the UE A measures the signal energy of PRBs of 4113 for the LBT of 4113. If LBT of both 4112 and 4113 pass, then UE A can choose 4112 and 4113 to transmit. If the LBT of only one of 4112 and 4113 passes, the UE A can choose the one with passed LBT to transmit.

In one embodiment, a sidelink resource pool can be configured to be associated with a resource selection method. For example, a first sidelink resource pool is configured with resource selection method of using SA decoding and subchannel energy detection (i.e., the channel sensing method defined by mode 4) and a second sidelink resource pool is configured with resource selection method of using SA decoding and LBT on each selected subchannel.

In one embodiment, a UE can be requested to measure the channel occupation and detect the transmission on one sidelink subchannel before one transmission. If the UE can determine the channel condition on that sidelink subchannel is clear and available, the UE can use that subchannel to transmit his packet.

In one example, the UE can first transmit a pre-defined signal (can be called sidelink channel reservation signal) on the first symbol before the transmission of sidelink control and data if the UE determine the channel is clear on that subchannel. That pre-defined signal can convey one or more of the following information.

In one example, the information on priority (or QoS level) of the packet in the following transmission. The UE can be configured with multiple signal sequences (different sequences, or same root sequence but with different phase shift or cyclic shift) and also the association between signal sequences with priority of the sidelink packet. The UE may choose one signal sequence based on the priority level (or QoS level) of the packet that is transmitted. This design would be useful for other UE to choose proper behavior on resource selection. For example, a UE-A can occupy a first subchannel that is already occupied by UE-B if the packet of UE-B has lower priority (or lower QoS level) than UE-A's packet and the signal level measured from a first subchannel is below some threshold.

A UE can be requested to sense the signal power level or energy level of one or more sidelink subchannels and if the signal power or energy level on one sidelink subchannel is below some threshold for N time units, the UE can claim that subchannel is clear and available for him to transmit. Here each time unit can be one OFDM or DFT-s-OFDM symbol. Each time unit can be a half or one fourth of one OFDM or DFT-s-OFDM symbols. For the value N, the UE can select one value randomly from a pre-defined set, for example, the set for N can be 0~3.

In one embodiment, a UE can be configured with multiple sets for N value and configured with an association between sidelink traffic priority level (or QoS level) and the set of N values. In one example, the UE can be configured with: priority level 0 is associated with N value set {0, 1} and priority level 1 is associated with N value {0, 1, 2, 3}. Then for each transmission, the UE may choose the set of N values according to the priority level of the packet to be transmitted and then randomly choose one value of N from that set for the channel assessment.

A UE can measure the signal power level or energy level in one sidelink subchannel to determine whether that subchannel is clear and available for transmission. Generally, the UE can be configured with a threshold and if the signal power level or energy level is below that threshold, the UE can claim that subchannel is clear and available for him to transmit.

In one embodiment, a UE can be configured with the association between channel assessment thresholds and sidelink traffic priority (or QoS levels). In one example a UE can be configured with the following TABLE 4.

TABLE 4

| Index | Channel assessment threshold | Traffic priority levels |
|---|---|---|
| 0 | Thres__00 | {Priority a1, Priority a2} |
| 1 | Thres__01 | {Priority b1, Priority b2} |
| 2 | Thres__10 | {Priority c1, Priority c2} |
| 3 | Thres__11 | {Priority d1, Priority d2} |

Then for each traffic packet, the UE can choose associated channel assessment threshold based on the priority level (or QoS level) of that packet to do the channel assessment. For the traffic with tighter QoS requirement (or higher priority), for example, low-latency packet, a larger threshold may be configured so that the UE can find more chances to transmit. But for the traffic with looser QoS requirement (or lower priority), for example, non-delay-sensitive packet, a smaller threshold may be configured so that the UE can give more chances to high QoS-level services.

In one embodiment, a UE can be requested to operate two different channel assessments to determine whether the channel is available on one subchannel. The UE can be configured with two thresholds: a first threshold and a second threshold. On a first subchannel, the UE can sense the signal energy power level and also try to detect a pre-defined signal sequence and compare the signal level of the pre-defined signal sequence with a first threshold. The UE can also sense the energy level contain in a first subchannel and compare the detected energy level with a second threshold. If both conditions are met: the signal power level of pre-defined signal sequence is below a first threshold and the detected energy level is below than a second threshold, then the UE can claim the channel on a first subchannel is clear and available.

After one UE has measure the signal power level or energy level on sidelink subchannels, the UE can be sort those subchannel based one or more of the following factors: whether some other UE is transmitting on one subchannel or not; the traffic priority of packet transmitted on one subchannel if some UE is transmitting on that subchannel; the signal power level; and/or the energy level.

In one example, the UE can determine the choose-priority for each subchannel and then first choose those subchannels with higher choose-priority. The UE can tag each subchannel based on sensing according to the following criterions: the subchannel where no other UE is transmitting has higher choose-priority than the subchannel where some other UE is transmitting; the subchannel with lower energy level has higher choose-priority than the subchannel with higher energy level; and/or for two subchannels where some other UEs are transmitting, the subchannel where the transmitted packet has higher priority level (or QoS level) has lower choose-priority than the subchannel where the transmitted packet has lower priority level (or QoS level).

In one embodiment, an indicator value β can be configured for each traffic priority level and be also configured as an indicator value for no transmission. The UE can calculate a subchannel quality metric Δ based on the indicator value of traffic in that subchannel and the signal power/energy level measured from that subchannel and sort the subchannel based on the calculated subchannel quality metric Δ.

For one subchannel, the Δ=measured signal power/energy level in that subchannel—indicator value β on that subchannel based on the traffic priority of packet is transmitted or no transmission. Then the UE can sort all the measured subchannels based on Δ and the subchannel with larger value of Δ has lower choose-priority. In one example, the UE is configured as shown in TABLE 5.

TABLE 5

| index | Indicator value β | Traffic priority level (or QoS level) |
|---|---|---|
| 0 | $\beta_0$ | No transmission |
| 1 | $\beta_1$ | Traffic priority level 0 |
| 2 | $\beta_2$ | Traffic priority level 1 |
| 3 | $\beta_3$ | Traffic priority level 2 |

The UE measure and sense the channel on subchannels #0~9. For each subchannel i=0~9, the UE can measure the signal power or energy level $p^i$ and determine whether some other UE is using that subchannel or not and if using, what is the traffic priority level (QoS level) then determine the indicator value $\beta^i$. Then the UE can calculate $\Delta_i = p^i - \beta^i$, i=0,1, . . . ,9. And then the UE can sort the subchannels #0~9 with respect to the value of $\Delta_i$, i=0,1, . . . ,9 and put subchannel with lower value of $\Delta_i$ with higher choose-priority. The UE may first choose the subchannel with higher choose-priority for the transmission.

In one embodiment, a UE can be requested to use at least a source ID (or called transmitter ID) and target ID (or called receiver ID) to identify a HARQ transmission process in sidelink transmission. In SA on sidelink scheduling a data transmission on sidelink, the transmitter UE can include one or more of the following information is the SA (scheduling assignment) signaling. The SA signaling is generally a SCI (sidelink control information) elements sent in PSCCH channel.

In one example, a transmitter UE ID field contains one ID that can identify the transmitter UE. One example for the transmitter UE ID sent in SA signaling is that the transmitter UE can take the last N1 bits of some higher layer identity of the transmitter UE. Another example for the transmitter UE.

In another example, a receiver UE ID field contains one ID that can identify one receiver UE or one group of receive UEs. For example, if the transmission is unicast, then the receiver UE ID is one ID that identifies one receiver UE. If the transmission is groupcast, then the receiver UE ID is one ID that identifies the group of receiver UEs.

In yet another example, time offset between two adjacent transmissions in the same HARQ process is provided. This parameter indicates the time offset between the n-th transmission and (n+1)-th transmission in one same HARQ process, where n=1, 2, 3 . . . . This information is useful to further reduce the collision probability. For example, if both transmitter UE ID and receiver UE ID used in two different HARQ process are same, the UE can still differentiate these two process based on the time offset signaled in the SA signaling in both process.

In yet another example, one HARQ process number is provided.

In yet another example, one field to indicate whether the scheduled PSSCH transmission a new transmission for one TB or a re-transmission for one TB is provided.

In yet another example, one redundancy version field to indicate the redundancy version of the scheduled PSSCH transmission for one TB in a HARQ process is provided.

The procedure for one transmitter UE on sidelink can be: a transmitter UE-A has one packet to send to one target UE-B or one target group of UEs. The transmitter UE ID of UE-A is a first UE ID and the receiver UE ID of UE-B is a second UE ID (or the group ID of the target group of UEs is a second UE ID). The transmitter UE can transmit a first SCI containing a transmitter UE ID field being set to a first UE ID and a receiver UE ID field being set to a second UE ID at slot n and this SCI can schedule on data transmission in PSSCH.

The transmitter UE-A can transmit a second SCI containing a transmitter UE ID field being set to a first UE ID and a receiver UE ID field being set to a second UE ID at slot n+m and this SCI can schedule on data transmission in PSSCH (for example, if the transmitter UE receives NACK for the PSSCH transmission scheduled by a first SCI). At the receiver UE side: one receiver UE-B receives a first SCI containing a transmitter UE ID field being set to a first UE ID and a receiver UE ID field being set to a second UE ID at slot n and the UE-B receives a second SCI containing a transmitter UE ID field being set to a first UE ID and a receiver UE ID field being set to a second UE ID at slot n+m.

The receiver UE-B check the transmitter UE ID field and receiver UE ID field in both a first SCI and a second SCI. The receiver UE-B can determine the data transmission on PSSCH scheduled by a first SCI and a second SCI belong to one same HARQ process and the data transmission on PSSCH scheduled by a first SCI and a second SCI are the transmission and re-transmission of the same TB (transport block) in one same HARQ process. There exist a few alternatives for HARQ process on sidelink.

In one example of Alt1, the sidelink UE can use a transmitter UE ID and a receiver UE ID to identify a HARQ process. The sidelink UE can assume that the SCIs with same values in transmitter UE ID field and receiver UE ID field schedule the data transmission in the same HARQ process. The UE can assume a first SCI and a second SCI containing the same value in the transmitter UE ID field and receiver UE ID field schedules the transmission and re-transmission of same TB in one same HARQ process.

In one example of Alt2, the sidelink UE can use a transmitter UE ID and one HARQ process number to identify a HARQ process. The sidelink UE can assume that the SCIs with same values in transmitter UE ID field and HARQ process number field schedule the data transmission in one same HARQ process. The UE can assume a first SCI and a second SCI containing the same value in the transmitter UE ID field and HARQ process number field schedules the transmission and re-transmission of same TB in one same HARQ process.

In one example of Alt3, the sidelink UE can use a receiver UE ID and one HARQ process number to identify a HARQ process. The sidelink UE can assume that the SCIs with same values in receiver UE ID field and HARQ process number field schedule the data transmission in one same HARQ process. The UE can assume a first SCI and a second SCI containing the same value in the receiver UE ID field and HARQ process number field schedules the transmission and re-transmission of same TB in one same HARQ process.

In one example of Alt4, the sidelink UE can use a transmitter UE ID, a receiver UE ID and one HARQ process number to identify a HARQ process. The sidelink UE can assume that the SCIs with same values in transmitter UE ID field, receiver UE ID field and HARQ process number field schedule the data transmission in one same HARQ process. The UE can assume a first SCI and a second SCI containing the same value in the transmitter UE ID field, receiver UE ID field and HARQ process number field schedules the transmission and re-transmission of same TB in one same HARQ process.

Figure 42:
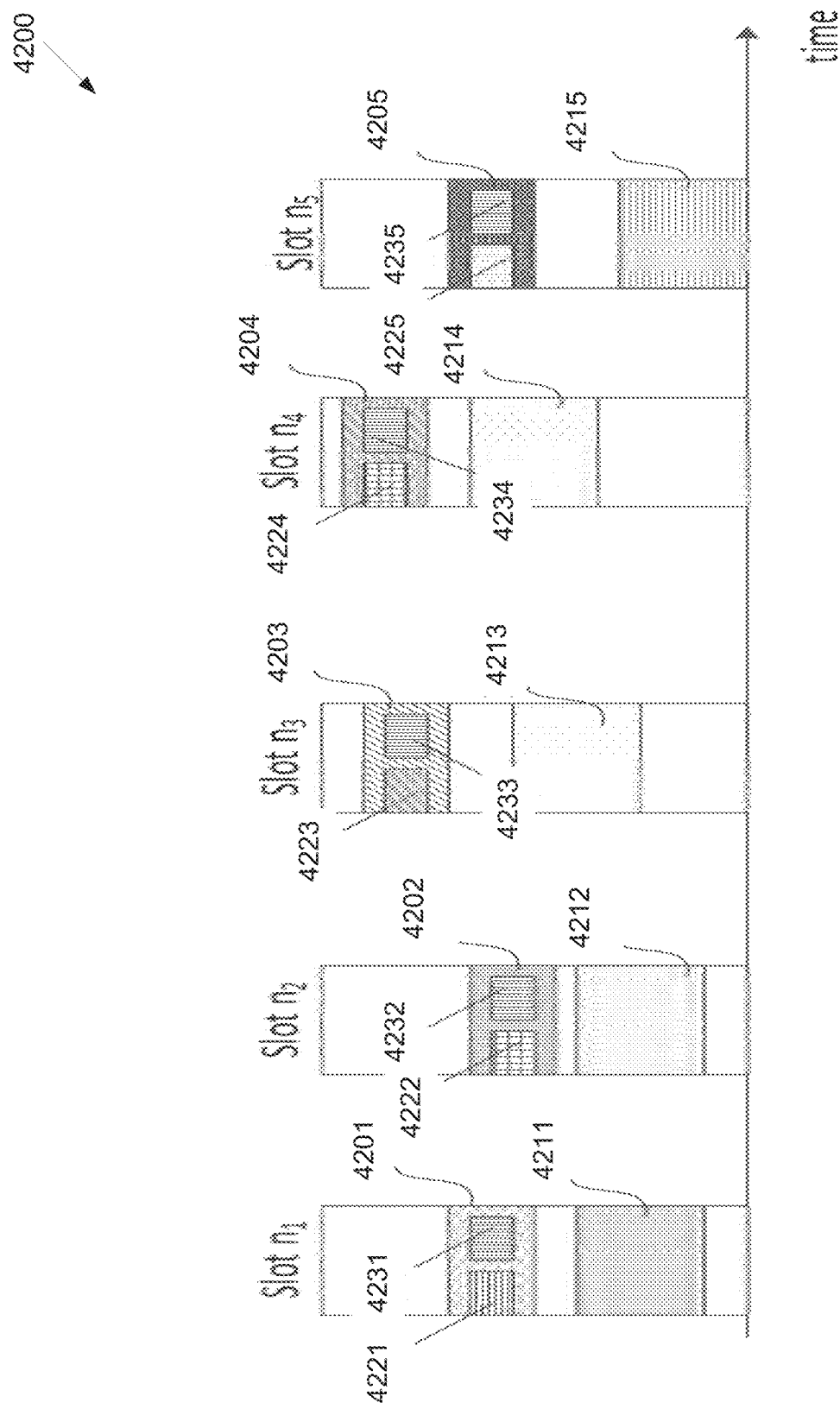
FIG. 42 illustrates an example sidelink HARQ transmission according to embodiments of the present disclosure.

FIG. 42 illustrates an example sidelink HARQ transmission 4200 according to embodiments of the present disclosure. The embodiment of the sidelink HARQ transmission 4200 illustrated in FIG. 42 is for illustration only. FIG. 42 does not limit the scope of the present disclosure to any particular implementation.

FIG. 42 illustrates a method of HARQ transmission procedure in sidelink according to the embodiments in this disclosure.

As shown in FIG. 42, SCI 4201 is transmitted at slot $n_1$ to schedule a PSSCH transmission 4211, SCI 4202 is transmitted at slot $n_2$ to schedule a PSSCH transmission 4212, SCI 4203 is transmitted at slot $n_3$ to schedule a PSSCH transmission 1113, SCI 4204 is transmitted at slot $n_4$ to schedule a PSSCH transmission 1114 and SCI 4205 is transmitted at slot $n_5$ to schedule a PSSCH transmission 4215. SCI 4201 contains a transmitter UE ID (or called source ID) 4221 and a receiver UE ID (or called target ID) 4231. SCI 4202 contains a transmitter UE ID (or called source ID) 4222 and a receiver UE ID (or called target ID) 4232. SCI 4203 contains a transmitter UE ID (or called source ID) 4223 and a receiver UE ID (or called target ID) 4233. SCI 4204 contains a transmitter UE ID (or called source ID) 4224 and a receiver UE ID (or called target ID) 4234 and SCI 4205 contains a transmitter UE ID (or called source ID) 4225 and a receiver UE ID (or called target ID) 4235. The PSSCH transmissions 4211, 4213, and 4215 belong to one same HARQ process and the PSSCH transmissions are the transmission or re-transmission for one same TB. So, the transmitter UE ID field 4221, 4223, and 4225 in SCI 4201, 4203, and 4205 have the same value.

The receiver UE ID field 4231, 4233, and 4235 in SCI 4201, 4203, and 4205 have the same value. The PSSCH transmissions 4212 and 4215 belong to one same HARQ process and the PSSCH transmissions are the transmission or re-transmission for one same TB. The transmitter UE for PSCCH (e.g., 4201, 4203 and 4205) can be requested to prepare SCI contents accordingly. And the transmitter UE for PSCCH (e.g., 4202 and 4204) can be requested to prepare SCI contents accordingly. A receiver UE can be requested to use the transmitter UE ID and receiver UE ID in each SCI to determine the HARQ process.

The example in FIG. 42 illustrates one example for Alt1. For Alt2, Alt3 and Alt4, similar procedure can be derived based on the procedure shown in FIG. 42.

In one embodiment, the receiver UE ID field in one SCI being a special predefined value can indicate the data transmission being scheduled by that SCI is broadcast transmission.

In one embodiment, a UE can send sidelink control information (SCI) in a sidelink PSCCH channel to indicate the transmission of corresponding PSSCH transmission (sidelink data channel).

The SCI can include one or more of the following information: a destination ID that is used to identify a receiver UE or a receiver UE group, or a called target ID, a target UE ID, a target UE group ID, a destination UE ID, a destination UE group ID; a source ID that is used to identify the transmitter UE, or a called transmitter ID, a transmitter UE ID; a HARQ process number that is used to identify one process of HARQ transmission procedure in sidelink, or called sidelink HARQ process number; new data or re-transmission indicator used to indicate whether the corresponding PSSCH is a new transmission or re-transmission; and/or the resource allocation and transmission configuration (for example MCS level, DM-RS configuration, sidelink phase noise reference signal PT-RS, number of layers, MIMO transmission scheme) for the corresponding PSSCH.

There are a few embodiment to deliver the destination ID in one SCI.

In one embodiment, the destination ID can be used to scramble the CRC (cyclic redundancy check) bits attached to the SCI. In one example, the entire payload of one SCI is used to calculate the CRC parity bits. Denote the bits of the SCI payload by $a_0, a_1, a_2, a_3, \ldots, a_{A-1}$, and the parity bits by $p_0, p_1, p_2, p_3, \ldots, p_{L-1}$, where A is the SCI payload size and L is the number of parity bits. Let $a'_0, a'_1, a'_2, a'_3, \ldots, a'_{A+L-1}$ be a bit sequence such that $a'_i=1$ for $i=0,1,\ldots,L-1$ and $a'_i = a_{i-L}$ for $i=L,L+1,\ldots,A+L-1$.

The parity bits are computed with input bit sequence $a'_0, a'_1, a'_2, a'_3, \ldots, a'_{A-L-1}$ and attached. The output bit $b_0, b_1, b_2, b_3, \ldots, b_{K-1}$ is $b_k = a_k$ for $k=0,1,2,\ldots,A-1$, $b_k = p_{k-A}$ for $k=A, A+1, A+2, \ldots, A+L-1$ where $K=A+L$.

After attachment, the CRC parity bits are scrambled with the corresponding destination ID $x_0, x_1, \ldots, x_{11}$, where $x_0$ corresponds to the MSB (most significant bit) of the destination ID, to form the sequence of bits $c_0, c_1, c_2, c_3, \ldots, c_{K-1}$. The relation between $c_k$ and $b_k$ is: $c_k = b_k$ for $k=0, 1, 2, \ldots, A+11$ and $c_k = (b_k + x_{k-A-12}) \bmod 2$ for $k=A+12, A+13, A+14, \ldots, A+23$.

In one embodiment, the destination ID can be signaled through one bit-field contained in SCI.

In one embodiment, the destination ID can be partitioned into two parts: a first part and a second part. And then A first part is used to scramble the CRC that is attached to the SCI and a second part is signaled through one bit-field contained in SCI. In one example, a destination ID is $x_0, x_1, \ldots, x_{15}$ where $x_0$ corresponds to the MSB of the destination ID. Part of that destination ID, for example, MSB 8 bits $x_0, x_1, \ldots, x_7$ is used to scramble the CRC attached to the SCI and the other bits of the destination ID $x_8, x_9, \ldots, x_{15}$ is conveyed in one bit-field in the SCI.

In one embodiment, a special value of destination ID can be used to indicate that the PSSCH indicated by that SCI is a broadcast transmission. In one example, that destination ID can be all 0s. In one example, that destination ID can be all 1s. In one example, the CRC for the SCI scheduling PSSCH transmission for broadcast transmission is not scrambled and the receiver UE can determine if one PSSCH transmission is for broadcast transmission or not based on whether the CRC attached to the corresponding SCI is scrambled or not.

In one embodiment, when the UE generates destination ID for unicast or groupcast, the UE may avoid the generated destination ID to be same to the special value used for broadcast transmission (e.g., all 0s).

In one example, the physical layer destination ID can be the last N (e.g., 8, 12, 16) bits of one higher layer UE ID or group ID and assume the special value used for broadcast transmission is 0, then the UE may generate the physical layer destination ID as: a physical layer destination ID=last N bits of (higher layer UE ID or group ID+1), if resulted Physical layer destination ID≠0; Otherwise, physical layer destination ID=last N bits of higher layer UE ID or group ID.

When a source ID are conveyed in SCI, there are a few embodiments to convey the source ID: in one example, a source ID can be signaled in one bit-field contained in a SCI; in another example, a source ID can be used to scramble some bits of the CRC attached to the SCI; and in yet another example, the CRC attached to the SCI can be scrambled by both a source ID and a destination ID.

In one example, the entire payload of one SCI is used to calculate the CRC parity bits. Denote the bits of the SCI payload by $a_0, a_1, a_2, a_3, \ldots, a_{A-1}$, and the parity bits by $p_0, p_1, p_2, p_3, \ldots, p_{L-1}$, where A is the SCI payload size and L is the number of parity bits. Let $a'_0, a'_1, a'_2, a'_3, \ldots, a'_{A+L-1}$ be a bit sequence such that $a'_i=1$ for $i=0,1,\ldots,L-1$ and $a'_i=a_{i-L}$ for $i=L, L+1, \ldots, A+L-1$. The parity bits are computed with input bit sequence $a'_0, a'_1, a'_2, a'_3, \ldots, a'_{A+L-1}$ and attached. The output bit $b_0, b_1, b_2, b_3, \ldots, b_{K-1}$ is $b_k=a_k$ for $k=0,1,2,\ldots,A-1$ and $b_k=p_{k-A}$ for $k=A, A+1, A+2, \ldots, A+L-1$, where $K=A+L$. After attachment, the CRC parity bits are scrambled with the corresponding destination ID $x_{d,0}, x_{d,1}, \ldots, x_{d,15}$ and source ID $x_{s,0}, x_{s,1}, \ldots, x_{s,15}$ to form the sequence bits $c_0, c_1, \ldots, c_{K-1}$. The relation between $c_k$ and $b_k$ is: $c_k=b_k$ for $k=0,1,2\ldots,A+7$ and $c_k=(b_k+x_{s,k-A-8}) \bmod 2$ for $k=A+8, A+9, \ldots, A+15$ and $c_k=(b_k+x_{d,k-A-16}) \bmod 2$ for $k=A+16, A+17, \ldots, A+23$.

In yet another example, a source ID can be partitioned in two parts: a first part and a second part. A first part can be used to scramble the CRC attached to the SCI and a second part can be signaled in one-bit field in the SCI.

In one embodiment, one bit-field in the SCI can be used to jointly signal a source ID and a HARQ process number. In one example, a bit-field A0 in SCI is used to jointly signal a source ID and a HARQ process number. The MSB 3 bits of bit-field A0 can be the bits for HARQ process number and the other bits of bit-field A0 can carry the bits for the source ID.

In one embodiment, SCI can include one bit-field to indicate whether HARQ-AC/NACK feedback is required for the scheduled PSSCH or not. If that bit-field indicates the receiver UE to send HARQ-ACK/NACK feedback, the receiver UE may transmit corresponding feedback in the associated sidelink feedback channel or send to a gNB. If that bit-field indicates that the receiver UE not to send HARQ-ACK/NACK feedback, the receiver UE may not report corresponding HARQ feedback.

In one embodiment, a UE can be configured with one or more formats for a sidelink feedback control information (SCFI) for the feedback for HARQ transmission.

In one example, a UE can be configured with SCFI format 1 for the HARQ feedback for unicast PSSCH transmission and a UE can be configured with SCFI format 2 for the HARQ feedback for a groupcast PSSCH transmission. And the UE can be requested to choose proper SCFI format according the transmission configuration of a PSSCH. For a PSSCH that is unicast transmission, i.e., the corresponding SCI contain a layer-1 destination ID that identify that receiver UE, the receiver UE can be requested to choose SCFI format 1 to transmit in the configured sidelink feedback channel. For a PSSCH that is a groupcast transmission, i.e., the corresponding SCI contains a layer-1 destination ID that identify a UE group that contains a first UE, the a first UE can be requested to choose SCFI format 2 to transmit the in the configured sidelink feedback channel. In SCFI format 1, the receiver UE can be requested to transmit ACK if the PSSCH is correctly decoded and NACK if the PSSCH is not correctly decoded. In SCFI format 2, the receiver can be requested to transmit NACK if the PSSCH is not correctly decoded and does not transmit HARQ feedback if the PSSCH is correctly decoded. The benefit for such a design is that a unified sidelink feedback design for unicast and groupcast PSSCH transmissions may be provided.

In one example, a SCFI format 3 can be the receiver UE only feedback ACK for one PSSCH transmission if the PSSCH is decoded correctly. But if the PSSCH is not decoded correctly, the receiver UE does not feedback any information. This format 3 can be useful for groupcast sidelink transmission where multiple receiver UEs are supposed to decode one same PSSCH.

In one embodiment, multiple sidelink feedback channels are associated with one groupcast PSSCH transmission. The receiver UE may determine the index of sidelink feedback channel for him to feedback HARQ-ACK/NACK for that groupcast PSSCH transmission. In one method, the receiver UE may determine the index of sidelink feedback channel based on his sidelink UE ID and the order of his UE ID among the receiver UEs in the receiver UE group of that groupcast PSSCH.

In one embodiment, two sidelink feedback channels (a first sidelink feedback channel and a second sidelink feedback channel) are associated with one groupcast PSSCH transmission. The receiver UE may choose one of those sidelink feedback channels according to the decoding result of that PSSCH transmission and then transmit accordingly. In one example, if the PSSCH is decoded correctly, the UE may choose a first sidelink feedback channel and then transmit ACK and if the PSSCH is not decoded correctly. The UE may choose a second sidelink feedback channel and then transmit NACK.

In one embodiment, for a groupcast PSSCH transmission, the receiver UE may only feedback HARQ-ACK when the PSSCH is decoded correctly but if the PSSCH is not decoded correctly, the receiver UE does not feedback anything. With such feedback, the transmitter UE or the gNB can know which UE(s) have received the PSSCH correctly and which UE(s) has not received the PSSCH correctly.

When one group of sidelink UEs is formulated for groupcast transmission, a receiver UE group ID is allocated for the group of those receiver UEs and each UE in that group may be indicated with the IDs of all other UEs in that UE group. In other word, each UE may be indicated with the following information: {The ID of UE group, the ID of a first UE in that group, the ID of a second UE in that group, . . . }.

Each UE can be associated with a HARQ-ACK sequence ID with which the UE may transmit the HARQ-ACK/NACK for a PSSCH. This PSSCH can be a groupcast transmission. This PSSCH can be a unicast transmission.

In one embodiment, the UE is configured with different SCI formats for unicast/groupcast and broadcast: for example, SCI format A1 is used for unicast/groupcast and SCI format A2 is used for broadcast. In SCI format A1, destination ID is transmitted (e.g., as one bit-field in SCI format A1 or scrambles the CRC of SCI format A1). In SCI format A2, there is no destination ID. The UE can be configured to only detect SCI format A1 or SCI format A2 in one resource pool. The UE can be configured to detect both SCI format A1 and SCI format A2 in one resource pool.

In one embodiment, one SCI can be a two-part SCI which contains SCI part 1 and SCI part 2. The existence of SCI part 2 and the configuration of SCI part 2 can be signaled in SCI part 1. A receiver UE can first decode SCI part 1 and go ahead to decode SCI part 2 according to the indication in SCI part 1.

In one example, the SCI part 1 can indicate the resource allocation and MCS for the corresponding PSSCH and also indicate whether the SCI part 2 exists or not. The SCI part 2 can include the information transmitter UE ID, HARQ process configuration (e.g. HARQ process number, new data indicator) and configuration information for multi-antenna transmission applied to the PSSCH. The SCI part 1 can include the receiver ID information.

In one embodiment, the SCI part 1 can indicate the resource allocation for SCI part 2 and the receiver ID of the SCI part 2 and also the corresponding PSSCH. Then the receiver UE can determine whether the receiver UE needs to decode SCI part 2 based on the receiver ID conveyed in SCI part 1 and if needed, the receiver UE can go ahead to decode SCI part 2 based on the resource allocation information indicated in SCI part 1.

In one example, the SCI part 1 can indicate the information of receiver ID. For example, the receiver ID can be the ID of one UE for a unicast transmission, a receiver group ID for a groupcast transmission and a special ID to indicate that the corresponding PSSCH transmission is broadcast transmission. The receiver UE can first decode the SCI part 1 and if the receiver UE is the target UE for the corresponding PSSCH, then the receiver UE can go ahead to decode SCI part 2 for more information of the configuration of PSSCH.

In SCI part 2, one or more of the following information can be included: the ID of transmitter UE; a HARQ process number; a new data indicator to indicate whether the PSSCH transmission is a new transmission for one TB or retransmission for one TB; the DM-RS antenna port configuration and the configuration of layers for MIMO transmission; and/or the time and frequency resource allocation for the PSSCH; the MCS level used in the PSSCH.

In one embodiment, the SCI part 1 and the SCI part 2 can be transmitted in same sidelink slot. In one method, the SCI part 1 and the SCI part 2 can send in different sidelink slot. In one example, an SCI part 1 is sent at sidelink slot n and an SCI part 2 is sent at sidelink slot n+m. So the SCI part 1 may include the slot offset information for the SCI part 2 for the receiver UE to derive the resource allocation for SCI part 2. The SCI part 1 can include the MCS used by the SCI part 2 so that link adaptation can be applied to SCI part 2. That is useful for unicast and groupcast transmission where link adaptation and power control for sidelink can be applied to improve the resource efficiency of sidelink.

In one embodiment, a first UE can generate a first UE ID for sidelink as his physical layer identity. When a first UE transmit packet on sidelink, this a first UE ID can be used as the transmitter UE ID and when other UE transmit packet on sidelink to a first UE, this a first UE ID can be used as the receiver UE ID. In one method, a first UE ID can be generated based on a higher layer ID of a first UE. For example, a first UE ID can be the last p>1 bits of a higher layer ID. In one method, a first UE ID can be generated by a first UE based on a high layer ID of a first UE and the sensing of SA transmitted from other UEs on sidelink. A first UE ID can generate a first UE ID by using the last p>1 bits of a higher layer ID and then the UE checks all the transmitter UE IDs that the UE can decode from the SA transmitted by other UEs. If the generated a first UE ID is not same to any of those decoded transmitter UE IDs, then the UE can use a first UE ID as his UE ID. If the generated a first UE ID is equal to some of those decoded transmitter IDs, then the UE revise a first UE ID to a first UE ID−Δ, where Δ can be +/−1,+/−2,+/−3 . . . , and Δ is the value with minimal absolute value so that the revise UE ID: a first UE ID−Δ is not same to any one of those decoded transmitter UE IDs.

In one embodiment, a serving gNB can schedule a set of resources to a group of UEs for the transmission within that group of UEs. In other word, the serving gNB can schedule a set of sidelink resources for groupcast UE to a group of UEs. This design is useful for the V2X services, for example platooning. For a group of V2X UEs, the serving gNB can allocate a set of sidelink resources in multiple sidelink slots for the transmission within that group of V2X UEs, i.e., for the groupcast sidelink transmission within that group of V2X UEs. With such configuration, in each of those configured sidelink slots, one of the V2X UE in that group can transmit sidelink transmission (PSCCH and PSSCH) that is targeted to the UEs within the same group on those configured resource.

The serving gNB can signal one or more of the following information to a first UE group: the sidelink resource allocation in frequency domain in one sidelink slot; the sidelink resource symbol allocation in one sidelink slot; the indices of slots of sidelink slot where the UE-A is allocated with sidelink resource; the number of transmission the UE-A can transmit on the sidelink; and/or the frequency hopping pattern sidelink resource allocation.

In one example, a UE-A can be configured with groupcast RNTI (for example called SL-Group-C-RNTI) to monitor a DCI format Z0 for the sidelink resource allocation for a V2X UE group. The serving gNB can send a DCI format Z0 with CRC scrambled by SL-Group-C-RNTI to indicate sidelink resource and transmission allocation to a group of V2X UEs and DCI format Z0 can include one or more of the following information elements.

In one example, a number of total transmission chances, i.e., the number of sidelink slots where sidelink resource is allocated to the group of UEs.

In another example, the location of sidelink slots allocated to the group of UEs is provided: the location of sidelink slots can be signaled through a slot periodicity. And the first sidelink slot allocated to the UE-A can be explicitly signaled through one slot-offset field in the DCI format Z. The first sidelink slot allocated to the group of UEs can be implicitly calculated based on the slot location where the DCI format Z is detected, for example the first sidelink slot can be the earliest sidelink slot that is not earlier than the time of one predefined/preconfigured time offset+the starting time of slot where the DCI format Z is detected.

In yet another example, the frequency domain location of resource allocation and frequency-hopping pattern.

In yet another example, a bit-field to indicate the time-domain locations and frequency-domain locations and the number of one multi-shot sidelink transmission. Each codepoint of that bit-field can indicate one configuration of a multi-shot sidelink transmission of {time-domain locations of sidelink slots/symbols frequency-domain locations, the number of transmission chances}.

In one example, the serving gNB can configure and signal a SPS (semi-persistent) sidelink resource allocation and transmission for a V2X UE group for the groupcast transmission within that UE group.

In one embodiment, a serving gNB can configure a multi-shot SL transmission on sidelink. In this design, the serving gNB can allocate N≥1 transmission chances in sidelink to a UE-A and then UE-A can transmit on the resources as scheduled by the serving gNB.

The serving gNB can signal one or more of the following information to the UE-A: the sidelink resource allocation in frequency domain in one sidelink slot; the sidelink resource symbol allocation in one sidelink slot; the indices of slots of sidelink slot where the UE-A is allocated with sidelink resource; the number of transmission the UE-A can transmit on the sidelink; and/or the frequency hopping pattern sidelink resource allocation.

In one example, the UE-A can be configured by the serving gNB with a sidelink resource allocation configuration containing N≥1 transmission chances at sidelink slots $\{t_1, t_2, \ldots, t_N\}$ and the frequency-domain allocation in each of those slots and symbol location in each of those slots. Then the UE-A can transmit sidelink transmission in those slots on the allocated frequency-domain and time-domain resource in each of those slots as configured by the serving gNB. This method can be called a multi-shot sidelink allocation.

In one embodiment, the configuration of multi-shot sidelink allocation for a UE-A can be signaled through a DCI format Z from the gNB. In the DCI format Z, the gNB can indicate one or more of the following information.

In one example, a number of total transmission chances, i.e., the number of sidelink slots where sidelink resource is allocated to the UE-A.

In another example, the location of sidelink slots allocated to the UE-A is provided: the location of sidelink slots can be signaled through a slot periodicity. And the first sidelink slot allocated to the UE-A can be explicitly signaled through one slot-offset field in the DCI format Z. The first sidelink slot allocated to the UE-A can be implicitly calculated based on the slot location where the DCI format Z is detected, for example the first sidelink slot can be the earliest sidelink slot that is not earlier than the time of one predefined/preconfigured time offset+the starting time of slot where the DCI format Z is detected.

In yet another example, the frequency domain location of resource allocation and frequency-hopping pattern.

In yet another example, a bit-field to indicate the time-domain locations and frequency-domain locations and the number of one multi-shot sidelink transmission. Each codepoint of that bit-field can indicate one configuration of a multi-shot sidelink transmission of {time-domain locations of sidelink slots/symbols frequency-domain locations, the number of transmission chances}.

In one embodiment, a serving gNB can send signaling through the NR (new radio) link to a UE to allocate resource on a LTE sidelink connection. A serving gNB can send configuration to configure the LTE sidelink channels and resources for a UE. When the UE has traffic for transmission on sidelink, the UE can request the resource allocation of sidelink to the serving gNB.

The UE can indicate the following information to request sidelink resource allocation: the amount of data in UE's buffer for transmission on sidelink; the type of the traffic, for example the QoS or priority indicator; and/or which sidelink the UE requests for the resource allocation, a LTE sidelink or a NR sidelink.

Then the serving gNB can a downlink signaling (for example one DCI format) to the UE to indicate the resource allocation on one sidelink.

Figure 43:
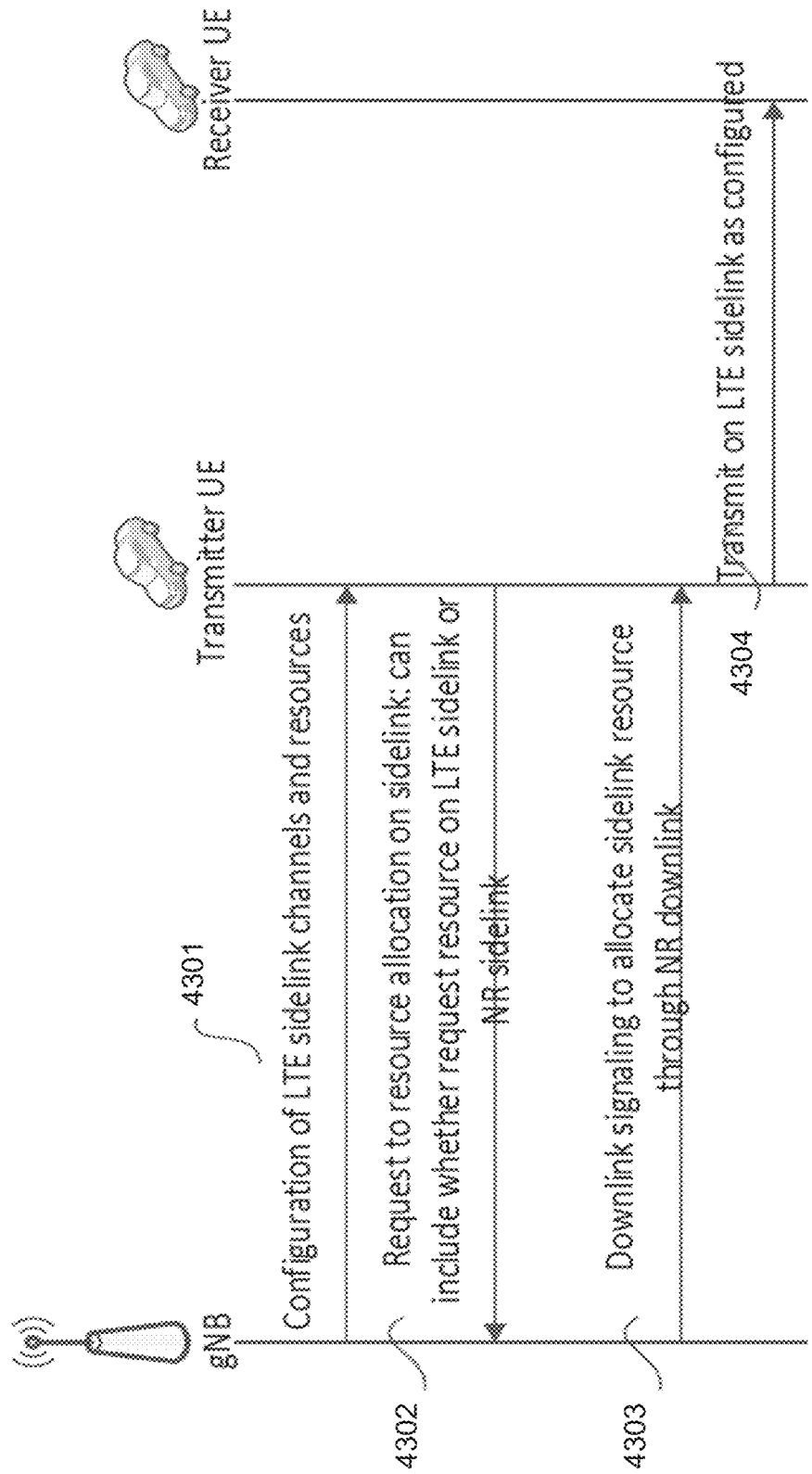
FIG. 43 illustrates an example call flow for V2X communication according to embodiments of the present disclosure.

FIG. 43 illustrates an example call flow for V2X communication 4300 according to embodiments of the present disclosure. The embodiment of the call flow for V2X communication 4300 illustrated in FIG. 43 is for illustration only. FIG. 43 does not limit the scope of the present disclosure to any particular implementation.

FIG. 43 illustrates a procedure of a serving gNB for NR scheduling resource allocation on LTE sidelink according to the embodiments in this disclosure.

As shown in FIG. 43, a gNB can send the configuration of LTE sidelink channels and resources through a NR link in 4301. When the transmitter UE has some packet, the UE can send a request to gNB 4302 to request resource allocation on sidelink. In the request, the UE can indicate whether the UE requests resource on a LTE sidelink or a NR sidelink. Then in 4303, the gNB send downlink signaling (for example one DCI) to the transmitter UE to allocate resource on some sidelink. The gNB can indicate whether the resource allocation indicated in the downlink signaling is for a LTE sidelink or a NR sidelink. Then in 4304, after the transmitter UE receives the indication from the serving gNB, the UE can transmit on the allocated resource on sidelink accordingly 4304.

In one embodiment, a UE can be configured to monitor one DCI format 2_x for the resource allocation on sidelink. The DCI format 2_x can be with CRC scrambled by a RNTI (for example called V-RNTI) that is configured for detecting DCI for V2X communication. The DCI format 2_x can include one or more of the following elements.

In one example of an indicator for DCI use case, this field can indicate whether the DCI is used for resource allocation on a LTE sidelink or on a NR sidelink. This field can be 1 bit. In one example, the value of this field can indicate a DCI format for resource allocation in LTE sidelink and the value of this field can indicate a DCI format for resource allocation in NR sidelink.

In one example of a carrier indicator, this field can indicate one carrier of LTE sidelink or NR sidelink. In one example, if the field of "indicator for DCI use case" indicates LTE sidelink, then the value of the field "carrier indicator" corresponds to the LTE sidelink carrier configuration. If the field "indicator for DCI use case" indicates NR sidelink, then the value of the field "carrier indicator" corresponds to the NR sidelink carrier configuration.

In one example, a first DCI format 2_x1 is used to indicate the resource allocation on LTE side link and a second DCI format 2_x2 is used to indicate the resource allocation on an NR sidelink. The UE can be configured to assume two different RNTI to scramble the CRC of DCI format 2_x1 and DCI format 2_x2. For example, the UE can be configured to assume the CRC of DCI format2_x1 is scrambled by LTE-V-RNTI and the CRC of DCI format_2_x2 is scrambled by NR-V-RNTI. The UE may use corresponding RNTI to decode the DCI format 2_x1 or 2_x2 for the resource allocation on LTE sidelink or NR sidelink.

In one embodiment, a UE can send a sidelink buffer status report message to a serving gNB to report the sidelink packet status and request resource allocation on sidelink. The sidelink buffer status report message can include one or more of the following information.

In one example of the target sidelink, the target sidelink for the corresponding data buffer is provided. It can be indicated that the buffered data is for LTE sidelink and NR sidelink. In one example, this field can be 1 bit and the value of this 1-bit field can indicate LTE sidelink or NR sidelink.

In one example of buffer size, the buffer size field indicates the total amount of data available across all the logical channels for the indicated sidelink, i.e., LTE sidelink or NR sidelink.

In one example of the type of data in the buffer, it can be indicated whether the data is supposed to transmit on a LTE sidelink or NR sidelink.

The above information is useful for a serving gNB to properly allocate resource between LTE sidelink and NR sidelink so that a NR serving gNB is able to control both LTE sidelink and NR sidelink.

In one embodiment, among a group of multiple UEs, a first UE can be selected as a scheduler UE and the first UE can schedule and allocate sidelink resource to all the other UEs in that group. And all the UEs other than a first UE may monitor the control message from a first UE and then transmit data as indicated by a first UE and one UE can receiver sidelink transmission as indicated by a first UE.

In one example, a group of UEs: UE-A, UE-B, UE-C and UE-D. The UE-A can be configured/selected as a scheduler UE among those UEs. When the UE-B has some packet to transmit, the UE-B can send signaling to request sidelink resource from UE-A. Then the UE-A can send signaling to indicate the resource allocation for the UE-B to transmit. The UE-B can then transmit on the allocated sidelink resource as indicated by the UE-A. Assume the transmission target is UE-C. The UE-A can also inform the UE-C to receive that packet from scheduled resource allocation.

To support this resource allocation mechanism, a few scheme and signaling designs may be provided to include: a mechanism to formulate the scheduler UE and the group of UE that the scheduler UE can control, how to share the sidelink resource pools with other UE, a signaling for UE to request sidelink resource from scheduler UE, a signaling for scheduler UE to allocate or "schedule" the resource and transmission and reception on sidelink.

In one embodiment, there are a group of UEs: a UE-A, a UE-B, a UE-C, and a UE-D. The UE-A is configured/selected as the scheduler UE which can control and allocate sidelink resource to those UEs. There are various alternative designs for the UE-A to control the resource and transmission on sidelink among those UEs.

In one example of Alt #1, the UE-A can send one signaling (for example one SCI) that includes the configuration and resource allocation information for one PSSCH transmission that is transmitted from one of {UE-A, UE-B, UE-C and UE-D}. Then the source UE may transmit PSSCH as configured/indicated in the e.g., SCI sent by the UE-A and the receiver UEs may receive and decode the PSSCH as configured/indicated in the e.g., SCI send by the UE-A too. In one example, for a transmission of packet from UE-B to UE-C, the UE-A, who is the scheduler UE, can send a first SCI to all the UEs and in the a first SCI, the UE-A can include the source ID (which is UE-B in this example), the destination ID (which is UE-B in this example) and the resource allocation and transmission configuration (for example MCS, DM-RS configuration) of the PSSCH transmission. Then when the UE-B receives the a first SCI, the UE-B may transmit the PSSCH as configured by the a first SCI and the UE-C may receive and decode the PSSCH as configured in the a first SCI.

In one example of Alt #2, when a first UE requests sidelink resource/transmission from the UE-A, the UE-A can first send one control signaling message (for example SCI or higher layer message) including the resource allocation to the a first UE. The first UE can send SCI (in PSCCH) that contains the scheduling and configuration of PSSCH and corresponding PSSCH according to the resource allocation from the UE-A. The receiver UE may decode the SCI sent by the first UE and then receive and decode PSSCH accordingly.

In one example, for a packet transmission from UE-B to UE-C, the UE-A, who is the scheduler UE, can send a control signaling message with a sidelink resource allocation information to the UE-B. Then the UE-B can send SCI (in PSCCH) and corresponding PSSCH in the resource allocated by the UE-A. The receiver UE, UE-C, can decode the SCI sent by UE-B and receive and decode the PSSCH accordingly based on the SCI.

In one embodiment, there are a group of UEs: a UE-A, a UE-B, a UE-C, and a UE-D. The UE-A is configured/selected as the scheduler UE. The UE-A can send a sidelink signaling (for example one SCI) to schedule the transmission and reception of PSSCH from one UE in that group.

The control signaling (for example SCI) sent by UE-A can include one or more of the following information: the ID of transmitter UE. In this example, the ID of the transmitter UE contained in the control signaling sent by the UE-A can be the ID of any one UE among the UE-A, the UE-B, the UE-C, and the UE-D; the destination UE ID: the IUD of the transmitter ID of a single UE or the ID of receiver group. The ID of the transmitter UE can also be a special ID value to indicate that the PSSCH is broadcast information; the resource allocation for the PSSCH, the ID of the transmitter UE can include the sidelink slot location, the index of OFDM or DFT-s-OFDM symbols, and the frequency location for the allocated resource; and the transmission configuration of the PSSCH, for example, the MCS level.

In one embodiment, there are a group of UEs: a UE-A, a UE-B, a UE-C, and a UE-D and UE-A is configured/selected as the scheduler UE. When one of those UE (other than UE-A) has packet to transmit, the UE can send control signaling to the UE-A to request resource allocation on sidelink.

The control signaling can be a SCI format. In the control signaling, the UE can include one or more of the following information: the size of resource the UE requests. The size of resource can be the number of sidelink subchannels. The size of resource can be the number of PRBs and the number of OFDM or DFT-s-OFDM symbols; the indicator of QoS level of the packet to be transmitted; the ID of source UE; and the ID of the destination UE of that packet.

In one embodiment, a serving gNB can configure one UE to be the scheduler UE among a group of UEs for sidelink resource allocation. The serving gNB can send control signaling to a second UE to indicate that a first UE is the scheduler UE for a second UE and the serving gNB can send control signaling to a first UE to indicate that a first UE is the scheduler UE.

The assignment of a scheduler UE can be time-duration based. When a first UE is configured to be the scheduler UE, a first UE can act as scheduler UE until a first timer expires. When a first UE receives control signaling that configure him as a scheduler UE, a first UE may start a first timer. When a first timer expires, a first UE may stop acting as scheduler UE. When a second UE receives configuration message from the serving gNB that a first UE is configured as scheduler UE, a second UE can start a second timer and a second UE can assume a first UE is the scheduler UE until a second timer expires.

In one embodiment, a UE can be pre-configured to be a scheduler UE. In one example, a first UE is pre-configured to be a scheduler UE. If a first UE does not receive configuration from a serving gNB that configures one UE to be a scheduler UE and if a first UE does not receive message from other UE that indicates one UE is a scheduler UE in the proximity, a first UE can determine the first UE is a scheduler UE and broadcast a control signaling command in sidelink (can be called notification message of scheduler UE).

In that control signaling command, a first UE can include information to indicate that one or more of the following information: that a first UE is a scheduler UE and also the geo-location information of his UE; the resource pool(s) a first UE allocates as a scheduler UE; geo-location and information of motion of a first UE; and a priority indicator of scheduler UE.

A UE may receive notification message of scheduler UE from a sidelink connection. If a UE can receive a notification message of scheduler UE correctly, the UE may send message to the scheduler UE to request join the session of scheduler UE based on the received notification message of scheduler UE. If a UE can receive multiple notification message of scheduler UE from different UEs, the UE may choose the UE that is closest to him or the one with highest signal power of the notification message of scheduler UE as the scheduler UE for him and then send message to that UE to request join the session of scheduler UE based on the chosen notification message.

For a first UE acting as a scheduler UE, a first UE may monitor the notification message of scheduler UE. If a first UE receives notification message of scheduler UE from one other UE, a first UE may determine whether a first UE may continue acting as a scheduler UE or a first UE may stop acting as a scheduler UE based on some condition. In one example, a first UE is acting as a scheduler UE and a first UE receives notification message of scheduler UE from a second UE, then a first UE can use one or combination of the following alternatives.

In one example, a first UE can check and compare the UE ID of a first UE and a second UE from whom a first UE receives a notification message of scheduler UE; if the value of UE ID of a first UE is larger (in another example, can be less) than the value of UE ID of a second UE, then a first UE stops acting as scheduler UE and a first UE can send request message to a second UE to request joining the session. If the value of UE ID of a first UE is less (in another example, can be larger) than the value of UE ID of a second UE, then a first UE can continue acting as a scheduler UE.

In one example, a first UE can compare the priority indicator of scheduler UE between a first UE and a second UE. If the priority indicator of a first UE indicates that a first UE has lower priority than a second UE, then a first UE can stop acting as scheduler UE and can send request message to a second UE to request joining the session. If the priority indicator of a first UE indicates that a first UE has higher priority than a second UE, then a first UE can continue acting as scheduler UE. If a first UE and a second UE have same priority level, then a first UE can randomly choose between stopping as scheduler UE and continuing as a scheduler UE.

The combination of the above two. A first UE can first use priority level to determine and if the priority levels of a first UE and a second UE are same, a first UE can determine based on the values of the IDs of two UEs.

Figure 44:
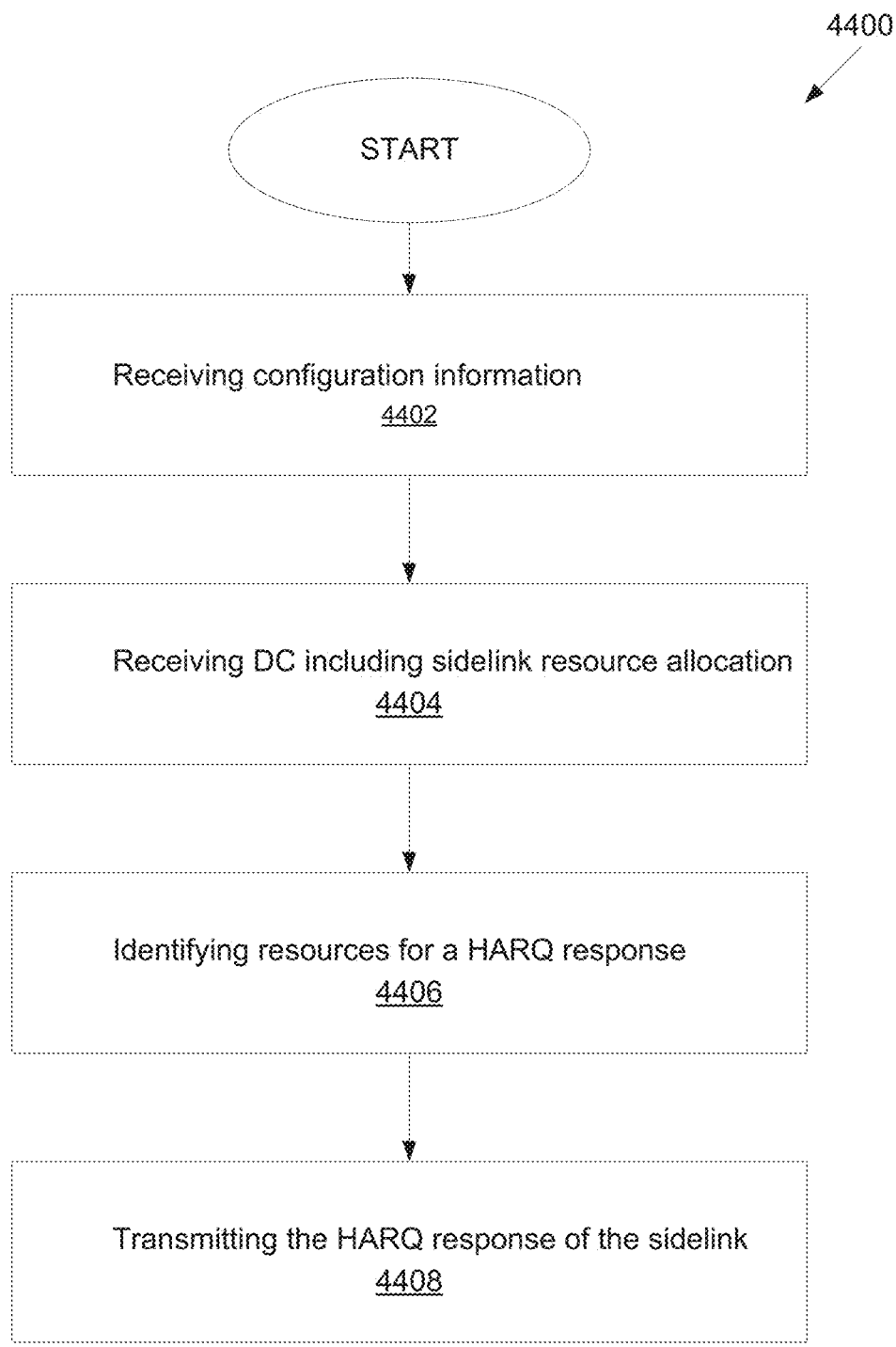
FIG. 44 illustrates a flow chart of a method for reliable transmission for V2X communication according to embodiments of the present disclosure.

FIG. 44 illustrates a flow chart of a method 4400 for reliable transmission for V2X communication according to embodiments of the present disclosure, as may be performed by a UE (e.g., 111-116 as illustrated in FIG. 1). The embodiment of the method 4400 illustrated in FIG. 44 is for illustration only. FIG. 44 does not limit the scope of the present disclosure to any particular implementation.

As illustrated in FIG. 44, the method 4400 begins at step 4402. In step 4402, the UE receives, from a base station (BS), configuration information including resource allocation information for a sidelink and an uplink (UL) channel, wherein the sidelink is established between the UE and another UE.

In step 4404, the UE receives, from the BS, downlink control information (DCI) including sidelink resource allocation information.

In one embodiment, the UE further receives the DCI including the resource allocation information for a transmission via the sidelink and a grant for a set of resources of the UL channel. In such embodiment, the grant includes specific slot information and an identification (ID) of the PUCCH resources.

In step 4406, the UE identifies resources for a hybrid automatic repeat request (HARQ) response of the sidelink based on the configuration information and the sidelink resource allocation information.

In step 4408, the UE transmits, to the BS, the HARQ response of the sidelink via physical uplink control channel (PUCCH) resources.

In one embodiment, the UE transmits, to the other UE, a signal via a physical sidelink control channel/physical sidelink shared channel (PSCCH/PSSCH) based on the identified resources and receives, from the other UE, the HARQ response for a PSSCH transmission via a physical sidelink feedback channel (PSFCH), the PSFCH being multiplexed with the PSCCH/PSSCH in a time domain. In such embodiment, a set of resources for the PSFCH is configured by the BS or an operator of a cell belonging to the BS.

In one embodiment, the UE transmits, to the other UE, sidelink control information (SCI) via a PSCCH and the SCI carries scheduling assignment (SA) information, and includes a source ID and a target ID in the SCI, wherein the source ID includes an ID of a transmitter UE and the target ID includes an ID of a receiver UE or a group of receiver UEs.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A first user equipment (UE) in a wireless communication system, the first UE comprising:
 a transceiver configured to:
  receive, from a second UE, sidelink control information (SCI), wherein a sidelink is established between the first UE and the second UE; and
  receive, from the second UE, a physical sidelink shared channel (PSSCH) based on the SCI; and
 a processor operably connected to the transceiver, the processor configured to determine a resource for transmission of a physical sidelink feedback channel (PSFCH), that is related to the PSSCH, based on an identifier (ID) of the first UE in case the sidelink is established as a groupcast between the second UE and the first UE,
wherein the transceiver is further configured to transmit, to the second UE, the PSFCH through the resource.

2. The first UE of claim 1, wherein the sidelink is identified as one of the groupcast or a unicast.

3. The first UE of claim 1, wherein the SCI indicates whether hybrid automatic repeat request-acknowledgement (HARQ-ACK) information for the PSSCH is required, wherein transmitting the PSFCH includes transmitting the PSFCH including the HARQ-ACK information when the SCI indicates a feedback of the HARQ-ACK information is required.

4. The first UE of claim 3, wherein the HARQ-ACK information includes ACK or negative acknowledgement (NACK), or only NACK according to the SCI.

5. The first UE of claim 1, wherein the PSFCH is transmitted in a slot after a configured number of slots after a slot in which the PSSCH is received.

6. The first UE of claim 1, wherein the PSFCH is associated with a subchannel or a plurality of subchannels according to the SCI.

7. The first UE of claim 1, wherein the SCI indicates information on the resource for transmission of the PSFCH including HARQ-ACK information for the PSSCH.

8. A second user equipment (UE) in a wireless communication system, the second UE comprising:
a transceiver configured to:
transmit, to a first UE, sidelink control information (SCI), wherein a sidelink is established between the first UE and the second UE;
transmit, to the first UE, a physical sidelink shared channel (PSSCH) based on the SCI; and
receive, from the first UE, a physical sidelink feedback channel (PSFCH) through a resource,
wherein the resource for the PSFCH, that is related to the PSSCH, is based on an identifier (ID) of the first UE in case the sidelink is established as a groupcast between the second UE and the first UE.

9. The second UE of claim 8, wherein the sidelink is identified as one of the groupcast or a unicast.

10. The second UE of claim 8, wherein the SCI indicates whether hybrid automatic repeat request-acknowledgement (HARQ-ACK) information for the PSSCH is required, wherein transmitting the PSFCH includes transmitting the PSFCH including the HARQ-ACK information when the SCI indicates a feedback of the HARQ-ACK information is required.

11. The second UE of claim 10, wherein the HARQ-ACK information includes ACK or negative acknowledgement (NACK), or only NACK according to the SCI.

12. The second UE of claim 8, wherein the PSFCH is transmitted in a slot after a configured number of slots after a slot in which the PSSCH is received.

13. The second UE of claim 8, wherein the PSFCH is associated with a subchannel or a plurality of subchannels according to the SCI.

14. The second UE of claim 8, wherein the SCI indicates information on the resource for transmission of the PSFCH including HARQ-ACK information for the P S SCH.

15. A method for operating a first user equipment (UE) in a wireless communication system, the method comprising:
receiving, from a second UE, sidelink control information (SCI), wherein a sidelink is established between the first UE and the second UE;
receiving, from the second UE, a physical sidelink shared channel (PSSCH) of the sidelink based on the SCI;
determining a resource for transmission of a physical sidelink feedback channel (PSFCH), that is related to the PSSCH, based on an identifier (ID) of the first UE in case the sidelink is established as a groupcast between the second UE and the first UE; and
transmitting, to the second UE, the PSFCH through the resource.

16. The method of claim 15, wherein the sidelink is identified as one of the groupcast or a unicast.

17. The method of claim 15, wherein the SCI indicates whether hybrid automatic repeat request-acknowledgement (HARQ-ACK) information for the PSSCH is required, and wherein transmitting the PSFCH includes transmitting the PSFCH including the HARQ-ACK information when the SCI indicates a feedback of the HARQ-ACK information is required.

18. The method of claim 17, wherein the HARQ-ACK information includes ACK or negative acknowledgement (NACK), or only NACK according to the SCI.

19. The method of claim 15, wherein the PSFCH is transmitted in a slot after a configured number of slots after a slot in which the PSSCH is received.

20. The method of claim 15, wherein the PSFCH is associated with a subchannel or a plurality of subchannels according to the SCI, and wherein the SCI indicates information on the resource for transmission of the PSFCH including HARQ-ACK information for the PSSCH.

* * * * *